(12) United States Patent
Hanamura et al.

(10) Patent No.: US 6,901,109 B2
(45) Date of Patent: May 31, 2005

(54) BIT STREAM SEPARATING AND MERGING SYSTEM, APPARATUS, METHOD AND COMPUTER PROGRAM PRODUCT

(75) Inventors: Tsuyoshi Hanamura, Tokyo (JP); Isao Nagayoshi, Tokyo (JP); Hiroyuki Kasai, Tokyo (JP); Hideyoshi Tominaga, Tokyo (JP)

(73) Assignee: Media Glue Corporation, Tokyo (JP)

( * ) Notice: Subject to any disclaimer, the term of this patent is extended or adjusted under 35 U.S.C. 154(b) by 547 days.

(21) Appl. No.: 09/995,465

(22) Filed: Nov. 27, 2001

(65) Prior Publication Data

US 2002/0094025 A1 Jul. 18, 2002

(30) Foreign Application Priority Data

Nov. 27, 2000 (JP) ........................................ 2000-358821

(51) Int. Cl.[7] ................................................. H04N 1/66
(52) U.S. Cl. ................................................. 375/240.03
(58) Field of Search ........................ 375/240.01, 240.03, 375/240.26, 240.12, 240.13; H04B 1/66

(56) References Cited

U.S. PATENT DOCUMENTS 4,799,252 A * 1/1989 Eizenhoffer et al. ........ 370/330
6,529,484 B1 * 3/2003 Quinquis et al. ........ 370/310.1
2002/0054638 A1 * 5/2002 Hanamura et al. ..... 375/240.03

* cited by examiner

Primary Examiner—Tung Vo
(74) Attorney, Agent, or Firm—RatnerPrestia

(57) ABSTRACT

Herein disclosed is a multiple-output bit stream separating apparatus for inputting an original MPEG-2 bit stream to separate into a plurality of transcoded MPEG-2 bit streams and a plurality of differential bit streams, and a multiple-output bit stream merging apparatus for inputting the transcoded MPEG-2 bit stream and the differential bit streams to reconstruct the original MPEG-2 bit stream. The bit rate of the transcoded MPEG-2 bit stream and the differential bit streams thus multiple times separated are much lower than that of the original MPEG-2 bit stream. This leads to the fact that the multiple-output bit stream separating apparatus and the multiple-input bit stream merging apparatus can promptly and reliably transmit and receive an original MPEG-2 bit stream having a large bit rate by transmitting and receiving a plurality of transcoded MPEG-2 bit streams and a plurality of differential bit streams in place of the original MPEG-2 bit stream.

75 Claims, 20 Drawing Sheets

Bit Stream Separating and Merging System 1000

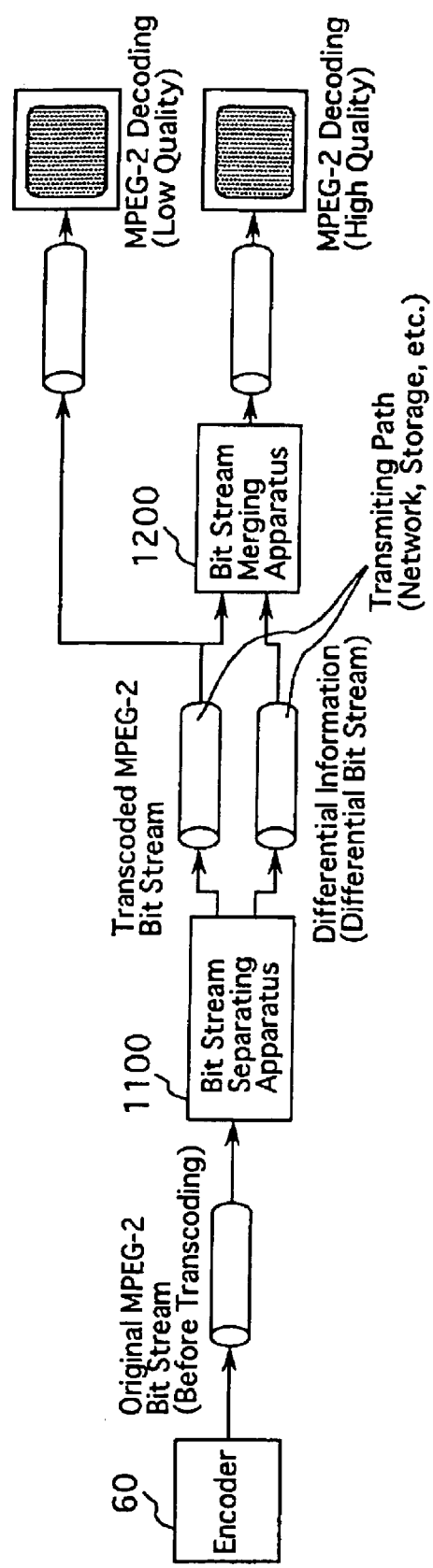
F I G. 5

BIT STREAM SEPARATING AND MERGING SYSTEM, APPARATUS, METHOD AND COMPUTER PROGRAM PRODUCT

BACKGROUND OF THE INVENTION

1. Field of the Invention

The present invention relates to apparatuses, methods and computer program products for separating and merging a coded moving picture sequence signal, and more particularly, to apparatuses, methods and computer program products for transcoding a first coded moving picture sequence signal to separate into and generate a second coded moving picture sequence signal and a differential coded moving picture sequence signal, which is a difference between the first coded moving picture sequence signal and the second coded moving picture sequence signal, and merging the second coded moving picture sequence signal and the differential coded moving picture sequence signal to reconstruct the first coded moving picture sequence signal.

2. Description of the Related Art

There have so far been proposed a wide variety of systems for compressing and encoding a moving picture having a considerable amount of data to produce a coded moving picture sequence signal. The international standard, ISO-IEC 13818, was created for a system operable to encode a digital video signal with an associated digital audio signal and commonly called "Moving Picture Expert Group Phase 2", i.e., "MPEG-2". In such an encoding system, the coded moving picture sequence signal is outputted in the form of bit streams. In particular, the bit streams conformable to the above MPEG-2 standard will be referred to as "MPEG-2 bit streams" hereinlater. Recently, the system of this type becomes more utilizable for various technical fields, such as a communications system, a television broadcasting service system, and so on.

The above MPEG-2 bit stream have a hierarchical structure consisting of: in turn, a top, sequence layer; a GROUP OF PICTURES layer; a picture layer; a slice layer; a macroblock layer; and a low, block layer.

The typical encoder operates under the MPEG-2 standard through a method of compressing and encoding a moving picture as follows. The method comprises the steps of:
(a) inputting the moving picture sequence consisting of a series of pictures;
(b) temporarily storing the series of pictures as frames in memories, respectively;
(c) computing a difference between one frame and another frame to eliminate redundancy in a time axis direction; and
(d) orthogonal transforming, e.g., discrete cosine transforming (DCT), a plurality of picture elements within each of the frames to eliminate redundancy in a spatial axis direction.

The encoder thus constructed can compress and encode the moving picture to generate and output a coded moving picture sequence signal in the form of the MPEG-2 bit stream through a transmitting path at a predetermined bit rate. The coded moving picture sequence signal is then transmitted from the encoder to a decoder which is operated to decode the coded signal to reproduce the moving picture. The typical decoder is operated to decode the coded moving picture sequence signal through a so-called bi-directionally predicting method which comprises the steps of:
(a) storing one reproduced picture, generally referred to as "intra-picture", i.e., "I-picture", in a first frame memory;
(b) estimating another picture generally referred to as "predictive-picture", i.e., "P-picture", followed by the I-picture, on the basis of the information on the difference between the I-picture and P-picture;
(c) storing the estimated P-picture in a second frame memory; and
(d) estimating further another picture interposed between the I-picture and P-picture, generally referred to as "bi-directionally predictive-picture", i.e., "B-picture".

Here, the I-picture is encoded independently of the pictures of the other types, so that an I-picture can be reproduced as a single static image only by itself. A P-picture can be predicted on the basis of the I-picture or another P-picture located on a position prior to the P-picture to be encoded. I-picture is referred to as "intra-picture" while P-picture and B-picture are referred to as "inter-pictures".

In the above encoder, the amount of information on the coded moving picture sequence signal is, however, variable. In particular, the amount of information increases remarkably when a scene is changed. The decoder is generally provided with an input buffer for receiving the coded moving picture sequence signal from the encoder. The input buffer of the decoder, however, has a limited storage capacity. Therefore, when a large number of bits of the coded moving picture sequence signal are transmitted from the encoder to the decoder, the input buffer overflows with the bits of the coded moving picture sequence signal thereby making the decoder difficult to process the coded moving picture sequence signal. In order to transmit such coded moving picture sequence signal having a variable number of bits through the transmitting path at a predetermined bit rate and to make it possible for any decoder to receive the whole of the coded moving picture sequence signal without overflow, the encoder comprises: an output buffer for temporarily storing the coded moving picture sequence signal before transmitting the coded moving picture sequence signal through the transmitting path; and a rate controller for controlling the amount of bits of the coded moving picture sequence signal stored in the output buffer so as to keep the amount of bits of the coded moving picture sequence signal to be transmitted to the decoder for a predetermined time from exceeding the capacity of the input buffer of the decoder, thereby controlling the bit rate of the coded moving picture sequence signal.

A typical rate controlling method in MPEG-2 standard is described in "ISO-IEC/JTC1/SC29/WG11/N0400 Test Model 5", April, 1993, hereinlater referred to as "TM-5". The rate controlling method according to the TM-5 comprises the steps of:
(I) allocating a target number of bits to a picture of each type on the basis of the total number of bits, i.e., R, available to the pictures to be encoded in the GROUP OF PICTURES;
(II) computing the reference value of a quantization parameter used for the quantization of each of macroblocks in the picture on the basis of the utilization capacity of a "virtual buffer" to perform the rate control; and
(III) modulating the reference value of the quantization parameter in accordance with the spatial activity in the macroblock.

Furthermore, there are many types of decoders. For instance, a decoder is designed to decode the coded signal in a unique compression format different from that of the MPEG-2 bit stream, and another decoder is connectable to a transmitting path having a different bit rate. The decoder of those types is therefore required to provide with an apparatus, a so-called transcoder, for converting the MPEG-2 bit streams into another appropriate coded signal in a specified format having a required bit rate. The transcoder makes it possible for the encoder to transmit the coded signal to any types of decoders.

Referring to FIG. 14 of the drawings, there is shown a transcoder of one typical type as a first conventional transcoder 50. The conventional transcoder 50 has an input terminal $a_1$ electrically connected to a first transmitting path, not shown, and an output terminal $a_2$ electrically connected to a second transmitting path, not shown. The conventional transcoder 50 is designed to input first bit streams $b_1$ at a predetermined input bit rate through the input terminal $a_1$, to convert the first bit streams $b_1$ into second bit streams $b_2$ to be outputted at a predetermined output bit rate, i.e., a target bit rate, lower than the input bit rate of the inputted first bit streams $b_1$, and then to output the second bit streams $b_2$ through the output terminal $a_2$. The conventional transcoder 50 comprises a variable length decoder 51, referred to as "VLD" in the drawings, an inverse quantizer 53, referred to as "IQ" in the drawings, a quantizer 55, referred to as "Q" in the drawings, a variable length encoder 57, referred to as "VLC" in the drawings, and a rate controller 59.

The variable length decoder 51 is electrically connected to the input terminal $a_1$ and designed to decode a coded moving picture sequence signal within the first bit streams $b_1$ inputted through the input terminal $a_1$ to reconstruct original picture data for each of pictures including a matrix of original quantization coefficients, referred to as "level", for each of macroblocks within each of the pictures and an original quantization parameter, hereinlater referred to as "first quantization parameter $Q_1$".

The inverse quantizer 53 is electrically connected to the variable length decoder 51 and designed to input the matrix of original quantization coefficients level from the variable length decoder 51 and the first quantization parameter $Q_1$. The inverse quantizer 53 is further designed to inversely quantize the inputted matrix of original quantization coefficients level with the first quantization parameter $Q_1$ to generate a matrix of inverse-quantization coefficients, referred to as "dequant", i.e., DCT coefficients, for each of macroblocks as follows:

$$dequant = \{2 \times level + \text{sign}(level)\} \times \frac{Q_1 \times QM}{32} \quad \text{equation (a1)}$$

or $$dequant = level \times \frac{Q_1 \times QM}{16} \quad \text{equation (a2)}$$

where the equation (a1) is used for the intra-picture while the equation (a2) is used for the inter-picture. QM is a matrix of quantization parameters stored in a predetermined quantization table. The first quantization parameter $Q_1$ and the matrix of quantization parameters QM are derived from the inputted first bit streams $b_1$ by the decoder 51. Here, the original quantization coefficients level, the inverse-quantization coefficients dequant, the matrix of quantization parameters QM, and the first quantization parameter $Q_1$ are integers. The inverse-quantization coefficients dequant calculated by the equations (a1) and (a2) should be rounded down to the nearest integer.

The quantizer 55 is electrically connected to the inverse quantizer 53 and designed to input the matrix of inverse-quantization coefficients dequant from the inverse quantizer 53 and then quantize the inputted matrix of inverse-quantization coefficients dequant for each of macroblocks with a second quantization parameter, referred to as "$Q_2$" hereinlater, to generate a matrix of re-quantization coefficients, referred to as "tlevel", as follows:

$$tlevel = dequant \times \frac{16}{Q_2 \times QM} \quad \text{equation (a3)}$$

or $$tlevel = dequant \times \frac{16}{Q_2 \times QM} + \text{sign}(dequant) \times \frac{1}{2} \quad \text{equation (a4)}$$

where the equation (a3) is used for the inter-picture, while the equation (a4) is used for the intra-picture. The second quantization parameter $Q_2$ is obtained by the rate controller 59. Here, the re-quantization coefficients tlevel and the second quantization parameter $Q_2$ are also integers. The re-quantization coefficients tlevel calculated by the equations (a3) and (a4) should be rounded down to the nearest integer. Such rounding operation for the integers will be omitted from the later description for avoiding tedious repetition.

The variable length encoder 57 is electrically connected to the quantizer 55 and designed to input the re-quantization coefficients tlevel from the quantizer 55 and then encode the inputted matrix of the re-quantization coefficients tlevel to generate objective picture data for each of pictures to sequentially output the objective picture data in the form of the second bit streams $b_2$ through the output terminal $a_2$. The variable length encoder 57 is further electrically connected to the variable length decoder 51 and designed to input a diversity of information data included in the first bit streams $b_1$ necessary for the second bit streams $b_2$ from the variable length decoder 51.

The rate controller 59 is electrically connected to the inverse quantizer 53 and designed to perform rate control process in accordance with the TM-5 on the basis of the information obtained from the inverse quantizer 53 as described below.

Referring to FIG. 15 of the drawings, there is shown a flowchart of the rate controlling process in accordance with the TM-5 carried out in the conventional transcoder 50. As shown in FIG. 15, the rate controlling process comprises steps A1 to A14.

In the step A1, "1" is assigned to a picture number variable n representing the serial number of a picture within the first bit streams $b_1$. Hereinlater, a n-th picture in the first bit streams $b_1$ is referred to as "pic(n)".

In the following step A2, a global complexity measure, referred to as $X_i$, $X_p$, or $X_b$, for a picture of the corresponding type, i.e., I, P or B-picture is computed as follows:

$$X_i = S_i \times Q_i \quad \text{equation (a5)}$$

or $$X_p = S_p \times Q_p \quad \text{equation (a6)}$$

or $$X_b = S_b \times Q_b \quad \text{equation (a7)}$$

where $S_i$, $S_p$, or $S_b$ is the number of bits generated for an encoded I, P or B-picture, and $Q_i$, $Q_p$, or $Q_b$ is the average quantization parameter computed by averaging the actual quantization values used during the quantization of the all macroblocks within I, P or B-picture. The average quantization parameters $Q_i$, $Q_p$, and $Q_b$ are normalized within a range of 1 to 31. The average quantization parameters $Q_i$, $Q_p$, and $Q_b$ respectively correspond to the first quantization parameters $Q_1$ obtained from the variable length decoder 51.

The global complexity measure $X_i$, $X_p$, or $X_b$ of the corresponding picture is inversely proportional to the compressing ratio of the moving picture, namely, the ratio of the amount of information in the second bit streams $b_2$ to that in the first bit streams $b_1$. Namely, as the amount of information in the first bit streams $b_1$ becomes larger, the compressing ratio is decreased. Therefore, the global complexity measure $X_i$, $X_p$, or $X_b$ of the corresponding picture becomes larger, as the compressing ratio is decreased. In contrast, the global complexity measure $X_i$, $X_p$, or $X_b$ of the corresponding picture becomes smaller, as the compressing ratio is increased.

The initial value of global complexity measure $X_i$, $X_p$, or $X_b$ of the corresponding picture is given as follows:

$$X_i = 160 \times \text{Target\_Bitrate}/115 \quad \text{equation (a8)}$$

or $$X_p = 60 \times \text{Target\_Bitrate}/115 \quad \text{equation (a9)}$$

or $$X_b = 42 \times \text{Target\_Bitrate}/115 \quad \text{equation (a10)}$$

where Target_Bitrate is measured in bits/s and corresponds to the target bit rate of the first conventional transcoder 50.

In the following step A3, the target number of bits for a picture of the corresponding type, i.e., I, P or B-picture to be encoded in the current GROUP OF PICTURES, referred to as $T_i$, $T_p$, or $T_b$ is computed as:

$$T_i = \frac{R}{1 + \frac{N_p X_p}{X_i K_p} + \frac{N_b X_b}{X_i K_b}} \quad \text{or} \quad \text{equation (a11)}$$

$$T_p = \frac{R}{N_p + \frac{N_b K_p X_b}{K_b X_p}} \quad \text{or} \quad \text{equation (a12)}$$

$$T_b = \frac{R}{N_b + \frac{N_p K_b X_p}{K_p X_b}} \quad \text{equation (a13)}$$

where $N_p$ and $N_b$ are the number of P-pictures and B-pictures remained not yet encoded in the current GROUP OF PICTURES, respectively. $K_p$ and $K_b$ are constants computed on the basis of the ratio of the quantization value of P-picture to the quantization value of I-picture, and the ratio of the quantization parameter of B-picture to the quantization value of I-picture, respectively. It is assumed that the quality of the whole image will be always optimized with $K_p=1.0$ and $K_b=1.4$.

In the following step A4, it is judged upon whether the picture number variable n is "1" or not, i.e., the current picture is the first picture pic(1) or not. When it is judged that the picture number variable n is "1", i.e., the current picture is the first picture pic(1), the step A4 goes forward to the step A5. When, on the other hand, it is judged that the picture number variable n is not "1", i.e., the current picture is not the first picture, the step A4 goes forward to the step A6. In the step A5, the total number of bits available to the pictures to be encoded in the current GROUP OF PICTURES, i.e., the remaining number of bits available to the GROUP OF PICTURES, hereinlater referred to as R, is initialized in accordance with the following equation (a14). This remaining number of bits available to the GROUP OF PICTURES R before encoding the first picture pic(1) within the GROUP OF PICTURES is computed as follows:

$$R = \text{Target\_Bitrate} \times NPIC/\text{picture\_rate} + R \quad \text{equation (a14)}$$

where NPIC is the total number of pictures of any type in the GROUP OF PICTURES, and picture_rate is expressed in the number of pictures decoded and indicated per second. At the start of the sequence R=0.

In the step A6, the above remaining number of bits available to the GROUP OF PICTURES R before encoding the current picture pic(n) is updated as follows:

$$R = R - S_i \quad \text{equation (a15)}$$

or $$R = R - S_p \quad \text{equation (a16)}$$

or $$R = R - S_b \quad \text{equation (a17)}$$

where $S_i$, $S_p$, or $S_b$ is the number of bits generated in the previously encoded picture pic(n−1) of the corresponding type (I, P or B).

The step A5 or A6 goes forward to the step A7 wherein "1" is assigned to a macroblock number variable j (j>=1) representing the serial number of a macroblock within one of the pictures. Hereinlater, the j-th macroblock in the picture is referred to as "MB(j)".

In the following step A8, a utilization volume of the capacity of a virtual buffer for I, P or B-pictures, referred to as $d_i(j)$, $d_p(j)$ or $d_b(j)$, before encoding the macroblock MB(j) is computed as follows:

$$d_i(j) = d_i(0) + B(j-1) - \frac{T_i \times (j-1)}{NMB} \quad \text{or} \quad \text{equation (a18)}$$

$$d_p(j) = d_p(0) + B(j-1) - \frac{T_p \times (j-1)}{NMB} \quad \text{or} \quad \text{equation (a19)}$$

$$d_b(j) = d_b(0) + B(j-1) - \frac{T_b \times (j-1)}{NMB} \quad \text{equation (a20)}$$

where B(j−1) is the total number of bits generated for encoded macroblocks in the picture up to and including the (j−1)th macroblock MB(j−1). NMB is the total number of macroblocks in the picture. $d_i(j)$, $d_p(j)$, or $d_b(j)$ is the utilization volume of the capacity of the virtual buffer at the j-th macroblock MB(j) for I, P, or B-picture.

$d_i(0)$, $d_p(0)$, or $d_{b(0)}$ is the initial utilization volume of the virtual buffer for I, P, or B-picture and given by:

$$d_i(0) = 10 \times r/31 \quad \text{equation (a21)}$$

or $$d_p(0) = K_p \times d_i(0) \quad \text{equation (a22)}$$

or $$d_b(0) = K_b \times d_i(0) \quad \text{equation (a23)}$$

where r is referred to as "reaction parameter" and used for the control of the reaction rate of the feed back loop as follows:

$$r = 2 \times \text{Target\_Bitrate}/\text{picture\_rate} \quad \text{equation (a24)}$$

The final utilization volume of the virtual buffer, referred to as, $d_i(NMB)$, $d_p(NMB)$, or $d_b(NMB)$ of the last macroblock, i.e., NMB-th macroblock MB(NMB) of the current picture pic(n) will be used as the initial utilization volume of the virtual buffer for I, P, or B-picture, i.e., $d_i(0)$, $d_p(0)$, or $d_{b(0)}$ of the same type to encode the first macroblock MB(j) within the next picture pic(n+1).

In the following step A9, the reference quantization parameter Q(j) of the j-th macroblock MB(j) for each of the pictures is computed on the basis of the aforesaid utilization volume of the virtual buffer, i.e., d(j) as follows:

$$Q(j) = d(j) \times 31/r \qquad \text{equation (a25)}$$

Here, the reference quantization parameter Q(j) is identical with the aforesaid second quantization parameter Q2 of the j-th macroblock MB(j).

In the following step A10, the j-th macroblock MB(j) is quantized with the reference quantization parameter Q(j) computed in the step A9. In the following step A11, the macroblock number variable j is incremented by one. The step A11 goes forward to the step A12 wherein it is judged upon whether the macroblock number variable j is more than the total number of macroblocks NMB within the n-th picture pic(n) or not. When it is judged that the macroblock number variable j is not more than the total number of macroblocks NMB within the n-th picture pic(n), the step A12 returns to the step A8. When, on the other hand, it is judged that the macroblock number variable j is more than the total number of macroblocks NMB within the n-th picture pic(n), the step A12 goes forward to the step A13.

The macroblock number variable j thus serves as a loop counter for repeating the process from the steps A8 to A11 to encode all the macroblocks from the 1st macroblock MB(1) up to the j-th macroblock MB(j) in the present picture pic(n). The entire macroblocks starting from the first macroblock MB(1) up to the NMB-th macroblock MB(NMB) in the n-th picture pic(n) can be thus encoded sequentially.

In the step A13, the picture number variable n is incremented by one. Then the step A13 goes forward to the step A14 wherein it is judged upon whether the picture number variable n is more than the total number of pictures, i.e., NPIC or not. When it is judged that the picture number variable n is not more than the total number of pictures, NPIC, the step A14 returns to the step A2. When, on the other hand, it is judged that the picture number variable n is more than the total number of pictures, NPIC, this routine of the rate controlling process is terminated. The picture number variable n thus serves as a loop counter for repeating the process from steps A2 to A13 to process all the pictures from the first picture pic(1) to the n-th picture pic(n) in the present GROUP OF PICTURES. The entire pictures starting from the first picture pic(1) up to the NPIC-th picture pic(NPIC), in the present GROUP OF PICTURES can be therefore processed sequentially.

The aforesaid conventional transcoder 50, however, can obtain no information on the structure of GROUP OF PICTURES such as a picture cycle of I or P-pictures within each of the GROUP OF PICTURES, so that the transcoder 50 must estimate the structure of GROUP OF PICTURES within the inputted moving picture sequence signal to allocate the number of bits to pictures of each type within the estimated structure of GROUP OF PICTURES.

Furthermore, the first conventional transcoder 50 is required to decode the first bit streams $b_1$ almost all over the layers such as the sequence layer, the GROUP OF PICTURES layer, the picture layer, the slice layer and the macroblock layer in order to derive necessary data for transcoding the first bit streams $b_1$ into the second bit streams $b_2$. The operation takes time, thereby causing the delay in the transcoding process.

Referring to FIG. 16 of the drawings, there is shown an improvement of the above transcoder 50 as a second conventional transcoder 60. The second conventional transcoder 60 is operated to perform the rate control without estimating the structure of GROUP OF PICTURES. As shown in FIG. 16, the second conventional transcoder 60 comprises a delay circuit 61 and a rate controller 62 in addition to the variable length decoder 51, the inverse quantizer 53, the quantizer 55 and the variable length encoder 57 same as those of the first conventional transcoder 50 shown in FIG. 14. The same constitutional elements are simply represented by the same reference numerals as those of the conventional transcoder 50, and will be thus omitted from description for avoiding tedious repetition.

The delay circuit 61 is interposed between the variable length decoder 51 and the inverse quantizer 53 and designed to control the flow of the signal from the variable length decoder 51 to the inverse quantizer 53. The delay circuit 61 is operated to delay the operation start time of the inverse quantizer 53 so that the inverse quantizer 53 does not start the inverse-quantizing process until the variable length decoder 51 terminates the process of decoding one of the pictures in the coded moving picture sequence signal.

As shown in FIG. 16, the rate controller 62 of the second conventional transcoder 60 includes a target ratio computing unit 63, an input bit summing unit 65, a bit difference computing unit 67, a target output bit updating unit 69, and a quantization parameter computing unit 71.

The target ratio computing unit 63 is electrically connected to the variable length decoder 51 and designed to input an input bit rate of the first bit streams $b_1$, hereinlater referred to as "Input_Bitrate", from the variable length decoder 51, and input a target bit rate, hereinlater referred to as "Target_Bitrate" through a terminal $a_3$. Alternatively, the target bit rate Target_Bitrate may have been stored in an internal memory, or determined on the basis of internal switches. The target ratio computing unit 63 is designed to then compute a target ratio, hereinlater referred to as "ioRatio" of the target bit rate Target_Bitrate to the input bit rate Input_Bitrate for each of pictures as follows:

$$ioRatio = \frac{\text{Target\_Bitrate}}{\text{Input\_Bitrate}} \qquad \text{equation (a26)}$$

The input bit summing unit 65 is designed to sum up the number of inputting bits of the picture decoded by the variable length decoder 51 to produce the total number of inputting bits, hereinlater referred to as "$T_{in}$". On the other hand, the target output bit updating unit 69 is designed to compute a target number of outputting bits to be generated by the variable length encoder 57, hereinlater referred to as "$T_{out}$". The target number of outputting bits $T_{out}$ is computed by multiplying the total number of inputting bits $T_{in}$ by the target ratio ioRatio as follows:

$$T_{out} = T_{in} \times ioRatio \qquad \text{equation (a27)}$$

The bit difference computing unit 67 is electrically connected to the variable length encoder 57 and the target output bit updating unit 69, and designed to input a real number of outputting bits encoded by the variable length encoder 57, hereinlater referred to as "$T_{real}$", and input the target number of outputting bits $T_{out}$. The bit difference computing unit 67 is designed to then compute a difference between the target number of outputting bits $T_{out}$ and the real number of outputting bits $T_{real}$, hereinlater referred to as a "difference number of bits", i.e., "$T_{diff}$" as follows:

$$T_{diff} = T_{real} - T_{out} \qquad \text{equation (a28)}$$

The target output bit updating unit 69 is electrically connected to the target ratio computing unit 63, the input bit summing unit 65, and the bit difference computing unit 67. The target output bit updating unit 69 is designed to update the target number of outputting bits $T_{out}$ on the basis of the difference number of bits $T_{diff}$ as follows:

$$T_{out}=T_{out}-T_{diff} \qquad \text{equation (a29)}$$

The quantization parameter computing unit 71 is electrically connected to the target output bit updating unit 69 and designed to compute the reference quantization parameter Q(j) for each of macroblocks MB(j) on the basis of the target outputting bits $T_{out}$ updated by the target output bit updating unit 69 in accordance with the step II of the TM-5.

FIG. 17 shows the flowchart of the rate controlling process performed by the above conventional transcoder 60. The rate controlling process performed in the transcoder 60 comprises the steps B1 to B13. The steps B6 to B13 are almost the same as those of the steps A7 to A14, respectively, in the rate controlling process shown in FIG. 15 except for the step B7 wherein the utilization volume of the capacity of the virtual buffer is computed on the basis of the target number of outputting bits $T_{out}$ given by the target output bit updating unit 69 instead of the target number of bits $T_i$, $T_p$ or $T_b$ computed in the step A3 shown in FIG. 15. The same steps will be thus omitted from description for avoiding tedious repetition.

In the step B1, "1" is assigned to the picture number variable n. The step B1 then goes forward to the step B2 wherein the target ratio ioRatio is computed by the above equation (a26). In the following step B3, the difference number of bits $T_{diff}$ is computed for the present picture pic(n) by the above equation (a28). The step B3 then goes forward to the step B4 wherein the number of inputting bits $T_{in}$ is summed up within the first bit streams $b_1$. In the step B5, the target number of outputting bits $T_{out}$ is computed by the above equation (a27), and further updated by the above equation (a29).

In the second conventional transcoder 60 thus constructed, the inverse quantizer 53, however, cannot start the inverse-quantization process until the target transcoding frame is completely decoded, thereby causing the delay in the transcoding process.

Referring to FIGS. 18 and 19 of the drawings, there is shown another improvement of the above transcoder 50 as a third conventional transcoder 80. The third conventional transcoder 80 is also adaptable to perform the rate control without estimating the structure of GROUP OF PICTURES. As shown in FIG. 18, the third conventional transcoder 80 comprises an input terminal $a_1$ electrically connected to a first transmitting path and designed to input an input bit streams $b_3$ at the input bit rate, and an output terminal $a_2$ electrically connected to a second transmitting path and designed to output an output bit streams $b_4$ at the target bit rate. In the third conventional transcoder 80, the input bit streams b3 may have a format, non-adaptable for the MPEG-2, different from that of the bit streams $b_1$ of the first and second conventional transcoders 50 and 60. The input bit streams $b_3$ have information on the number of coding bits previously recorded thereon by the encoder, not shown.

The third conventional transcoder 80 comprises a variable length decoder 81 electrically connected to the input terminal $a_1$, and a rate controller 82 in addition to the inverse quantizer 53, the quantizer 55, and the variable length encoder 57 which are same in construction as those of the second transcoder 60 shown in FIG. 16. The rate controller 82 includes a target output bit updating unit 83, and a quantization parameter computing unit 85 in addition to the target ratio computing unit 63, and the bit difference computing unit 67 which are same as those of the second transcoder 60 shown in FIG. 16.

The third conventional transcoder 80 thus constructed can perform the rate control on the basis of the formation on the number of coding bits previously recorded in the input bit streams b3. The variable length decoder 81 is operated to decode the coded moving picture sequence signal within the third bit streams b3 to reconstruct the pictures and the information on the number of coding bits, and transmit the information to the inverse quantizer 53. The variable length decoder 81 is also operated to transmit the number of inputting bits $T_{in}$ to the target output bit updating unit 83.

The outputting bit updating unit 83 is designed to compute the target number of outputting bits $T_{out}$ on the basis of the number of inputting bits $T_{in}$ and the target ratio ioRatio by the above equation (a26). The quantization parameter computing unit 85 is designed to compute the reference quantization parameter Q(j) of the macroblocks MB(j) for each of pictures on the basis of the target number of outputting bits $T_{out}$ updated by the outputting bit updating unit 83 in accordance with the step II in the TM-5. The quantizer 55 is then operated to quantize the j-th macroblock MB(j) on the basis of the reference quantization parameter Q(j) given by the quantization parameter computing unit 85.

FIG. 19 shows the flowchart of the rate controlling process performed by the above third conventional transcoder 80. The rate controlling process performed in the transcoder 80 comprises the steps C1 to C13. All the steps C1 to C13 are the same as those of the steps B1 to B13, respectively, in the rate controlling process shown in FIG. 17 except for the step C4 wherein the number of inputting bits $T_{in}$ in the current picture pic(n) is derived from the third bit streams $b_3$ by the decoder 81 to compute the total number of inputting bits $T_{in}$.

The third conventional transcoder 80 thus constructed has information on the number of coding bits previously recorded in the third bit streams b3 thereby making it possible to solve the problem of the delay in the second conventional transcoder 60. The third conventional transcoder 80, however, encounters another problem to restrict the form of the inputted bit streams. Moreover, the encoder which is linked with the third transcoder 80 must provide with the above information on the number of coding bits to be recorded in the bit streams, thereby causing the delay of process in the encoder.

In the conventional transcoders 50, 60 and 80, the matrix of the inverse-quantization coefficients dequant is necessary for only the quantizer 55, but unnecessary for the transcoder itself to generate the desired bit streams. In order to eliminate the redundant matrix of the inverse-quantization coefficients dequant, there is proposed a fourth conventional transcoder 90 comprising a level converter 91 instead of the inverse quantizer 53 and the quantizer 55 of the transcoder 50, as shown in FIG. 20.

The level converter 91 is interposed between the variable length decoder 51 and the variable length encoder 57. The level converter 91 is designed to input the original picture data for each of pictures. The original picture data includes a matrix of original quantization coefficients level for each of macroblocks within the corresponding picture. The level converter 91 is electrically connected to the rate controller 59 and designed to input the second quantization parameter $Q_2$ from the rate controller 59.

The level converter 91 is further designed to convert the original picture data for each of pictures including the matrix of original quantization coefficients level into the objective picture data including the matrix of re-quantization coefficients tlevel without generating the matrix of the inverse-quantization coefficients dequant. The following equations (30a) and (31a) for the matrix of re-quantization coefficients tlevel are lead by eliminating the matrix of the inverse-quantization coefficients dequant from the above equations (a1), (a2), (a3) and (a4).

$$tlevel = \left\{\left(level + sign(level) \times \frac{1}{2}\right) \times \frac{Q_1}{Q_2}\right. \quad \text{equation (30a)}$$

or $$tlevel = level \times \frac{Q_1}{Q_2} + \frac{sign(level)}{2} \quad \text{equation (31a)}$$

where the above equation (30a) is used for the inter-picture, while the above equation (31a) is used for the intra-picture. The level converter 91 is thus operable to convert the original picture data, for each of pictures, into the second picture data with the first quantization parameter $Q_1$ and the second quantization parameter $Q_2$. The first quantization parameter $Q_1$ is decoded from the first bit streams $b_1$ by the variable length decoder 51, while the second quantization parameter $Q_2$ is obtained from the rate controller 59.

In the fourth conventional transcoder 90, the rate controller 59 is designed to perform the rate control over the encoding process in the transcoder 90 according to the TM-5. The variable length encoder 57 is electrically connected to the level converter 91 and to input the above matrix of re-quantization coefficients tlevel from the level converter 91.

The fourth conventional transcoder 90 thus constructed can efficiently perform the transcoding process at high speed without storing the matrix of inverse-quantization coefficients dequant in a memory.

The above conventional transcoders 50, 60, 80 and 90, however, encounter another problem with the rate-distortion performance in converting the quantization level occurred as a result of the re-quantization operation since they cannot obtain all the information on original picture data before the quantization operation. In short, the rate-distortion performance in converting the quantization level is unstable and variable in accordance with the first and second quantization parameters and the level of the original quantization coefficients level. Therefore, as the amount of reduced information becomes larger, the quantization error is liable to increase, thereby causing unstable rate control in transcoding.

The applicant of the present application filed a U.S. patent application Ser. No. 09/604,973 on Jun. 28, 2000.

The applicant disclosed therein an apparatus, a method and a computer program product for transcoding a coded moving picture sequence signal, being operable to compute an optimized re-quantization parameter on the basis of the inverse-quantization parameter and the previously computed re-quantization parameter in consideration of the characteristics of the rate-distortion performance dependent on the re-quantization parameter and the inverse-quantization parameter.

The apparatus disclosed therein comprising an inverse quantizer for performing the inverse-quantization operation and a quantizer for performing the quantization operation, is characterized in that the apparatus further comprises quantization parameter switching means for switching the quantization parameter in consideration of the characteristics of the rate-distortion performance dependent on the inputted quantization parameter, thereby making it possible for the apparatus to minimize the quantization error occurred when the matrix of original quantization coefficients is transformed to the matrix of re-quantization coefficients.

In the meantime, different techniques have been found such as data partitioning and SNR scalability for dividing picture signals conveying picture information into two separate picture signals consisting of base layer picture signal indicative of basic picture information and enhancement layer picture signal indicative of high quality picture information in order to prevent the quality of picture from deteriorating.

More particularly, the data partitioning provides a method of dividing bit streams conveying picture information into two separate bit streams consisting of base layer bit streams conveying low-frequency DCT coefficients and enhancement layer bit streams conveying high-frequency DCT coefficients before encoding, and the base layer bit streams and enhancement layer bit streams thus divided are recombined before decoding. Original picture information can be roughly decoded and reproduced from the base layer bit streams conveying low-frequency DCT coefficients, but not from the enhancement layer bit streams conveying high-frequency DCT coefficients alone. The high-quality original picture information can be decoded and reproduced from the recombination of the base layer bit streams conveying low-frequency DCT coefficients and the enhancement layer bit streams conveying high-frequency DCT coefficients.

The SNR scalability provides a method of dividing picture signals containing picture information into two separate picture signals consisting of base layer picture signals containing low-SNR image information and enhancement layer picture signals containing auxiliary information before encoding. The method of SNR scalability will be described in detail. The original picture signals have original DCT coefficients. The quantizer is operated to roughly quantize base layer bit picture signals containing low-SNR image information to generate low-SNR bit streams. The inverse quantizer is operated to inversely quantize the low-SNR bit streams thus generated to roughly reproduce DCT coefficients. Then, the difference information between the original DCT coefficients and the reproduced DCT coefficients is extracted and quantized to generate the enhancement layer picture signals. The enhancement layer picture signals thus generated are used as auxiliary information in combination with the base layer picture signals (low-SNR signals) to reproduce high-SNR signals.

The above described methods, however, encounter a problem of reducing the quality of service, i.e., QoS. The transcoding process above described is non-reversible. The transcoder, in general, is operated to decode and inversely quantize DCT coefficients of input bit streams and re-quantize the DCT coefficients thus inversely quantized with re-quantization parameters greater then the original quantization parameters to reduce the bit rate. This means that the input bit streams before the transcoding operation cannot be reproduced from the transcoded bit streams. This leads to the fact that the QoS for the input bit streams cannot be reproduced.

The data partitioning method permits to divide bit streams into two separate bit streams consisting of base layer bit streams indicative of low-frequency DCT coefficients and enhancement layer bit streams indicative of high-frequency DCT coefficients before encoding. There is, however, provided no method of dividing MPEG-2 bit streams in conformance with MP@ML, which are not in a hierarchical structure, into base layer bit streams and enhancement layer bit streams. Furthermore, although the data partitioning method may permit to divide bit streams into the base layer bit streams and enhancement layer bit streams before encoding, a decoder conforming to MP@ML cannot decode the base layer bit streams and enhancement layer bit streams thus divided.

According to the syntax of the data partitioning, the code specifying a boundary between low-frequency coefficients and high-frequency coefficients is defined as "Priority_break_point", which makes it possible for a decoder to distinguish the low-frequency coefficients from the high-frequency coefficients. The decoder conforming to MP@ML, on the other hand, cannot recognize "Priority_break_point". Furthermore, the bit streams indicative of low-frequency coefficients include no EOB code, thereby making it impossible for the MP@ML decoder to reproduce the bit streams indicative of low-frequency coefficients. This leads to the fact that the data partitioning method requires a decoder dedicated to the data partitioning method in place of the decoder conforming to MP@ML.

Similarly to the data partitioning, the SNR scalability method permits to divide bit streams into two separate bit streams consisting of base layer bit streams containing low-SNR signals and enhancement layer bit streams containing the auxiliary information before encoding. An encoder conforming to MP@ML, however, cannot divide bit streams into base layer bit streams containing low-SNR signals and enhancement layer bit streams containing the auxiliary information and encode the base layer bit streams and enhancement layer bit streams thus divided. Nor can a decoder conforming to MP@ML decode the base layer bit streams and the enhancement layer bit streams. This leads to the fact that the SNR scalability method requires an encoder and a decoder dedicated to the SNR scalability in place of the encoder and decoder conforming to MP@ML.

Furthermore, the base layer bit streams and the enhancement layer bit streams are required to be processed in parallel, thereby making it complex and difficult to design such SNR scalability conformable encoder and decoder. Moreover, the SNR scalability conformable decoder is operated to receive the base layer bit streams and the enhancement layer bit streams to reproduce and output original picture signals but not in the form of bit streams. This means that the picture signal thus reproduced and outputted must be transcoded again if it is required be in the form of bit streams.

That the above data partitioning and SNR scalability operations require respective dedicated encoders and decoders is attributed to the fact that the respective decoders and encoders are operative to perform the process of dividing bit streams into base layer bit streams and the enhancement layer bit streams, and the process of recombining the base layer bit streams and the enhancement layer bit streams to reconstruct original bit streams.

SUMMARY OF THE INVENTION

It is therefore an object of the present invention to provide an apparatus for transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is another object of the present invention to provide a method of transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is further object of the present invention to provide a computer program product for transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is a still further object of the present invention to provide an apparatus for merging a second coded moving picture sequence signal and a differential coded moving picture sequence signal, which is a difference between the first coded moving picture sequence signal and a second coded moving picture sequence signal, to reconstruct the first coded moving picture sequence signal.

It is a yet further object of the present invention to provide a method of merging a second coded moving picture sequence signal and a differential coded moving picture sequence signal, which is a difference between the first coded moving picture sequence signal and a second coded moving picture sequence signal, to reconstruct the first coded moving picture sequence signal.

It is further object of the present invention to provide a computer program for merging a second coded moving picture sequence signal and a differential coded moving picture sequence signal, which is a difference between the first coded moving picture sequence signal and a second coded moving picture sequence signal, to reconstruct the first coded moving picture sequence signal.

In accordance with a first aspect of the invention, there is provided a coded signal separating and merging system comprising: a coded signal separating apparatus for inputting a first coded moving picture sequence signal to separate into a second coded moving picture sequence signal and a differential coded moving picture sequence signal; and a coded signal merging apparatus for inputting the second coded moving picture sequence signal and the differential coded moving picture sequence signal to reconstruct the first coded moving picture sequence signal.

The aforesaid coded signal separating apparatus includes: inputting means for inputting the first coded moving picture sequence signal therethrough, the first coded moving picture sequence signal generated as a result of encoding original moving picture sequence signal and consisting of a series of first picture information having first coefficient information, the first coefficient information including a matrix of first coefficients; coded signal converting means for converting the first coded moving picture sequence signal inputted through the inputting means to generate the second coded moving picture sequence signal, the second coded moving picture sequence signal consisting of a series of second picture information having second coefficient information, the second coefficient information including a matrix of second coefficients, each of the first coded moving picture sequence signal, and the second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; differential coded signal generating means for inputting the first coded moving picture sequence signal and the second coded moving picture sequence signal from the coded signal converting means to generate a differential coded moving picture sequence signal on the basis of the first coefficient information obtained from the series of first picture information of the first coded moving picture sequence signal, and the second coefficient information obtained from the series of the second picture information of the second coded moving picture sequence signal, the differential coded moving picture sequence signal being a difference between the first coded moving picture sequence signal and the second coded moving picture sequence signal; separating storage means for selectively storing the first coded moving picture sequence signal, the second coded moving picture sequence signal, and the differential coded moving picture sequence signal; and first transmission means for selectively transmitting the first coded moving picture sequence signal, the second coded moving picture sequence signal, and the differential coded moving picture sequence signal to the coded signal merging apparatus.

The aforesaid coded signal merging apparatus includes first receiving means for receiving a base coded moving picture sequence signal transmitted by the first transmission means from the coded signal separating apparatus, the base coded moving picture sequence signal being any one of the first coded moving picture sequence signal, the second coded moving picture sequence signal, and the differential coded moving picture sequence signal; merging storage means for storing the base coded moving picture sequence signal received by the first receiving means; request signal determining means for determining a request signal for a requested coded moving picture sequence signal on the basis of the base coded moving picture sequence signal stored by the merging storage means; and request signal transmission means for transmitting the request signal for the requested coded moving picture sequence signal determined by the request signal determining means to the coded signal separating apparatus.

In the aforesaid coded signal separating apparatus may further include: request signal receiving means for receiving the request signal transmitted by the request signal transmission means from the coded signal merging apparatus; separating coded signal extracting means for extracting the requested coded moving picture sequence signal from the separating storage means in response to the request signal; and second transmission means for transmitting the requested coded moving picture sequence signal extracted by the separating coded signal extracting means to the coded signal merging apparatus.

In the aforesaid coded signal merging apparatus may further include: second receiving means for receiving the requested coded moving picture sequence signal transmitted by the second transmission means from the coded signal separating apparatus; merging coded signal extracting means for extracting the base coded moving picture sequence signal from the merging storage means; merging means for merging the base coded moving picture sequence signal extracted by the merging coded signal extracting means with the requested coded moving picture sequence signal received by the second receiving means on the basis of the second coefficient information obtained from the series of second picture information of the second coded moving picture sequence signal, and the differential coefficient information obtained from the differential coded signal to reconstruct the first coded moving picture sequence signal; and outputting means for inputting the reconstructed first coded moving picture sequence signal from the merging means to be outputted therethrough.

In the above mentioned coded signal separating and merging system, the separating storage means of the coded signal separating apparatus is operative to store the differential coded moving picture sequence signal generated by the differential coded signal generating means, the first transmission means is operative to transmit the second coded moving picture sequence signal generated by the coded signal converting means, the first receiving means of the coded signal merging apparatus is operative to receive the second coded moving picture sequence signal transmitted by the first transmission means, the merging storage means is operative to store the second coded moving picture sequence signal received by the first receiving means, the request signal determining means is operative to determine a request signal for a requested differential coded moving picture sequence signal on the basis of the second coded moving picture sequence signal stored by the merging storage means, the request signal transmission means is operative to transmit the request signal for the requested differential coded moving picture sequence signal determined by the request signal determining means, the request signal receiving means of the coded signal separating apparatus is operative to receive the request signal transmitted by the request signal transmission means, the separating coded signal extracting means is operative to extract the requested differential coded moving picture sequence signal from the separating storage means in response to the request signal, the second transmission means is operative to transmit the requested differential coded moving picture sequence signal extracted by the separating coded signal extracting means to the coded signal merging apparatus, the second receiving means of the coded signal merging apparatus is operative to receive the requested differential coded moving picture sequence signal transmitted by the second transmission means from the coded signal separating apparatus, the merging coded signal extracting means is operative to extract the second coded moving picture sequence signal from the merging storage means, and the merging means is operative to merge the second coded moving picture sequence signal extracted by the merging coded signal extracting means with the requested differential coded moving picture sequence signal received by the second receiving means to reconstruct the first coded moving picture sequence signal.

In the above mentioned coded signal separating and merging system, the coded signal merging apparatus further includes second coded moving picture sequence signal decoding means for decoding the second coded moving picture sequence signal received by the first receiving means.

In the above mentioned coded signal separating and merging system, the coded signal merging apparatus further includes editing means for cutting and combining component parts of the second coded moving picture sequence signal stored by the merging storage means to generate an edited second coded moving picture sequence signal in a desired size, the request signal determining means is operative to determine a request signal for a requested differential coded moving picture sequence signal on the basis of the edited second coded moving picture sequence signal generated by the editing means, the request signal transmission means is operative to transmit the request signal for the requested differential coded moving picture sequence signal determined by the request signal determining means to the coded signal separating apparatus, the separating coded signal extracting means of the separating coded signal separating apparatus is operative to extract the requested differential coded moving picture sequence signal from the separating storage means in response to the request signal, and the merging means is operative to merge the edited second coded moving picture sequence signal generated by the editing means with the requested differential coded moving picture sequence signal received by the second receiving means to reconstruct the first coded moving picture sequence signal in the desired size.

In the above mentioned coded signal separating and merging system, the separating storage means of the coded signal separating apparatus is operative to store the second coded moving picture sequence signal generated by the coded signal converting means, the first transmission means is operative to transmit the differential coded moving picture sequence signal generated by the differential coded signal generating means to the coded signal merging apparatus, the first receiving means of the coded signal merging apparatus is operative to receive the differential coded moving picture sequence signal transmitted by the first transmission means, the merging storage means is operative to store the differential coded moving picture sequence signal received by the first receiving means, request signal determining means is operative to determine a request signal for a requested second coded moving picture sequence signal on the basis of the differential coded moving picture sequence signal stored by the merging storage means, the request signal transmission means is operative to transmit the request signal for the requested second coded moving picture sequence signal determined by the request signal determining means, the request signal receiving means of the coded signal separating apparatus is operative to receive the request signal transmitted by the request signal transmission means, the separating coded signal extracting means is operative to extract the requested second coded moving picture sequence signal from the separating storage means in response to the request signal, the second transmission means is operative to transmit the requested second coded moving picture sequence signal extracted by the separating coded signal extracting means to the coded signal merging apparatus, the second receiving means of the coded signal merging apparatus is operative to receive the requested second coded moving picture sequence signal transmitted by the second transmission means from the coded signal separating apparatus, the merging coded signal extracting means is operative to extract the differential coded moving picture sequence signal stored by the merging storage means, and the merging means is operative to merge the differential coded moving picture sequence signal extracted by the merging coded signal extracting means with the second coded moving picture sequence signal received by the second receiving means to reconstruct the first coded moving picture sequence signal.

In the above mentioned coded signal separating and merging system, the first transmission means of the coded signal separating apparatus is operative to transmit the differential coded moving picture sequence signal by way of broadcasting.

In the above mentioned coded signal separating and merging system, the coded signal merging apparatus further includes reconstructed first coded signal storage means for storing the reconstructed first coded moving picture sequence signal reconstructed by the merging means.

In the aforesaid coded signal separating and merging system, the coded signal merging apparatus further includes: decoding means for decoding the first coded moving picture sequence signal or the second coded moving picture sequence signal; and merging coded signal converting means for inputting the first coded moving picture sequence signal to generate the second coded moving picture sequence signal, the first transmission means of the coded signal separating apparatus is operative to transmit the first coded moving picture sequence signal, the separating storage means is operative to store the differential coded moving picture sequence signal generated by the differential coded signal generating means, the first receiving means of the coded signal merging apparatus is operative to receive the first coded moving picture sequence signal transmitted by the first transmission means from the coded signal separating apparatus, the decoding means is operative to decode the first coded moving picture sequence signal received by the first receiving means, the merging coded signal converting means is operative to input the first coded moving picture sequence signal received by the first receiving means to generate the second coded moving picture sequence signal, the merging storage means is operative to store the second coded moving picture sequence signal generated by the merging coded signal converting means, the request signal determining means is operative to determine a request signal for a requested differential coded moving picture sequence signal on the basis of the second coded moving picture sequence signal stored by the merging storage means, the request signal transmission means is operative to transmit the request signal for the requested differential coded moving picture sequence signal determined by the request signal determining means to the coded signal separating apparatus, the request signal receiving means of the coded signal separating apparatus is operative to receive the request signal transmitted by the request signal transmission means from the coded signal merging apparatus, the separating coded signal extracting means is operative to extract the requested differential coded moving picture sequence signal from the separating storage means in response to the request signal, the second transmission means is operative to transmit the requested differential coded moving picture sequence signal extracted by the separating coded signal extracting means to the coded signal merging apparatus, the second receiving means of the coded signal merging apparatus is operative to receive the requested differential coded moving picture sequence signal transmitted by the second transmission means from the coded signal separating apparatus, the merging coded signal extracting means is operative to extract the second coded moving picture sequence signal from the merging storage means, and the merging means is operative to merge the second coded moving picture sequence signal extracted by the merging coded signal extracting means with the requested differential coded moving picture sequence signal received by the second receiving means to reconstruct the first coded moving picture sequence signal in the desired size.

In the aforesaid coded signal separating and merging system, the coded signal merging apparatus further includes: decoding means for decoding the first coded moving picture sequence signal or the second coded moving picture sequence signal; and merging differential coded signal generating means for inputting the first coded moving picture sequence signal to generate the differential coded moving picture sequence signal. The first transmission means of the coded signal separating apparatus is operative to transmit the first coded moving picture sequence signal, In the above mentioned coded signal separating and merging system, the separating storage means is operative to store the second coded moving picture sequence signal generated by the coded signal converting means, the first receiving means of the coded signal merging apparatus is operative to receive the first coded moving picture sequence signal transmitted by the first transmission means from the coded signal separating apparatus, the decoding means is operative to decode the first coded moving picture sequence signal received by the first receiving means, the merging differential coded signal generating means is operative to input the first coded moving picture sequence signal received by the first receiving means to generate the differential coded moving picture sequence signal, the merging storage means is operative to store the differential coded moving picture sequence signal generated by the merging coded signal converting means, the request signal determining means is operative to determine a request signal for a requested second coded moving picture sequence signal on the basis of the differential coded moving picture sequence signal stored by the merging storage means, the request signal transmission means is operative to transmit the request signal for the requested second coded moving picture sequence signal determined by the request signal determining means to the coded signal separating apparatus, the request signal receiving means of the coded signal separating apparatus is operative to receive the request signal transmitted by the request signal transmission means from the coded signal merging apparatus, the separating coded signal extracting means is operative to extract the requested second coded moving picture sequence signal from the separating storage means in response to the request signal, the second transmission means is operative to transmit the requested second coded moving picture sequence signal extracted by the separating coded signal extracting means to the coded signal merging apparatus, the second receiving means of the coded signal merging apparatus is operative to receive the requested second coded moving picture sequence signal transmitted by the second transmission means from the coded signal separating apparatus, the merging coded signal extracting means is operative to extract the differential coded moving picture sequence signal from the merging storage means, and the merging means is operative to merge the differential coded moving picture sequence signal extracted by the merging coded signal extracting means with the requested second coded moving picture sequence signal received by the second receiving means to reconstruct the first coded moving picture sequence signal in the desired size.

In accordance with a second aspect of the present invention, there is provided a coded signal separating apparatus for inputting a first coded moving picture sequence signal to separate into a second coded moving picture sequence signal and a differential coded moving picture sequence signal comprising: inputting means for inputting the first coded moving picture sequence signal therethrough, the first coded moving picture sequence signal generated as a result of encoding original moving picture sequence signal and consisting of a series of first picture information having first coefficient information, the first coefficient information including a matrix of first coefficients; coded signal converting means for converting the first coded moving picture sequence signal inputted through the inputting means to generate the second coded moving picture sequence signal, the second coded moving picture sequence signal consisting of a series of second picture information having second coefficient information, the second coefficient information including a matrix of second coefficients, each of the first coded moving picture sequence signal, and the second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; differential coded signal generating means for inputting the first coded moving picture sequence signal and the second coded moving picture sequence signal from the coded signal converting means to generate a differential coded moving picture sequence signal on the basis of the first coefficient information obtained from the series of first picture information of the first coded moving picture sequence signal, and the second coefficient information obtained from the series of the second picture information of the second coded moving picture sequence signal, the differential coded moving picture sequence signal being a difference between the first coded moving picture sequence signal and the second coded moving picture sequence signal; separating storage means for selectively storing the first coded moving picture sequence signal, the second coded moving picture sequence signal, and the differential coded moving picture sequence signal; first transmission means for selectively transmitting the first coded moving picture sequence signal, the second coded moving picture sequence signal, and the differential coded moving picture sequence signal; request signal receiving means for receiving a request signal indicative of a requested coded moving picture sequence signal to be transmitted, the request signal indicative of the requested coded moving picture sequence signal being determined on the basis of the first coded moving picture sequence signal, the second coded moving picture sequence signal, or the differential coded moving picture sequence signal; separating coded signal extracting means for extracting the requested coded moving picture sequence signal from the separating storage means in response to the request signal; and second transmission means for transmitting the requested coded moving picture sequence signal extracted by the separating coded signal extracting means.

In the aforesaid coded signal separating apparatus, the separating storage means is operative to store the differential coded moving picture sequence signal generated by the differential coded signal generating means, the first transmission means is operative to transmit the second coded moving picture sequence signal generated by the coded signal converting means, the request signal receiving means is operative to receive the request signal indicative of a requested differential coded moving picture sequence signal to be transmitted, the request signal indicative of the requested differential coded moving picture sequence signal being determined on the basis of the second coded moving picture sequence signal, the separating coded signal extracting means is operative to extract the requested differential coded moving picture sequence signal from the separating storage means in response to the request signal, and the second transmission means is operative to transmit the requested differential coded moving picture sequence signal extracted by the separating coded signal extracting means.

In the aforesaid coded signal separating apparatus, the request signal receiving means is operative to receive the request signal indicative of the requested differential coded moving picture sequence signal to be transmitted, the request signal indicative of the requested differential coded moving picture sequence signal being determined on the basis of an edited second coded moving picture sequence signal generated by cutting and combining component parts of the second coded moving picture sequence signal, the separating coded signal extracting means is operative to extract the requested differential coded moving picture sequence signal from the separating storage means in response to the request signal, and the second transmission means is operative to transmit the requested differential coded moving picture sequence signal extracted by the separating coded signal extracting means.

In the aforesaid coded signal separating apparatus, the separating storage means is operative to store the second coded moving picture sequence signal generated by the coded signal converting means, the first transmission means is operative to transmit the differential coded moving picture sequence signal generated by the differential coded signal generating means, the request signal receiving means is operative to receive the request signal indicative of the requested second coded moving picture sequence signal to be transmitted, the request signal indicative of the requested second coded moving picture sequence signal being determined on the basis of the differential coded moving picture sequence signal, the separating coded signal extracting means is operative to extract the requested second coded moving picture sequence signal from the separating storage means in response to the request signal, and the second transmission means is operative to transmit the requested second coded moving picture sequence signal extracted by the separating coded signal extracting means.

In the aforesaid coded signal separating apparatus, the first transmission means is operative to transmit the differential coded moving picture sequence signal by way of broadcasting.

In the aforesaid coded signal separating apparatus, the first transmission means is operative to transmit the first coded moving picture sequence signal, the separating storage means is operative to store the differential coded moving picture sequence signal generated by the differential coded signal generating means, the request signal receiving means is operative to receive the request signal indicative of a requested differential coded moving picture sequence signal to be transmitted, the request signal indicative of the requested differential coded moving picture sequence signal being determined on the basis of a second coded moving picture sequence signal generated in accordance with the first coded moving picture sequence signal, the separating coded signal extracting means is operative to extract the requested differential coded moving picture sequence signal from the separating storage means in response to the request signal, and the second transmission means is operative to transmit the requested differential coded moving picture sequence signal extracted by the separating coded signal extracting means.

In the aforesaid coded signal separating apparatus, the first transmission means is operative to transmit the first coded moving picture sequence signal, the separating storage means is operative to store the second coded moving picture sequence signal generated by the coded signal converting means, the request signal receiving means is operative to receive the request signal indicative of a requested second coded moving picture sequence signal to be transmitted, the request signal indicative of the requested second coded moving picture sequence signal being determined on the basis of a differential coded moving picture sequence signal generated in accordance with the first coded moving picture sequence signal, the separating coded signal extracting means is operative to extract the requested second coded moving picture sequence signal from the separating storage means in response to the request signal, and the second transmission means is operative to transmit the requested second coded moving picture sequence signal extracted by the separating coded signal extracting means.

In accordance with a third aspect of the present invention, there is provided a coded signal merging apparatus for inputting a second coded moving picture sequence signal and a differential coded moving picture sequence signal to reconstruct a first coded moving picture sequence signal, the second coded moving picture sequence signal generated as a result of transcoding the first coded moving picture sequence signal and consisting of a series of second picture information having second coefficient information, the second coefficient information including a matrix of second coefficients, the first coded moving picture sequence signal generated as a result of encoding original moving picture sequence signal and consisting of a series of first picture information having first coefficient information, the first coefficient information including a matrix of first coefficients, the differential coded moving picture sequence signal being a difference between the first coded moving picture sequence signal and the second coded moving picture sequence signal, the differential coded moving picture sequence signal including differential coefficient information between the first coefficient information and the second coefficient information, each of the first coded moving picture sequence signal, the second coded moving picture sequence signal, and the differential coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks, the coded signal merging apparatus comprising: first receiving means for receiving a base coded moving picture sequence signal, the base coded moving picture sequence signal being any one of the first coded moving picture sequence signal, the second coded moving picture sequence signal, and the differential coded moving picture sequence signal; merging storage means for storing the base coded moving picture sequence signal received by the first receiving means; request signal determining means for determining a request signal for a requested coded moving picture sequence signal on the basis of the base coded moving picture sequence signal stored by the merging storage means; request signal transmission means for transmitting the request signal for the requested coded moving picture sequence signal determined by the request signal determining means; second receiving means for receiving the requested coded moving picture sequence signal; merging coded signal extracting means for extracting the base coded moving picture sequence signal from the merging storage means; merging means for merging the base coded moving picture sequence signal extracted by the merging coded signal extracting means with the requested coded moving picture sequence signal received by the second receiving means to reconstruct the first coded moving picture sequence signal on the basis of the second coefficient information obtained from the series of second picture information of the second coded moving picture sequence signal, and the differential coefficient information obtained from the differential coded signal; and outputting means for inputting the reconstructed first coded moving picture sequence signal from the merging means to be outputted therethrough.

In the aforesaid coded signal merging apparatus, the first receiving means is operative to receive the second coded moving picture sequence signal, the merging storage means is operative to store the second coded moving picture sequence signal received by the first receiving means, the request signal determining means is operative to determine a request signal for a requested differential coded moving picture sequence signal on the basis of the second coded moving picture sequence signal stored by the merging storage means, the request signal transmission means is operative to transmit a request signal for the requested differential coded moving picture sequence signal determined by the request signal determining means, the second receiving means is operative to receive the requested differential coded moving picture sequence signal, the merging coded signal extracting means is operative to extract the second coded moving picture sequence signal from the merging storage means, and the merging means is operative to merge the second coded moving picture sequence signal extracted by the merging coded signal extracting means with the requested differential coded moving picture sequence signal received by the second receiving means to reconstruct the first coded moving picture sequence signal.

The aforesaid coded signal merging apparatus may further comprise second coded moving picture sequence signal decoding means for decoding the second coded moving picture sequence signal received by the first receiving means.

The aforesaid coded signal merging apparatus may further comprise editing means for cutting and combining component parts of the second coded moving picture sequence signal stored by the merging storage means to generate an edited second coded moving picture sequence signal in a desired size, in which the request signal determining means is operative to determine a request signal for a requested differential coded moving picture sequence signal on the basis of the edited second coded moving picture sequence signal generated by the editing means, the request signal transmission means is operative to transmit the request signal for the requested differential coded moving picture sequence signal determined by the request signal determining means, and the merging means is operative to merge the edited second coded moving picture sequence signal generated by the editing means with the requested differential coded moving picture sequence signal received by the second receiving means to reconstruct the first coded moving picture sequence signal in the desired size.

In the aforesaid coded signal merging apparatus, the first receiving means is operative to receive the differential coded moving picture sequence signal, the merging storage means is operative to store the differential coded moving picture sequence signal received by the first receiving means, the request signal determining means is operative to determine a request signal for a requested second coded moving picture sequence signal on the basis of the differential coded moving picture sequence signal stored by the merging storage means, the request signal transmission means is operative to transmit the request signal for the requested second coded moving picture sequence signal determined by the request signal determining means, the second receiving means is operative to receive the requested second coded moving picture sequence signal, the merging coded signal extracting means is operative to extract the differential coded moving picture sequence signal stored by the merging storage means, and the merging means is operative to merge the differential coded moving picture sequence signal extracted by the merging coded signal extracting means with the second coded moving picture sequence signal received by the second receiving means to reconstruct the first coded moving picture sequence signal.

In the aforesaid coded signal merging apparatus, the first receiving means is operative to receive the differential coded moving picture sequence signal by way of broadcasting.

The aforesaid coded signal merging apparatus may further comprise reconstructed first coded signal storage means for storing the reconstructed first coded moving picture sequence signal reconstructed by the merging means.

The aforesaid coded signal merging apparatus may further comprise: decoding means for decoding the first coded moving picture sequence signal or the second coded moving picture sequence signal; and merging coded signal converting means for inputting the first coded moving picture sequence signal to generate the second coded moving picture sequence signal, in which the first receiving means is operative to receive the first coded moving picture sequence signal, the decoding means is operative to decode the first coded moving picture sequence signal received by the first receiving means, the merging coded signal converting means is operative to input the first coded moving picture sequence signal received by the first receiving means to generate the second coded moving picture sequence signal, the merging storage means is operative to store the second coded moving picture sequence signal generated by the merging coded signal converting means, the request signal determining means is operative to determine a request signal for a requested differential coded moving picture sequence signal on the basis of the second coded moving picture sequence signal stored by the merging storage means, the request signal transmission means is operative to transmit the request signal for the requested differential coded moving picture sequence signal determined by the request signal determining means, the second receiving means is operative to receive the requested differential coded moving picture sequence signal, the merging coded signal extracting means is operative to extract the second coded moving picture sequence signal from the merging storage means, and the merging means is operative to merge the second coded moving picture sequence signal extracted by the merging coded signal extracting means with the requested differential coded moving picture sequence signal received by the second receiving means to reconstruct the first coded moving picture sequence signal in the desired size.

The aforesaid coded signal merging apparatus may further comprise: decoding means for decoding the first coded moving picture sequence signal or the second coded moving picture sequence signal; and merging differential coded signal generating means for inputting the first coded moving picture sequence signal to generate the differential coded moving picture sequence signal, the first receiving means is operative to receive the first coded moving picture sequence signal, the decoding means is operative to decode the first coded moving picture sequence signal received by the first receiving means, the merging differential coded signal generating means is operative to input the first coded moving picture sequence signal received by the first receiving means to generate the differential coded moving picture sequence signal, the merging storage means is operative to store the differential coded moving picture sequence signal generated by the merging coded signal converting means, the request signal determining means is operative to determine a request signal for a requested second coded moving picture sequence signal on the basis of the differential coded moving picture sequence signal stored by the merging storage means, the request signal transmission means is operative to transmit the request signal for the requested second coded moving picture sequence signal determined by the request signal determining means, the second receiving means is operative to receive the requested second coded moving picture sequence signal, the merging coded signal extracting means is operative to extract the differential coded moving picture sequence signal from the merging storage means, and the merging means is operative to merge the differential coded moving picture sequence signal extracted by the merging coded signal extracting means with the requested second coded moving picture sequence signal received by the second receiving means to reconstruct the first coded moving picture sequence signal in the desired size.

In accordance with a fourth aspect of the present invention, there is provided a multi-output coded signal separating apparatus for inputting a first coded moving picture sequence signal to separate into a plurality of second coded moving picture sequence signals and a plurality of differential coded moving picture sequence signals comprising: a plurality of coded signal separating units including a 1st coded signal separating unit up to a m-th coded signal separating unit wherein m is an integer not less than two; the 1st coded signal separating unit being operative to input the first coded moving picture sequence signal to separate into a 1st second coded moving picture sequence signal and a 1st differential coded moving picture sequence signal, the 1st differential coded moving picture sequence signal being a difference between the first coded moving picture sequence signal and the 1st second coded moving picture sequence signal, and the i-th coded signal separating unit being operative to input an (i−1)-th second coded moving picture sequence signal to separate into an i-th second coded moving picture sequence signal and an i-th differential coded moving picture sequence signal, the i-th differential coded moving picture sequence signal being a difference between the (i−1)-th second coded moving picture sequence signal and the i-th second coded moving picture sequence signal wherein i is an integer equal to or less than m.

The aforesaid 1st coded signal separating unit includes: 1st inputting means for inputting the first coded moving picture sequence signal therethrough, the first coded moving picture sequence signal generated as a result of encoding original moving picture sequence signal and consisting of a series of first picture information having first coefficient information, the first coefficient information including a matrix of first coefficients; 1st coded signal converting means for converting the first coded moving picture sequence signal inputted through the 1st inputting means to generate a 1st second coded moving picture sequence signal, the 1st second coded moving picture sequence signal consisting of a series of 1st second picture information having 1st second coefficient information, the 1st second coefficient information including a matrix of 1st second coefficients, each of the first coded moving picture sequence signal, and the 1st second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; 1st differential coded signal generating means for inputting the first coded moving picture sequence signal and the 1st second coded moving picture sequence signal from the 1st coded signal converting means to generate a 1st differential coded moving picture sequence signal on the basis of the first coefficient information obtained from the series of first picture information of the first coded moving picture sequence signal, and the 1st second coefficient information obtained from the series of the 1st second picture information of the 1st second coded moving picture sequence signal, the 1st differential coded moving picture sequence signal being a difference between the first coded moving picture sequence signal and the 1st second coded moving picture sequence signal; 1st separating storage means for selectively storing the first coded moving picture sequence signal, the 1st second coded moving picture sequence signal, and the 1st differential coded moving picture sequence signal; 1st first transmission means for selectively transmitting the first coded moving picture sequence signal, the 1st second coded moving picture sequence signal, and the 1st differential coded moving picture sequence signal; 1st request signal receiving means for receiving a request signal indicative of a requested coded moving picture sequence signal to be transmitted, the request signal indicative of the requested coded moving picture sequence signal being determined on the basis of the first coded moving picture sequence signal, the 1st second coded moving picture sequence signal, or the 1st differential coded moving picture sequence signal; 1st separating coded signal extracting means for extracting the requested coded moving picture sequence signal from the 1st separating storage means in response to the request signal; and 1st second transmission means for transmitting the requested coded moving picture sequence signal extracted by the 1st separating coded signal extracting means.

The aforesaid i-th coded signal separating unit includes: i-th inputting means for inputting the (i−1)-th second coded moving picture sequence signal therethrough from the (i−1)-th coded signal separating unit, the (i−1)-th second coded moving picture sequence signal generated as a result of encoding original moving picture sequence signal and consisting of a series of (i−1)-th second picture information having (i−1)-th second coefficient information, the (i−1)-th second coefficient information including a matrix of (i−1)-th second coefficients; i-th coded signal converting means for converting the (i−1)-th second coded moving picture sequence signal inputted through the i-th inputting means to generate the i-th second coded moving picture sequence signal, the i-th second coded moving picture sequence signal consisting of a series of i-th second picture information having i-th second coefficient information, the i-th second coefficient information including a matrix of i-th second coefficients, each of the (i−1)-th second coded moving picture sequence signal, and the i-th second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; i-th differential coded signal generating means for inputting the (i–1)-th second coded moving picture sequence signal and the i-th second coded moving picture sequence signal from the i-th coded signal converting means to generate an i-th differential coded moving picture sequence signal on the basis of the (i–1)-th second coefficient information obtained from the series of (i–1)-th second picture information of the (i–1)-th second coded moving picture sequence signal, and the i-th second coefficient information obtained from the series of the i-th second picture information of the i-th second coded moving picture sequence signal, the i-th differential coded moving picture sequence signal being a difference between the (i–1)-th second coded moving picture sequence signal and the i-th second coded moving picture sequence signal; i-th separating storage means for selectively storing the (i–1)-th second coded moving picture sequence signal, the i-th second coded moving picture sequence signal, and the i-th differential coded moving picture sequence signal; i-th first transmission means for selectively transmitting the (i–1)-th second coded moving picture sequence signal, the i-th second coded moving picture sequence signal, and the i-th differential coded moving picture sequence signal; i-th request signal receiving means for receiving a request signal indicative of a requested coded moving picture sequence signal to be transmitted, the request signal indicative of the requested coded moving picture sequence signal being determined on the basis of the (i–1)-th second coded moving picture sequence signal, the i-th second coded moving picture sequence signal, or the i-th differential coded moving picture sequence signal; i-th separating coded signal extracting means for extracting the requested coded moving picture sequence signal from the i-th separating storage means in response to the request signal; and i-th second transmission means for transmitting the requested coded moving picture sequence signal extracted by the i-th separating coded signal extracting means.

In accordance with a fifth aspect of the present invention, there is provided a multi-input coded signal merging apparatus for inputting a plurality of second coded moving picture sequence signals and a plurality of differential coded moving picture sequence signals to reconstruct a first coded moving picture sequence signal comprising: a plurality of the coded signal merging units including a 1st coded signal merging unit up to a n-th coded signal merging unit wherein n is an integer not less than two, in which the i-th coded signal merging unit is operative to input an i-th second coded moving picture sequence signal and an i-th differential coded moving picture sequence signal to reconstruct an (i–1)-th second coded moving picture sequence signal wherein i is an integer equal to or less than n, the i-th second coded moving picture sequence signal generated as a result of transcoding the (i–1)-th second coded moving picture sequence signal and consisting of a series of i-th second picture information having i-th second coefficient information, the i-th second coefficient information including a matrix of i-th second coefficients, the (i–1)-th second coded moving picture sequence signal generated as a result of encoding original moving picture sequence signal and consisting of a series of (i–1)-th second picture information having (i–1)-th second coefficient information, the (i–1)-th second coefficient information including a matrix of (i–1)-th second coefficients, the i-th differential coded moving picture sequence signal being a difference between the i-th second coded moving picture sequence signal and the (i–1)-th second coded moving picture sequence signal, the i-th differential coded moving picture sequence signal including i-th differential coefficient information between the i-th second coefficient information and the (i–1)-th second coefficient information, each of the i-th second coded moving picture sequence signal, the (i–1)-th second coded moving picture sequence signal, and the i-th differential coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks, and the 1st coded signal merging unit is operative to input the 1st second coded moving picture sequence signal and the 1st differential coded moving picture sequence signal to reconstruct the first coded moving picture sequence signal.

The aforesaid i-th coded signal merging unit includes: i-th first receiving means for receiving a base coded moving picture sequence signal, the base coded moving picture sequence signal being any one of the i-th second coded moving picture sequence signal, the (i–1)-th second coded moving picture sequence signal, and the i-th differential coded moving picture sequence signal; i-th merging storage means for storing the base coded moving picture sequence signal received by the i-th first receiving means; i-th request signal determining means for determining a request signal for a requested coded moving picture sequence signal on the basis of the base coded moving picture sequence signal stored by the i-th merging storage means; i-th request signal transmission means for transmitting the request signal for the requested coded moving picture sequence signal determined by the i-th request signal determining means; i-th second receiving means for receiving the requested coded moving picture sequence signal; i-th merging coded signal extracting means for extracting the base coded moving picture sequence signal from the i-th merging storage means; i-th merging means for merging the base coded moving picture sequence signal extracted by the i-th merging coded signal extracting means with the requested coded moving picture sequence signal received by the i-th second receiving means to reconstruct the (i–1)-th second coded moving picture sequence signal on the basis of the second coefficient information obtained from the series of second picture information of the i-th second coded moving picture sequence signal, and the i-th differential coefficient information obtained from the i-th differential bit stream; and i-th outputting means for inputting the reconstructed i-th second coded moving picture sequence signal from the i-th merging means to be outputted therethrough.

The aforesaid 1st coded signal merging unit includes: 1st first receiving means for receiving a base coded moving picture sequence signal, the base coded moving picture sequence signal being any one of the first coded moving picture sequence signal, the 1st second coded moving picture sequence signal, and the 1st differential coded moving picture sequence signal; 1st merging storage means for storing the base coded moving picture sequence signal received by the 1st first receiving means; 1st request signal determining means for determining a request signal for a requested coded moving picture sequence signal on the basis of the base coded moving picture sequence signal stored by the 1st merging storage means; 1st request signal transmission means for transmitting the request signal for the requested coded moving picture sequence signal determined by the 1st request signal determining means; 1st second receiving means for receiving the requested coded moving picture sequence signal; 1st merging coded signal extracting means for extracting the base coded moving picture sequence signal from the 1st merging storage means; 1st merging means for merging the base coded moving picture sequence signal extracted by the 1st merging coded signal extracting means with the requested coded moving picture sequence signal received by the 1st second receiving means to reconstruct the first coded moving picture sequence signal on the basis of the 1st second coefficient information obtained from the series of second picture information of the 1st second coded moving picture sequence signal, and the 1st differential coefficient information obtained from the 1st differential coded signal; and 1st outputting means for inputting the reconstructed first coded moving picture sequence signal from the 1st merging means to be outputted therethrough.

In the above mentioned the i-th coded signal separating unit, the i-th separating storage means is operative to store the (i−1)-th differential coded moving picture sequence signal generated by the i-th differential coded signal generating means, the i-th first transmission means is operative to transmit the (i−1)-th second coded moving picture sequence signal generated by the i-th coded signal converting means, the i-th request signal receiving means is operative to receive the request signal indicative of a requested (i−1)-th differential coded moving picture sequence signal to be transmitted, the request signal indicative of the requested (i−1)-th differential coded moving picture sequence signal being determined on the basis of the (i−1)-th second coded moving picture sequence signal, the i-th separating coded signal extracting means is operative to extract the requested (i−1)-th differential coded moving picture sequence signal from the i-th separating storage means in response to the request signal, and the i-th second transmission means is operative to transmit the requested (i−1)-th differential coded moving picture sequence signal extracted by the i-th separating coded signal extracting means, and the aforesaid multi-output coded signal separating apparatus is operative to input a first coded moving picture sequence signal to separate into a plurality of second coded moving picture sequence signals and a plurality of differential coded moving picture sequence signals.

In the above described the i-th coded signal separating unit, the i-th first receiving means is operative to receive the i-th second coded moving picture sequence signal, the i-th merging storage means is operative to store the i-th second coded moving picture sequence signal received by the i-th first receiving means, the i-th request signal determining means is operative to determine a request signal for a requested differential coded moving picture sequence signal on the basis of the i-th second coded moving picture sequence signal stored by the i-th merging storage means, the i-th request signal transmission means is operative to transmit the request signal for the requested differential coded moving picture sequence signal determined by the i-th request signal determining means, the i-th second receiving means is operative to receive the requested differential coded moving picture sequence signal, the i-th merging coded signal extracting means is operative to extract the i-th second coded moving picture sequence signal from the i-th merging storage means, and the i-th merging means is operative to merge the i-th second coded moving picture sequence signal extracted by the i-th merging coded signal extracting means with the requested differential coded moving picture sequence signal received by the i-th second receiving means to reconstruct the (i−1)-th second coded moving picture sequence signal wherein the 0-th second coded moving picture sequence signal is the first coded moving picture sequence signal.

In accordance with a sixth aspect of the present invention, there is provided a coded signal separating and merging system comprising: a multi-output coded signal separating apparatus for inputting a first coded moving picture sequence signal to separate into a plurality of second coded moving picture sequence signals and a plurality of differential coded moving picture sequence signals; and a multi-input coded signal merging apparatus for inputting a plurality of second coded moving picture sequence signals and a plurality of differential coded moving picture sequence signals to reconstruct the first coded moving picture sequence signal. The above multi-output coded signal separating apparatus includes: a plurality of coded signal separating units including a 1st coded signal separating unit up to a m-th coded signal separating unit wherein m is an integer not less than two. The above multi-input coded signal merging apparatus includes: a plurality of coded signal merging units including a 1st coded signal merging unit up to a n-th coded signal merging unit wherein n is an integer not less than two and equal to or less than the m.

The above i-th coded signal separating unit includes: i-th inputting means for inputting an (i−1)-th second coded moving picture sequence signal therethrough from the (i−1)-th coded signal separating unit, the (i−1)-th second coded moving picture sequence signal generated as a result of encoding original moving picture sequence signal and consisting of a series of (i−1)-th second picture information having (i−1)-th second coefficient information, the (i−1)-th second coefficient information including a matrix of (i−1)-th second coefficients wherein i is an integer equal to or less than m, and 0-th second coded moving picture sequence signal is the first coded moving picture sequence signal; i-th coded signal converting means for converting the (i−1)-th second coded moving picture sequence signal inputted through the i-th inputting means to generate an i-th second coded moving picture sequence signal, the i-th second coded moving picture sequence signal consisting of a series of i-th second picture information having i-th second coefficient information, the i-th second coefficient information including a matrix of second coefficients, each of the (i−1)-th second coded moving picture sequence signal, and the i-th second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; i-th differential coded signal generating means for inputting the (i−1)-th second coded moving picture sequence signal and the i-th second coded moving picture sequence signal from the i-th coded signal converting means to generate an i-th differential coded moving picture sequence signal on the basis of the (i−1)-th second coefficient information obtained from the series of (i−1)-th second picture information of the (i−1)-th second coded moving picture sequence signal, and the i-th second coefficient information obtained from the series of the i-th second picture information of the i-th second coded moving picture sequence signal, the i-th differential coded moving picture sequence signal being a difference between the (i−1)-th second coded moving picture sequence signal and the i-th second coded moving picture sequence signal; i-th separating storage means for selectively storing the (i−1)-th second coded moving picture sequence signal, the i-th second coded moving picture sequence signal, and the i-th differential coded moving picture sequence signal; and i-th first transmission means for selectively transmitting the (i−1)-th second coded moving picture sequence signal, the i-th second coded moving picture sequence signal, and the i-th differential coded moving picture sequence signal to the i-th coded signal merging unit.

The above i-th coded signal merging unit includes: i-th first receiving means for receiving a base coded moving picture sequence signal from the i-th coded signal separating unit or the (i+1)-th coded signal merging unit 6200i+1, the base coded moving picture sequence signal being any one of the (i−1)-th second coded moving picture sequence signal, the i-th second coded moving picture sequence signal, and the i-th differential coded moving picture sequence signal; i-th merging storage means for storing the base coded moving picture sequence signal received by the i-th first receiving means; i-th request signal determining means for determining a request signal for a requested coded moving picture sequence signal on the basis of the base coded moving picture sequence signal stored by the i-th merging storage means; and i-th request signal transmission means for transmitting the request signal for the requested coded moving picture sequence signal determined by the i-th request signal determining means to the i-th coded signal separating unit.

The above i-th coded signal separating unit further includes: i-th request signal receiving means for receiving the request signal transmitted by the i-th request signal transmission means from the i-th coded signal merging unit; i-th separating coded signal extracting means for extracting the requested coded moving picture sequence signal from the i-th separating storage means in response to the request signal; and i-th second transmission means for transmitting the requested coded moving picture sequence signal extracted by the i-th separating coded signal extracting means to the i-th coded signal merging unit. The above i-th coded signal merging unit includes: i-th second receiving means for receiving the requested coded moving picture sequence signal transmitted by the i-th second transmission means from the i-th coded signal separating unit; i-th merging coded signal extracting means for extracting the base coded moving picture sequence signal from the i-th merging storage means; i-th merging means for merging the base coded moving picture sequence signal extracted by the i-th merging coded signal extracting means with the requested coded moving picture sequence signal received by the i-th second receiving means on the basis of the i-th second coefficient information obtained from the series of second picture information of the i-th second coded moving picture sequence signal, and the i-th differential coefficient information obtained from the differential coded signal to reconstruct the (i−1)-th second coded moving picture sequence signal; and i-th outputting means for inputting the reconstructed (i−1)-th second coded moving picture sequence signal from the i-th merging means to be outputted therethrough.

In the aforesaid coded signal separating and merging system, the i-th separating storage means of the i-th coded signal separating unit is operative to store the i-th differential coded moving picture sequence signal generated by the i-th differential coded signal generating means, the i-th first transmission means is operative to transmit the i-th second coded moving picture sequence signal generated by the i-th coded signal converting means, the i-th first receiving means of the i-th coded signal merging unit is operative to receive the i-th second coded moving picture sequence signal (i+1)-th coded signal merging unit, the i-th merging storage means is operative to store the i-th second coded moving picture sequence signal received by the i-th first receiving means, the i-th request signal determining means is operative to determine a request signal for a requested differential coded moving picture sequence signal on the basis of the i-th second coded moving picture sequence signal stored by the i-th merging storage means, the i-th request signal transmission means is operative to transmit the request signal for the requested differential coded moving picture sequence signal determined by the i-th request signal determining means, the i-th request signal receiving means of the i-th coded signal separating unit is operative to receive the request signal transmitted by the i-th request signal transmission means, the i-th separating coded signal extracting means is operative to extract the requested differential coded moving picture sequence signal from the i-th separating storage means in response to the request signal, the i-th second transmission means is operative to transmit the requested differential coded moving picture sequence signal extracted by the i-th separating coded signal extracting means to the i-th coded signal merging unit, the i-th second receiving means of the i-th coded signal merging unit is operative to receive the requested differential coded moving picture sequence signal transmitted by the i-th second transmission means from the i-th coded signal separating unit, the i-th merging coded signal extracting means is operative to extract the i-th second coded moving picture sequence signal from the i-th merging storage means, and the i-th merging means is operative to merge the i-th second coded moving picture sequence signal extracted by the i-th merging coded signal extracting means with the requested differential coded moving picture sequence signal received by the i-th second receiving means to reconstruct the first coded moving picture sequence signal.

BRIEF DESCRIPTION OF THE DRAWINGS

The present invention and many of the advantages thereof will be better understood from the following detailed description when considered in connection with the accompanying drawings, wherein:

FIG. 5 is a diagram showing renderings of an environment in which a preferred embodiment of a bit stream separating and merging system 1000 according to the present invention is utilized;

DESCRIPTION OF THE PREFERRED EMBODIMENTS

Figure 1:
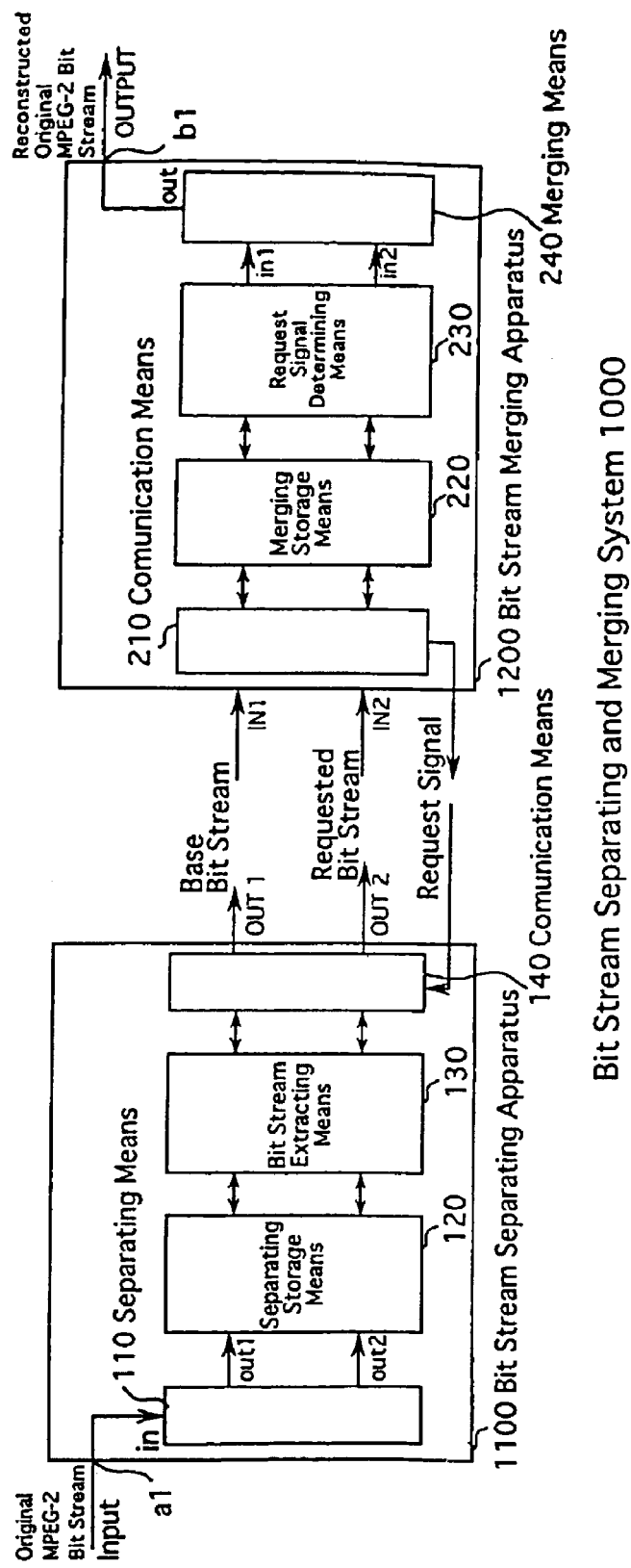
FIG. 1 is a block diagram of a first preferred embodiment of a bit stream separating and merging system 1000 according to the present invention.

Throughout the following detailed description, similar reference characters refer to similar elements in all figures of the drawings.

I. First Embodiment of Bit Stream Separating and Merging System 1000

Referring to FIG. 1 of the drawings, there is shown a first preferred embodiment of a bit stream separating and merging system 1000 according to the present invention.

The first preferred embodiment of the bit stream separating and merging system 1000 according to the present invention is shown in FIG. 1 as comprising a bit stream separating apparatus 1100 and a bit stream merging apparatus 1200.

Some moving picture information is not required to have a high picture quality. Demo video moving picture information, for instance, is required to be promptly transmitted to audiences. Upon receiving the demo video moving picture information, the audiences can preview the demo video moving picture information as long as the demo video moving picture information has a minimum picture quality.

In the first preferred embodiment of the bit stream separating and merging system 1000 according to the present invention, the bit stream separating apparatus 1100 is operated to input an original MPEG-2 bit stream to separate into a transcoded MPEG-2 bit stream and a differential bit stream, and then store the differential bit stream in the bit stream separating apparatus 1100 and transmit only the transcoded MPEG-2 bit stream to the bit stream merging apparatus 1200. The bit rate of the transcoded MPEG-2 bit stream is lower than that of the original MPEG-2 bit stream, thereby making it possible for the bit stream separating apparatus 1100 to transmit the transcoded MPEG-2 bit stream to the bit stream merging apparatus 1200 faster than the original MPEG-2 bit stream.

The bit stream merging apparatus 1200, on the other hand, can receive the transcoded MPEG-2 bit stream to reproduce moving picture information of a low picture quality, for instance, to be used as demo video moving picture information. If a user decides to watch the moving picture information of a high quality, the bit stream merging apparatus 1200 can transmit a request signal for a differential bit stream corresponding to the transcoded MPEG-2 bit stream already received to the bit stream separating apparatus 2100. In response to the request for the requested differential bit stream, the bit stream separating apparatus 1100 is operated to extract the requested differential bit stream from among the stored bit streams, and transmit the requested differential bit stream to the bit stream merging apparatus 1200.

Upon receiving the requested differential bit stream, the bit stream merging apparatus 1200 is operated to merge the transcoded MPEG-2 bit stream already received and the requested differential bit stream just received to reconstruct the original MPEG-2 bit stream.

This means that a user may receive the transcoded MPEG-2 bit stream at a bit rate lower than that of the original MPEG-2 bit stream to reproduce low-quality moving picture information to be previewed, and later receive the differential bit stream to be merged with the transcoded MPEG-2 bit stream earlier received to reproduce high-quality moving picture information to be watched.

Once the transcoded MPEG-2 bit stream has already been arrived, the bit stream separating apparatus 1100 is not required to retransmit the original MPEG-2 bit stream but the differential bit stream alone, thereby effectively utilize the transcoded MPEG-2 bit streams and the transmitting paths.

The constructions of the bit stream separating apparatus 1100 and the bit stream merging apparatus 1200 will be described in detail before describing the operation of the bit stream separating and merging system 1000.

I-A Bit Stream Separating apparatus 1100

Figure 2:
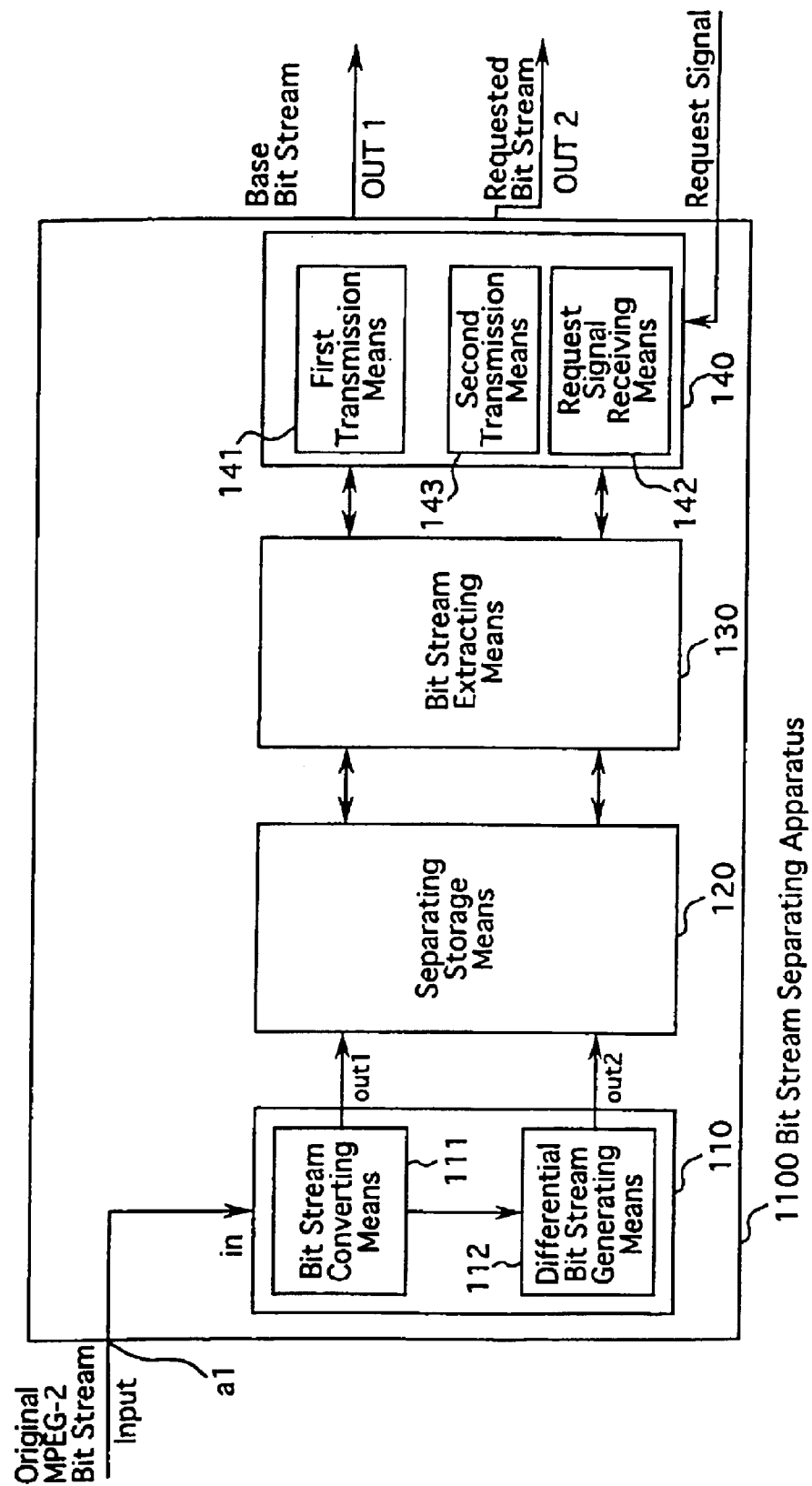
FIG. 2 is a block diagram of a preferred embodiment of a bit stream separating apparatus 1100 according to the present invention.

Referring to FIG. 2 of the drawings, there is shown a preferred embodiment of a bit stream separating apparatus 1100. As shown in FIG. 2, the bit stream separating apparatus 1100 comprises an inputting terminal a1, bit stream converting means 111, differential bit stream generating means 112, separating storage means 120, first transmission means 141, request signal receiving means 142, bit stream extracting means 130, second transmission means 143, and outputting interfaces OUT1, OUT2. The bit stream converting means 111, differential bit stream generating means 112 collectively constitute a separating means 110 for inputting an original MPEG-2 bit stream to separate into a transcoded MPEG-2 bit stream and a differential bit stream. The first transmission means 141, the request signal receiving means 142, and the second transmission means 143 collectively constitute a communication means 140 for transmitting and receiving bit streams and signals. The bit stream separating apparatus 1100 constitutes the coded signal separating apparatus according to the present invention. The inputting terminal a1, the bit stream converting means 111, the differential bit stream generating means 112, the bit stream extracting means 130 respectively constitute inputting means, coded signal converting means, differential coded signal generating means, and separating coded signal extracting means according to the present invention.

The inputting terminal a1 is adapted to input an original MPEG-2 bit stream therethrough. The original MPEG-2 bit stream is generated as a result of encoding original moving picture sequence signal and consisting of a series of first picture information having first coefficient information. The first coefficient information includes a matrix of first coefficients.

The bit stream converting means 111 is adapted to input the original MPEG-2 bit stream through the inputting terminal a1 and convert the original MPEG-2 bit stream inputted through the inputting terminal a1 to generate a transcoded MPEG-2 bit stream. The bit stream converting means 111 can output the transcoded MPEG-2 bit stream thus generated to the differential bit stream generating means 112 and the separating storage means 120 through an interface out1.

In the bit stream separating apparatus 1100 according to the present invention, the bit stream converting means 111 may directly transmit the transcoded MPEG-2 bit stream to the first transmission means 141 through an interface out1. Furthermore, the bit stream converting means 111 may output the original MPEG-2 bit stream inputted through the inputting means a1 to the differential bit stream generating means 112.

The transcoded MPEG-2 bit stream consists of a series of second picture information having second coefficient information. The second coefficient information includes a matrix of second coefficients. Each of the original MPEG-2 bit stream, and the transcoded MPEG-2 bit stream is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks.

The differential bit stream generating means 112 is adapted to input the original MPEG-2 bit stream and the transcoded MPEG-2 bit stream from the bit stream converting means 111 to generate a differential bit stream on the basis of the first coefficient information obtained from the series of first picture information of the original MPEG-2 bit stream, and the second coefficient information obtained from the series of the second picture information of the transcoded MPEG-2 bit stream. The differential bit stream generating means 112 is adapted to output the differential bit stream thus generated to the separating storage means 120 through an interface out2. Here, the differential bit stream is intended to mean a difference between the original MPEG-2 bit stream and the transcoded MPEG-2 bit stream.

Figure 3:
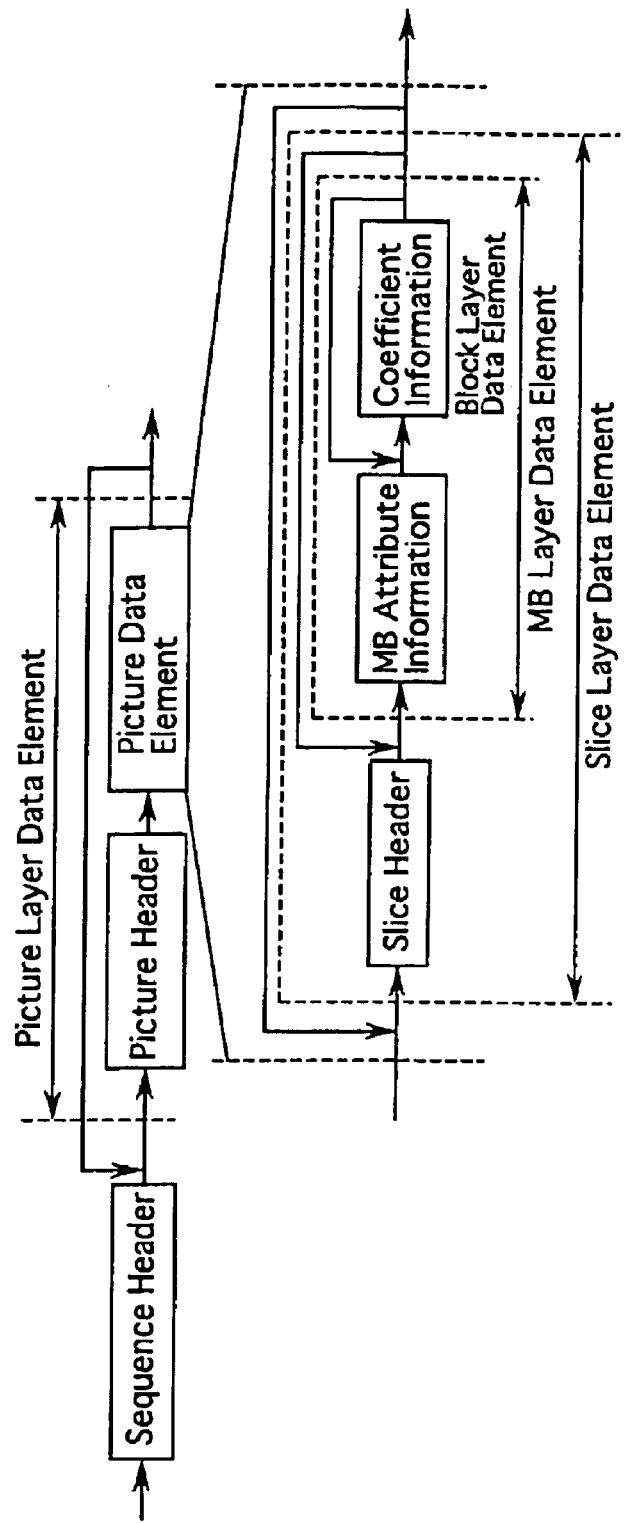
FIG. 3 is a data structural diagram showing the hierarchical structure of a differential bit stream.

More specifically, the differential bit stream, thus generated by the differential bit stream generating means 112, is in the form of the hierarchical structure including the sequence layers, the picture layers, the slice layers, the macroblock layers, and the block layers, similar to the original MPEG-2 bit streams and the transcoded MPEG-2 bit streams as shown in FIG. 3. The differential bit stream starts from a sequence header of the sequence layer. Followed by the sequence header, picture layer data elements continue for the number of pictures contained in the sequence layer. The picture layer data element comprises a picture header and picture data elements. The picture data element includes a plurality of slice layer data elements. The slice layer data element comprises a slice header and a plurality of MB layer data elements. The MB layer data element comprises MB attribute information and block layer data elements. Block layer data element contains coefficient information. The coefficient information includes a matrix of coefficients.

The separating storage means 120 is adapted to selectively input and store the transcoded MPEG-2 bit stream through the interface out1, and the differential bit stream through the interface out2. In the bit stream separating apparatus 1100, the separating storage means 120 may input and store the original MPEG-2 bit stream through the inputting means a1.

The first transmission means 141 is adapted to selectively transmit a base bit stream, which will be described later, to a bit stream merging apparatus 1200 through the outputting interface OUT1.

The request signal receiving means 142 is adapted to receive a request signal indicative of a requested bit stream, which will be described later.

The second transmission means 143 is adapted to transmit the requested bit stream, which will be described later, through the outputting interface OUT2.

The bit stream extracting means 130 is adapted to extract the requested bit stream from among bit streams stored in the separating storage means 120 in response to the request signal.

The bit stream separating apparatus 1100 thus constructed is adapted to input an original MPEG-2 bit stream through the inputting terminal a1 to separate into and output a transcoded MPEG-2 bit stream and a differential bit stream through the outputting interfaces OUT1 and OUT2.

I-B Bit Stream Merging Apparatus 1200

Figure 4:
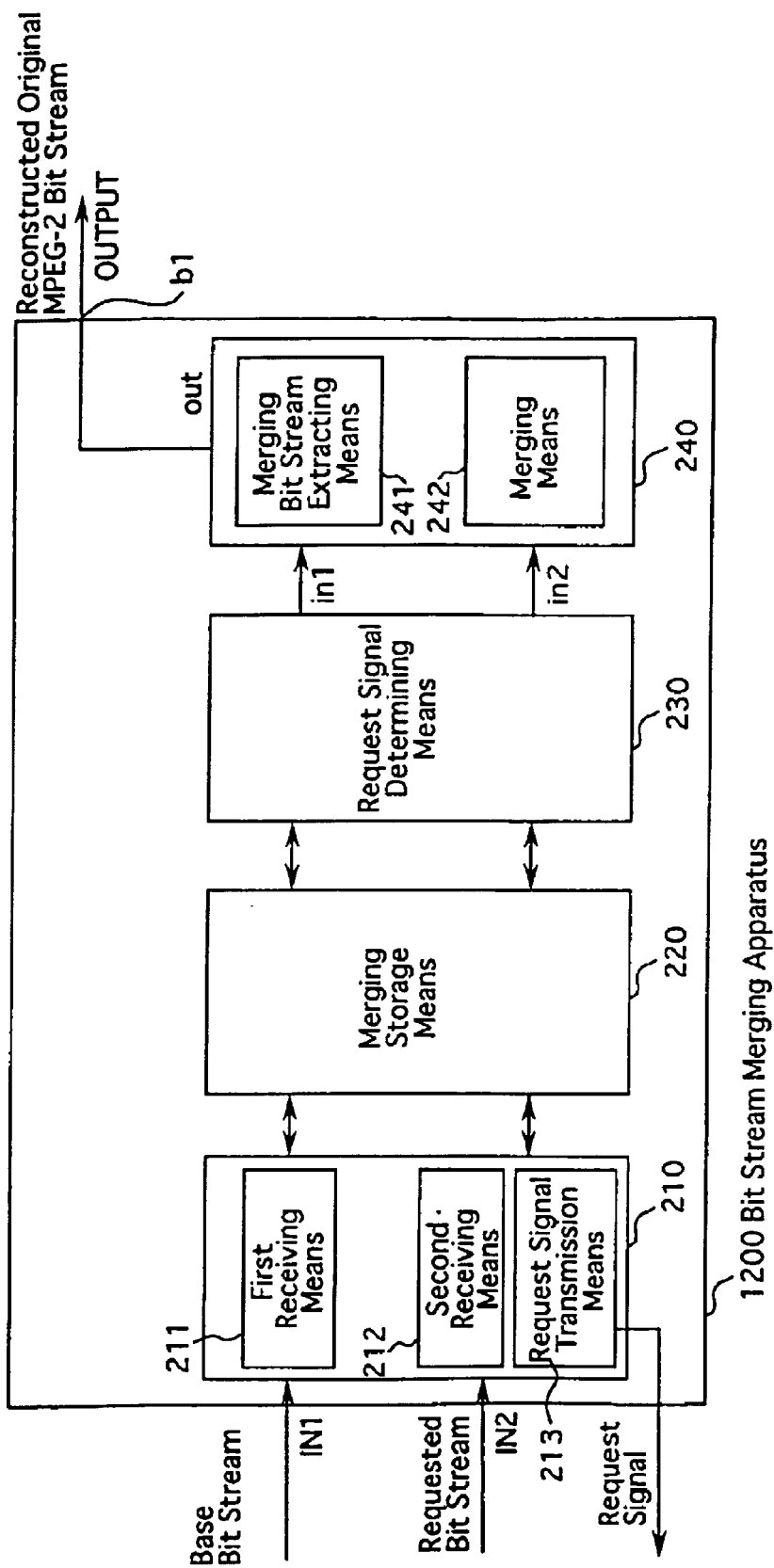
FIG. 4 is a block diagram of a preferred embodiment of a bit stream merging apparatus 1200 according to the present invention.

Referring then to FIG. 4 of the drawings, there is shown a preferred embodiment of a bit stream merging apparatus 1200. As shown in FIG. 4, the bit stream merging apparatus 1200 comprises inputting interfaces IN1, IN2, first receiving means 211, merging storage means 220, request signal determining means 230, request signal transmission means 213, second receiving means 212, merging bit stream extracting means 241, merging means 242, and an outputting terminal b1. The first receiving means 211, the second receiving means 212, and the request signal transmission means 213 collectively constitute the communication means 210. The merging bit stream extracting means 241 and the merging means 242 collectively constitute the merging means 240. The bit stream merging apparatus 1200 constitutes the coded signal merging apparatus according to the present invention. The merging bit stream extracting means 241 constitutes merging coded signal extracting means according to the present invention.

The first receiving means 211 is adapted to receive the base bit stream transmitted by the first transmission means 141 of the bit stream separating apparatus 1100 through the inputting interface IN1. Here, the base bit stream is intended to mean any one of the original MPEG-2 bit stream, the transcoded MPEG-2 bit stream, and the differential bit stream transmitted by the first transmission means 141.

The merging storage means 220 is adapted to input and store the base bit stream received by the first receiving means 211.

The request signal determining means 230 is adapted to determine a request signal for a requested bit stream on the basis of the base bit stream stored by the merging storage means 220. More specifically, the request signal determining means 230 is adapted to determine a requested bit stream, which is to be merged with the base bit stream to reconstruct the original MPEG-2 bit stream, on the basis of the base bit stream stored by the merging storage means 220 and then determine a request signal.

The request signal transmission means 213 is adapted to transmit the request signal for the requested bit stream determined by the request signal determining means 230 to the bit stream separating apparatus 1100.

The second receiving means 212 is adapted to receive the requested bit stream transmitted by the second transmission means 143 of the bit stream separating apparatus 1100 through the inputting interface IN2.

The merging bit stream extracting means 241 is adapted to extract the base bit stream from among bit streams stored in the merging storage means 220.

The merging means 242 is adapted to merge the base bit stream extracted by the merging bit stream extracting means 241 with the requested bit stream received by the second receiving means 212 on the basis of the second coefficient information obtained from the series of second picture information of the transcoded MPEG-2 bit stream, and the differential coefficient information obtained from the differential bit stream to reconstruct the original MPEG-2 bit stream.

The outputting terminal b1 is adapted to input the reconstructed original MPEG-2 bit stream from the merging means 242 to be outputted therethrough.

The bit stream merging apparatus 1200 thus constructed can input a transcoded MPEG-2 bit stream and a differential bit stream through the inputting interfaces IN1 and IN2 to reconstruct and output the original MPEG-2 bit stream through the outputting terminal b1.

Renderings of an environment in which a preferred embodiment of bit stream separating and merging system 1000 comprising the bit stream separating apparatus 1100 and the bit stream merging apparatus 1200 is utilized are shown in FIG. 5.

As best shown in FIG. 5, there are provided the bit stream separating apparatus 1100 according to the present invention, the bit stream merging apparatus 1200 according to the present invention, an encoder 60, and transmitting paths.

The encoder 60 is adapted to input original moving picture sequence information, i.e., high-quality moving picture sequence information to output high-quality MPEG-2 bit streams, i.e., original MPEG-2 bit streams. The bit stream separating apparatus 1100 is adapted to input the original MPEG-2 bit streams from the encoder 60, and transcode and separate the original MPEG-2 bit streams to generate transcoded MPEG-2 bit streams and differential bit streams. The differential bit streams are differences between the original MPEG-2 bit streams and the transcoded MPEG-2 bit streams. The transcoded MPEG-2 bit streams and differential bit streams thus generated are transmitted through the transmitting paths to users.

A user may operate a conventional decoder, not shown, to decode the transcoded MPEG-2 bit streams to reproduce low-quality moving picture sequence information as shown in FIG. 5.

A user, on the other hand, can operate the bit stream merging apparatus 1200 according to present invention to merge the transcoded MPEG-2 bit streams and the differential bit streams to reconstruct the original MPEG-2 bit streams, i.e., high-quality MPEG-2 bit streams, thereby enabling to reproduce the original, high-quality moving picture sequence information. The differential bit streams may be transmitted simultaneously with the transcoded MPEG-2 bit streams or may be transmitted after the transcoded MPEG-2 bit streams are transmitted.

Conventionally, it is required to transmit the original MPEG-2 bit streams in addition to the transcoded MPEG-2 bit stream through the transmitting path for reproducing the original, high-quality moving picture sequence information.

The bit stream separating apparatus 1100 according to the present invention, on the other hand, enables to transcode and separate the original MPEG-2 bit stream to generate the differential bit stream in addition to the transcoded MPEG-2 bit stream. The bit stream merging apparatus 1200 according to the present invention enables to reproduce the original, high-quality moving picture sequence information from the transcoded MPEG-2 bit stream and the differential bit stream.

The bit stream merging apparatus 1200 makes it possible to reconstruct the original MPEG-2 bit stream to reproduce the high-quality moving picture sequence information, for instance, from the transcoded MPEG-2 bit stream earlier received and stored and the differential bit stream later received, thereby eliminating the time and effort to transmit the original MPEG-2 bit stream in addition to the transcoded MPEG-2 bit stream through the transmitting path. This leads to the fact that the bit stream separating apparatus 1100 and the bit stream merging apparatus 1200 according to the present invention make it possible to effectively utilize the transcoded MPEG-2 bit streams and the transmitting paths.

Alternatively, the bit stream merging apparatus 1200 may further comprises original bit stream storage means, not shown, which is adapted to input and store the reconstructed original MPEG-2 bit stream reconstructed by the merging means 242. The original bit stream storage means of the bit stream merging apparatus 1200 according to the present invention enables a user to store the reconstructed original MPEG-2 bit stream, thereby eliminating the time and effort to send the original MPEG-2 bit stream or resend the transcoded MPEG-2 bit stream or the differential bit stream. The original bit stream storage means constitute the reconstructed first coded signal storage means according to the present invention.

I-C Operation of Bit Stream Separating and Merging System 1000

Referring to FIG. 1 of the drawings, there is shown a first preferred embodiment of a bit stream separating and merging system 1000 according to the present invention.

The first preferred embodiment of the bit stream separating and merging system 1000 according to the present invention is shown in FIG. 1 as comprising a bit stream separating apparatus 1100 for inputting an original MPEG-2 bit stream to separate into a transcoded MPEG-2 bit stream and a differential bit stream, and a bit stream merging apparatus 1200 for inputting the transcoded MPEG-2 bit stream and the differential bit stream.

The constructions of the bit stream separating apparatus 1100 and the bit stream merging apparatus 2100 have already been mentioned.

The operation of the bit stream separating and merging system 1000 will be described hereinlater in reference to FIG. 1, FIG. 2, and FIG. 4.

In the bit stream separating apparatus 1100, the inputting means a1 is operated to input the original MPEG-2 bit stream therethrough.

The bit stream converting means 111 of the separating means 110 is operated to convert the original MPEG-2 bit stream inputted through the inputting means a1 to generate the transcoded MPEG-2 bit stream.

The differential bit stream generating means 112 is operated to input the original MPEG-2 bit stream and the transcoded MPEG-2 bit stream from the bit stream converting means 111 to generate a differential bit stream on the basis of the first coefficient information obtained from the series of first picture information of the original MPEG-2 bit stream, and the second coefficient information obtained from the series of the second picture information of the transcoded MPEG-2 bit stream.

The separating storage means 120 is operated to selectively store the original MPEG-2 bit stream inputted through the inputting means a1, the transcoded MPEG-2 bit stream generated by the bit stream converting means 111, and the differential bit stream generated by differential bit stream generating means 110.

The first transmission means 141 is operated to transmit a base bit stream to the bit stream merging apparatus 1200. Here, the base bit stream is intended to mean any one of the original MPEG-2 bit stream, the transcoded MPEG-2 bit stream, and the differential bit stream.

In the bit stream merging apparatus 1200, the first receiving means 211 is operated to receive the base bit stream transmitted by the first transmission means 141 of the bit stream separating apparatus 1100.

The merging storage means 220 is operated to store the base bit stream received by the first receiving means 211.

The request signal determining means 230 is operated to determine a request signal for a requested bit stream on the basis of the base bit stream stored by the merging storage means 220.

The request signal transmission means 213 is operated to transmit the request signal for the requested bit stream determined by the request signal determining means 230 to the bit stream separating apparatus 1100.

In the bit stream separating apparatus 1100, the request signal receiving means 142 is operated to receive the request signal transmitted by the request signal transmission means 213 of the bit stream merging apparatus 1200.

The separating bit stream extracting means 130 is operated to extract the requested bit stream from among bit streams stored in the separating storage means 120 in response to the request signal.

The second transmission means 143 is operated to transmit the requested bit stream extracted by the separating bit stream extracting means 130 to the bit stream merging apparatus 1200.

In the bit stream merging apparatus 1200, the second receiving means 212 is operated to receive the requested bit stream transmitted by the second transmission means 143 of the bit stream separating apparatus 1100.

The merging bit stream extracting means 241 is operated to extract the base bit stream from among bit streams stored in the merging storage means 220.

The merging means 242 is operated to merge the base bit stream extracted by the merging bit stream extracting means 241 with the requested bit stream received by the second receiving means 212 on the basis of the second coefficient information obtained from the series of second picture information of the transcoded MPEG-2 bit stream, and the differential coefficient information obtained from the differential bit stream to reconstruct the original MPEG-2 bit stream.

The outputting means b1 is operated to input the reconstructed original MPEG-2 bit stream from the merging means 242 to be outputted therethrough.

The first embodiment of the bit stream separating and merging system 1000 thus constructed makes it possible for a user to receive a transcoded MPEG-2 bit stream at a bit rate lower than that of an original MPEG-2 bit stream to decode, reproduce, and preview low-quality picture information, and later receive a differential bit stream to be merged with the transcoded MPEG-2 bit stream earlier received to reproduce high-quality picture information, thereby eliminating the time and effort to transmit the original MPEG-2 bit stream, and thus effectively utilize the transcoded MPEG-2 bit streams and the transmitting paths.

Furthermore, in the bit stream separating and merging system 1000 according to the present invention, the bit stream separating apparatus 1100 can firstly transmit the differential bit stream and later transmit the transcoded MPEG-2 bit stream, and the bit stream merging apparatus 1200 can firstly receive the differential bit stream and later receive the transcoded MPEG-2 bit stream.

II. Second Embodiment of Bit Stream Separating and Merging System 2000

Figure 6:
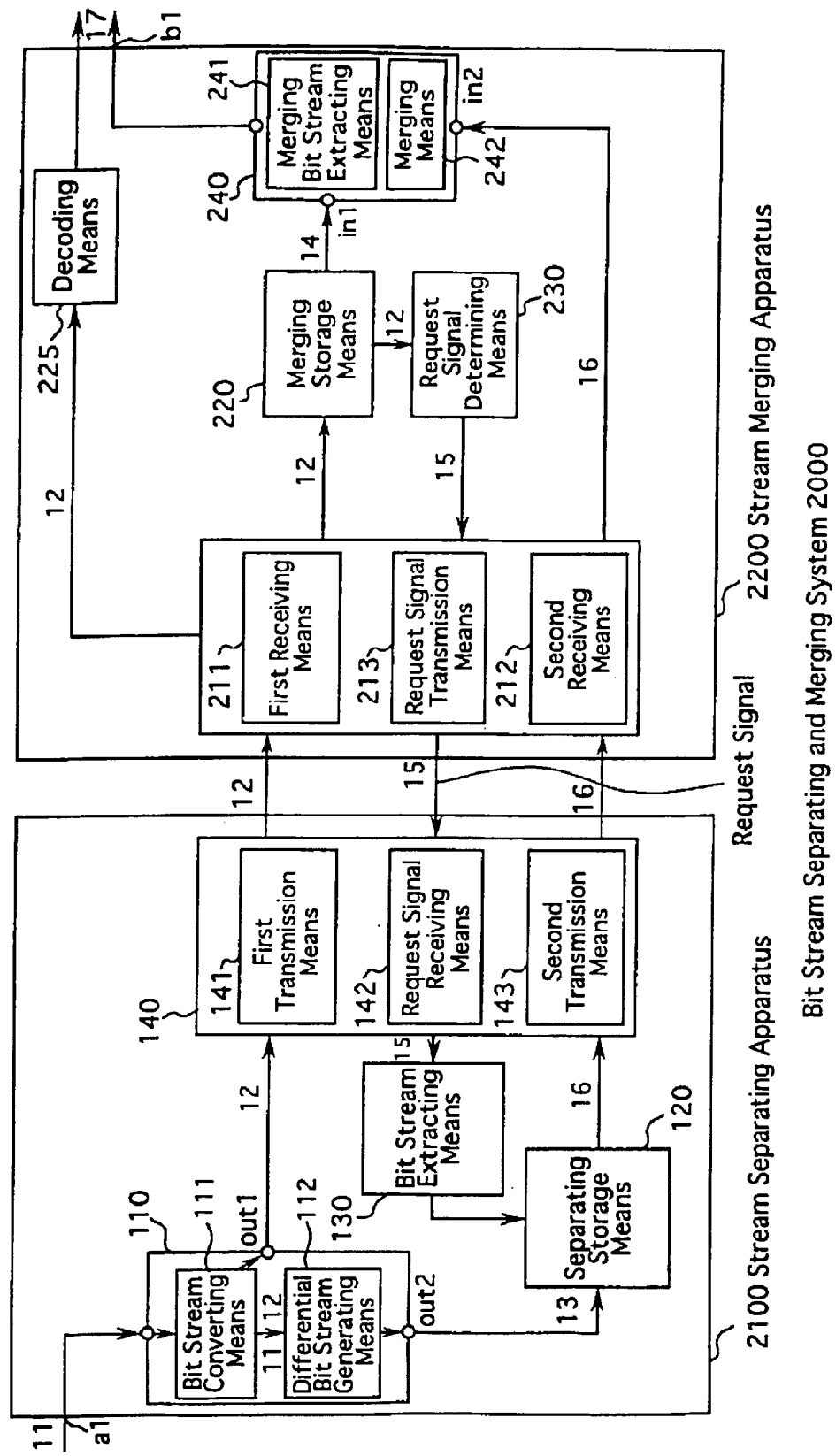
FIG. 6 is a block diagram of a second preferred embodiment of a bit stream separating and merging system 2000 according to the present invention.

Referring to FIG. 6 of the drawings, there is shown a second preferred embodiment of a bit stream separating and merging system 2000 according to the present invention.

The second preferred embodiment of the bit stream separating and merging system 2000 according to the present invention is shown in FIG. 6 as comprising a bit stream separating apparatus 2100 for inputting an original MPEG-2 bit stream to separate into a transcoded MPEG-2 bit stream and a differential bit stream, and a bit stream merging apparatus 2200 for inputting the transcoded MPEG-2 bit stream and the differential bit stream to reconstruct the original MPEG-2 bit stream.

The bit stream separating apparatus 2100 and the bit stream merging apparatus 2200 are similar in construction as the bit stream separating apparatus 1100 and the bit stream merging apparatus 1200 except for the fact that the bit stream separating apparatus 2100 is adapted to store the differential bit stream in the separating storage means 120 and transmit the transcoded MPEG-2 bit stream to the bit stream merging apparatus 2200, and the bit stream merging apparatus 2200 is adapted to firstly receive the transcoded MPEG-2 bit stream and later receive the differential bit stream.

The operation of the bit stream separating and merging system 2000 will be described with reference to FIG. 6 hereinlater. The same constitutional elements are simply represented by the same reference numerals as those of the bit stream separating apparatus 1100 and the bit stream merging apparatus 1200, and will be thus omitted from description for avoiding tedious repetition.

In the bit stream separating apparatus 2100, the inputting means a1 is operated to input an original MPEG-2 bit stream 11 therethrough to be outputted to the bit stream converting means 111.

The bit stream converting means 111 is operated to convert the original MPEG-2 bit stream 11 inputted through the inputting means a1 to generate the transcoded MPEG-2 bit stream 12 to be outputted to the differential bit stream generating means 112 and the first transmission means 141 through the interface out1. The bit stream converting means 111 is also operated to output the original MPEG-2 bit stream 11 inputted through the inputting means a1 to the differential bit stream generating means 112.

The differential bit stream generating means 112 is operated to input the original MPEG-2 bit stream 11 and the transcoded MPEG-2 bit stream 12 from the bit stream converting means 111 to generate a differential bit stream 13 to be outputted to the separating storage means 120 through the interface out2.

The separating storage means 120 is operated to store the differential bit stream 13 generated by the differential bit stream generating means 112.

The first transmission means 141 is operated to transmit the transcoded MPEG-2 bit stream 12 generated by the bit stream converting means 111 to the bit stream merging apparatus 2200.

In the bit stream merging apparatus 2200, the first receiving means 211 is operated to receive the transcoded MPEG-2 bit stream 12 transmitted by the first transmission means 141.

The merging storage means 220 is operated to store the transcoded MPEG-2 bit stream 12 received by the first receiving means 211.

The request signal determining means 230 is operated to determine a request signal 15 for a requested differential bit stream 16 on the basis of the transcoded MPEG-2 bit stream 12 stored by the merging storage means 220. This means that the request signal determining means 230 is operated determine a requested differential bit stream 16 and a request signal 15 for the requested differential bit stream 16 on the basis of the transcoded MPEG-2 bit stream 12 stored by the merging storage means 220.

The request signal transmission means 213 is operated to transmit the request signal 15 for the requested differential bit stream 16 determined by the request signal determining means 230.

In the bit stream separating apparatus 2100, the request signal receiving means 142 is operated to receive the request signal 15 for the requested differential bit stream 16 transmitted by the request signal transmission means 213 of the bit stream merging apparatus 2200.

The bit stream extracting means 130 is operated to extract the requested differential bit stream 16 from among bit streams stored in the separating storage means 120 in response to the request signal.

The second transmission means 143 is operated to transmit the requested differential bit stream 16 extracted by the bit stream extracting means 130 from among bit streams stored in the separating storage means 120 to the bit stream merging apparatus 2200.

In the bit stream merging apparatus 2200, the second receiving means 212 is operated to receive the requested differential bit stream 16 transmitted by the second transmission means 143 of the bit stream separating apparatus 2100.

The merging bit stream extracting means 241 is operated to extract the transcoded MPEG-2 bit stream 14 from among bit streams stored in the merging storage means 220.

The merging means 242 is operated to merge the transcoded MPEG-2 bit stream 14 extracted by the merging bit stream extracting means 241 with the requested differential bit stream 16 received by the second receiving means 212 to reconstruct the original MPEG-2 bit stream 17.

The outputting means b1 is operated to input the reconstructed original MPEG-2 bit stream 17 from the merging means 242 to be outputted therethrough.

According to the present invention, the bit stream merging apparatus 2200 may further comprise a decoding means 225 for decoding the transcoded MPEG-2 bit stream 12 received by the first receiving means 211.

The second embodiment of the bit stream separating and merging system 1000 thus constructed makes it possible for a user to receive a transcoded MPEG-2 bit stream at a bit rate lower than that of an original MPEG-2 bit stream to decode, reproduce, and preview low-quality picture information, and later receive a differential bit stream to be merged with the transcoded MPEG-2 bit stream earlier received to reproduce high-quality picture information, thereby effectively utilize the transcoded MPEG-2 bit streams and the transmitting paths.

The bit stream merging apparatus 2200 according to the present invention, may comprise original bit stream storage means, not shown, for inputting and storing the reconstructed original MPEG-2 bit stream 17 reconstructed by the merging means 242. Alternatively, the merging storage means 220 of the bit stream merging apparatus 2200 according to the present invention may input and store the reconstructed original MPEG-2 bit stream reconstructed by the merging means 242. The bit stream merging apparatus 2200 thus constructed enables to store the reconstructed original MPEG-2 bit stream once reconstructed, thereby eliminating the time and effort to resend the transcoded MPEG-2 bit stream or the differential bit stream. The original bit stream storage means constitute the reconstructed first coded signal storage means according to the present invention.

III. Third embodiment of Bit Stream Separating and Merging System 3000

Figure 7:
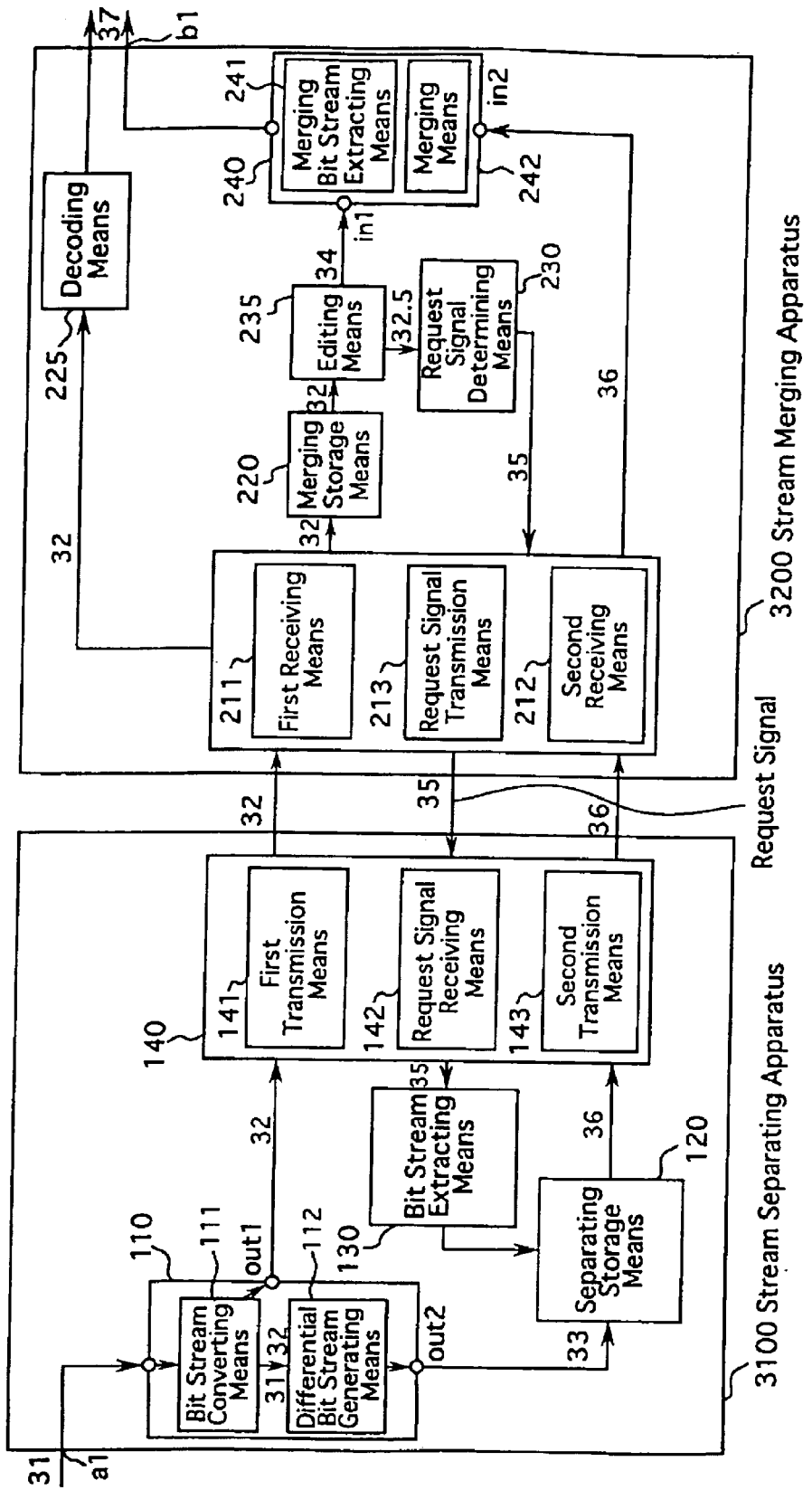
FIG. 7 is a block diagram of a third preferred embodiment of a bit stream separating and merging system 3000 according to the present invention.

Referring to FIG. 7 of the drawings, there is shown a third preferred embodiment of a bit stream separating and merging system 3000 according to the present invention.

The third preferred embodiment of the bit stream separating and merging system 3000 according to the present invention is shown in FIG. 7 as comprising a bit stream separating apparatus 3100 and a bit stream merging apparatus 3200. The bit stream separating apparatus 3100 and the bit stream merging apparatus 3200 are similar in construction as the bit stream separating apparatus 2100 and the bit stream merging apparatus 2200 except for the fact that the bit stream merging apparatus 3200 further comprises editing means 235 in addition to the request signal determining means 230.

The editing means 235 is adapted to cut and combine component parts of the transcoded MPEG-2 bit stream stored by the merging storage means 220 to generate an edited MPEG-2 bit stream in a desired size.

Some moving picture information is required to be promptly transmitted but not required to maintain a high picture quality. News moving picture information, for instance, is required to be instantaneously transmitted to editors. The editors, on the other hand, can review and edit the news moving picture information as long as the news moving picture information has a minimum picture quality.

In the third preferred embodiment of the bit stream separating and merging system 3000 according to the present invention, the bit stream separating apparatus 3100 is adapted to input an original MPEG-2 bit stream 31 to separate into a transcoded MPEG-2 bit stream 32 and a differential bit stream 33, and store the differential bit stream 33 in the separating storage means 120 and transmit the transcoded MPEG-2 bit stream 32 to the bit stream merging apparatus 3200. The bit rate of the transcoded MPEG-2 bit stream 32 is lower than that of the original MPEG-2 bit stream 31, thereby making it possible for the bit stream separating apparatus 3100 to transmit the transcoded MPEG-2 bit stream 32 to the bit stream merging apparatus 3200 faster than the original MPEG-2 bit stream 31.

The bit stream merging apparatus 3200, on the other hand, can edit the transcoded MPEG-2 bit stream 32 thus received to generate an edited transcoded MPEG-2 bit stream 32.5 in a desired size. The request signal determining means 230 is adapted to determine a requested differential bit stream 36 to be merged with the edited transcoded MPEG-2 bit stream 32.5, and a request signal 35 for the requested differential bit stream 36 on the basis of the edited transcoded MPEG-2 bit stream 32.5, and then transmit the request signal 35 for the requested differential bit stream 36 to the bit stream separating apparatus 3100.

In response to the request signal 35 for the requested differential bit stream 36, the bit stream separating apparatus 3100 is adapted to extract the requested differential bit stream 36 from among the stored differential bit stream, and transmit the requested differential bit stream 36 to the bit stream merging apparatus 3200.

Upon receiving the requested differential bit stream 36, the bit stream merging apparatus 3200 is adapted to merge the edited transcoded MPEG-2 bit stream 32.5 and the requested differential bit stream 36 to reconstruct the original MPEG-2 bit stream 37 in the desired size.

The bit stream separating and merging system 3000 makes it possible for a user to firstly receive and edit the transcoded MPEG-2 bit stream 32 and then later receive the differential bit stream 36 corresponding to the edited MPEG-2 bit stream 32.5 to reconstruct the original MPEG-b bit stream 37 used to reproduce high-quality moving picture information in the edited size.

The bit stream separating apparatus 3100 is not required to transmit all of the differential bit stream but requested parts of the differential bit stream only, thereby reducing the volume of the differential bit stream to be transmitted.

The operation of the bit stream separating and merging system 3000 will be described with reference to FIG. 7 hereinlater. The same operation as that of the bit stream separating and merging system 2000 will be omitted for avoiding tedious repetition.

The editing means 235 is operated to cut and combine component parts of the transcoded MPEG-2 bit stream 32 stored by the merging storage means 220 to generate an edited transcoded MPEG-2 bit stream 32.5 in a desired size.

The request signal determining means 230 is operated to determine a request signal 35 for a requested differential bit stream 36 on the basis of the edited transcoded MPEG-2 bit stream 32.5 generated by the editing means 235. This means that the request signal determining means 230 is operated to determine a requested differential bit stream 36 and a request signal 35 for the requested differential bit stream 36 on the basis of the edited transcoded MPEG-2 bit stream 32.5 generated by the editing means 235.

The request signal transmission means 213 is operated to transmit the request signal 35 for the requested differential bit stream 36 determined by the request signal determining means 230 to the bit stream separating apparatus 3100.

In the bit stream separating apparatus 3100, the separating bit stream extracting means 130 is operative to extract the requested differential bit stream 36 from among bit streams stored in the separating storage means 120 in response to the request signal 35.

The merging bit stream extracting means 241 is operated to extract the edited transcoded MPEG-2 bit stream 34 from among bit streams stored in the merging storage means 220.

The merging means 242 is operated to merge the edited transcoded MPEG-2 bit stream 34 extracted by the bit stream extracting means 241 with the requested differential bit stream 36 received by the second receiving means 212 to reconstruct the original MPEG-2 bit stream 37 in the desired size.

The third embodiment of the bit stream separating and merging system 3000 thus constructed makes it possible for a user to firstly receive and edit a transcoded MPEG-2 bit stream and then later receive a differential bit stream corresponding to the MPEG-2 bit stream thus edited to reconstruct an original MPEG-2 bit stream and reproduce high-quality moving picture information in an edited size, thereby enabling to promptly edit the original MPEG-2 bit stream and reduce the volume of the differential bit stream to be transmitted.

IV. Fourth Embodiment of Bit Stream Separating and Merging System 4000

Figure 8:
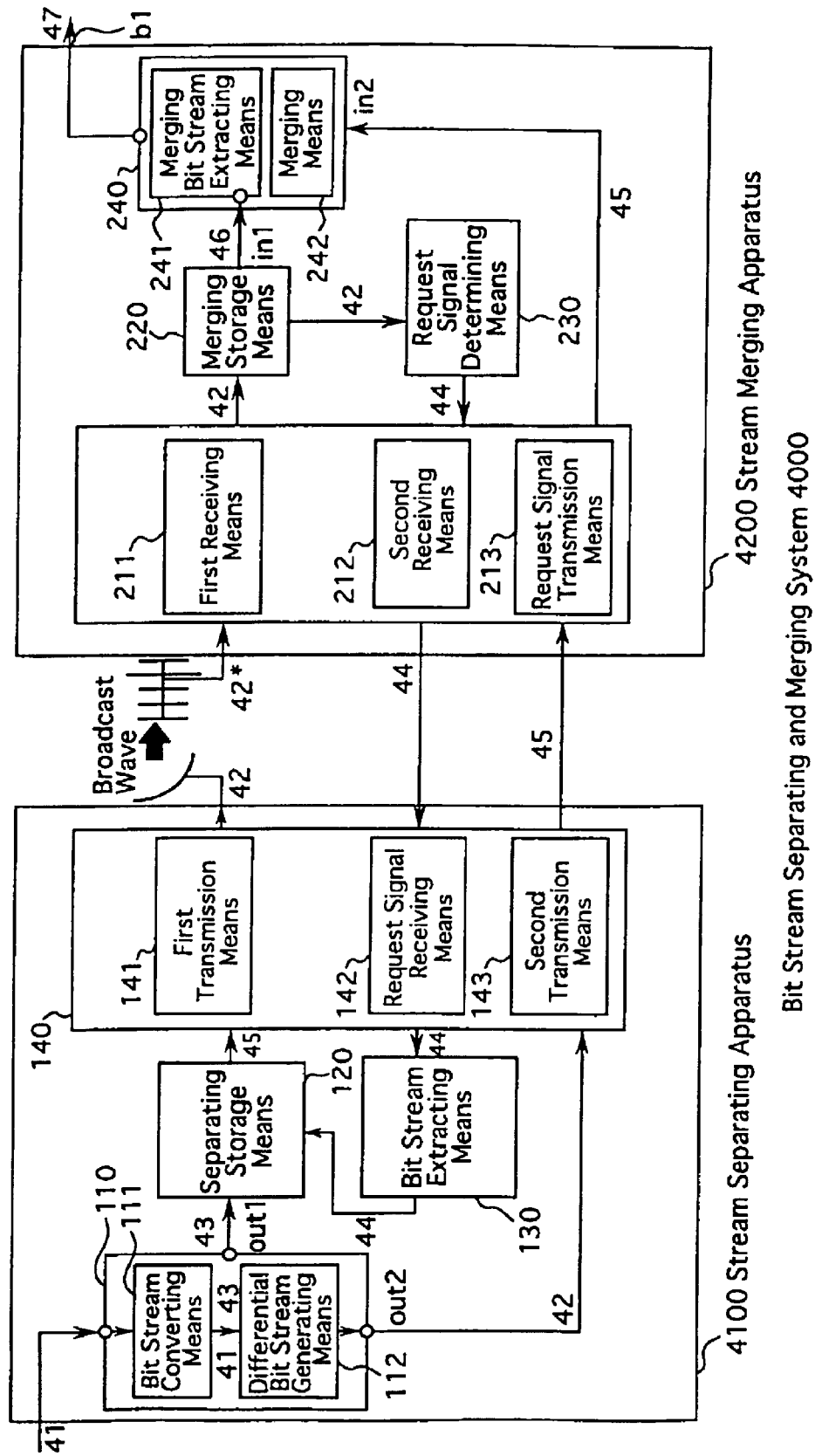
FIG. 8 is a block diagram of a fourth preferred embodiment of a bit stream separating and merging system 4000 according to the present invention.

Referring to FIG. 8 of the drawings, there is shown a fourth preferred embodiment of a bit stream separating and merging system 4000 according to the present invention.

The fourth preferred embodiment of the bit stream separating and merging system 4000 according to the present invention is shown in FIG. 8 as comprising a bit stream separating apparatus 4100 and a bit stream merging apparatus 4200.

The bit stream separating apparatus 4100 and the bit stream merging apparatus 4200 are similar in construction as the bit stream separating apparatus 1100 and the bit stream merging apparatus 1200 except for the fact that the bit stream separating apparatus 4100 is adapted to store the transcoded MPEG-2 bit stream in the separating storage means 120 and transmit the differential bit stream to the bit stream merging apparatus 2200, and the bit stream merging apparatus 4200 is adapted to firstly receive the differential MPEG-2 bit stream and later receive the transcoded MPEG-2 bit stream.

In the second embodiment of the bit stream separating and merging system 2000, the bit stream separating apparatus 2100 is adapted to firstly transmit the transcoded MPEG-2 bit streams to the bit stream merging apparatus 2200 and later transmit the differential bit streams to the bit stream merging apparatus 2200 in response to the request signal transmitted by the bit stream merging apparatus 2200.

In the embodiment of the bit stream separating and merging system 4000 according to the present invention, the bit stream separating apparatus 4100, on the other hand, is adapted to firstly transmit the differential bit streams to the bit stream merging apparatus 4200 and later transmit the transcoded MPEG-2 bit streams in response to the request signal transmitted by the bit stream merging apparatus 4200.

A program provider, i.e., a broadcast station, for instance, can deliver differential bit streams to a plurality of subscribers in their homes. The differential bit streams delivered are automatically stored in home servers or local storages in respective homes.

When a subscriber wants to watch a specific film program, the subscriber can transmit a request signal for a requested transcoded MPEG-2 bit stream to be merged with the differential bit stream earlier delivered containing the film program to be watched, to the broadcast station. In response to the request signal, the broadcast station can transmit the requested transcoded MPEG-2 bit stream to the subscriber and the subscriber can watch the program by merging the requested transcoded MPEG-2 bit stream just received and the differential bit stream already stored. The subscriber can receive the transcoded MPEG-2 bit stream faster than the original MPEG-2 bit stream since the bit rate of the transcoded MPEG-2 bit stream is lower than that of the original MPEG-2 bit stream. This means that the bit stream separating and merging system 4000 can promptly deliver the moving picture information to subscribers.

Furthermore, the differential bit stream earlier delivered to subscribers cannot be decoded, thereby preventing the illegal copy of the moving picture information.

The operation of the bit stream separating and merging system 4000 will be described with reference to FIG. 8 hereinlater. The same operation as that of the bit stream separating and merging system 1000 will be omitted.

In the bit stream separating apparatus 4100, the inputting means a1 is operated to input an original MPEG-2 bit stream 41 therethrough to be outputted to the bit stream converting means 111.

The bit stream converting means 111 is operated to convert the original MPEG-2 bit stream 41 inputted through the inputting means a1 to generate the transcoded MPEG-2 bit stream 43 to be outputted to the differential bit stream generating means 112 and the separating storage means 120 through the interface out1. The bit stream converting means 111 is also operated to output the original MPEG-2 bit stream 41 inputted through the inputting means a1 to the differential bit stream generating means 112.

The differential bit stream generating means 112 is operated to input the original MPEG-2 bit stream 41 and the transcoded MPEG-2 bit stream 43 from the bit stream converting means 111 to generate a differential bit stream 42 to be outputted to the first transmission means 141 through the interface out2.

The separating storage means 120 is operated to input and store the transcoded MPEG-2 bit stream 43 generated by the bit stream converting means 111.

The first transmission means 141 is operated to input and transmit the differential bit stream 42 generated by the differential bit stream generating means 112 to the bit stream merging apparatus 4200.

In the bit stream merging apparatus 4200, the first receiving means 211 is operated to receive the differential bit stream 42 transmitted by the first transmission means 141.

The merging storage means 220 is operated to store the differential bit stream 42 received by the first receiving means 211.

The request signal determining means 230 is operated to determine a requested transcoded MPEG-2 bit stream 45 and a request signal 44 for the requested transcoded MPEG-2 bit stream 45 on the basis of the differential bit stream 42 stored by the merging storage means 220.

The request signal transmission means 213 is operated to transmit the request signal 44 for the requested transcoded MPEG-2 bit stream 45 determined by the request signal determining means 230.

In the bit stream separating apparatus 4100, the request signal receiving 142 is operated to receive the request signal 44 transmitted by the request signal transmission means 213.

The separating bit stream extracting means 130 is operated to extract the requested transcoded MPEG-2 bit stream 45 from among bit streams stored in the separating storage means 120 in response to the request signal 44.

The second transmission means 143 is operated to transmit the requested transcoded MPEG-2 bit stream 45 extracted by the separating bit stream extracting means 130 to the bit stream merging apparatus 4200.

In the bit stream merging apparatus 4200, the second receiving means 212 is operated to receive the requested transcoded MPEG-2 bit stream 45 transmitted by the second transmission means 143 of the bit stream separating apparatus 4100.

The merging bit stream extracting means 241 is operated to extract the differential bit stream 46 stored by the merging storage means 220.

The merging means 242 is operated to merge the differential bit stream 46 extracted by the merging bit stream extracting means 241 with the transcoded MPEG-2 bit stream 45 received by the second receiving means 212 to reconstruct the original MPEG-2 bit stream 47.

According to the present invention, the first transmission means 141 of the bit stream separating apparatus 4100 and the first receiving means 211 of the bit stream merging apparatus 4200 may transmit and receive bit streams by way of broadcasting.

The fourth embodiment of the bit stream separating and merging system 4000 thus constructed enables to firstly deliver the differential bit stream to a user in their homes and later transmit the transcoded MPEG-2 bit stream to the user in response to the request signal, thereby promptly delivering moving picture information and preventing the illegal copy of the moving picture information.

V. Fifth Embodiment of Bit Stream Separating and Merging System 5000

Figure 9:
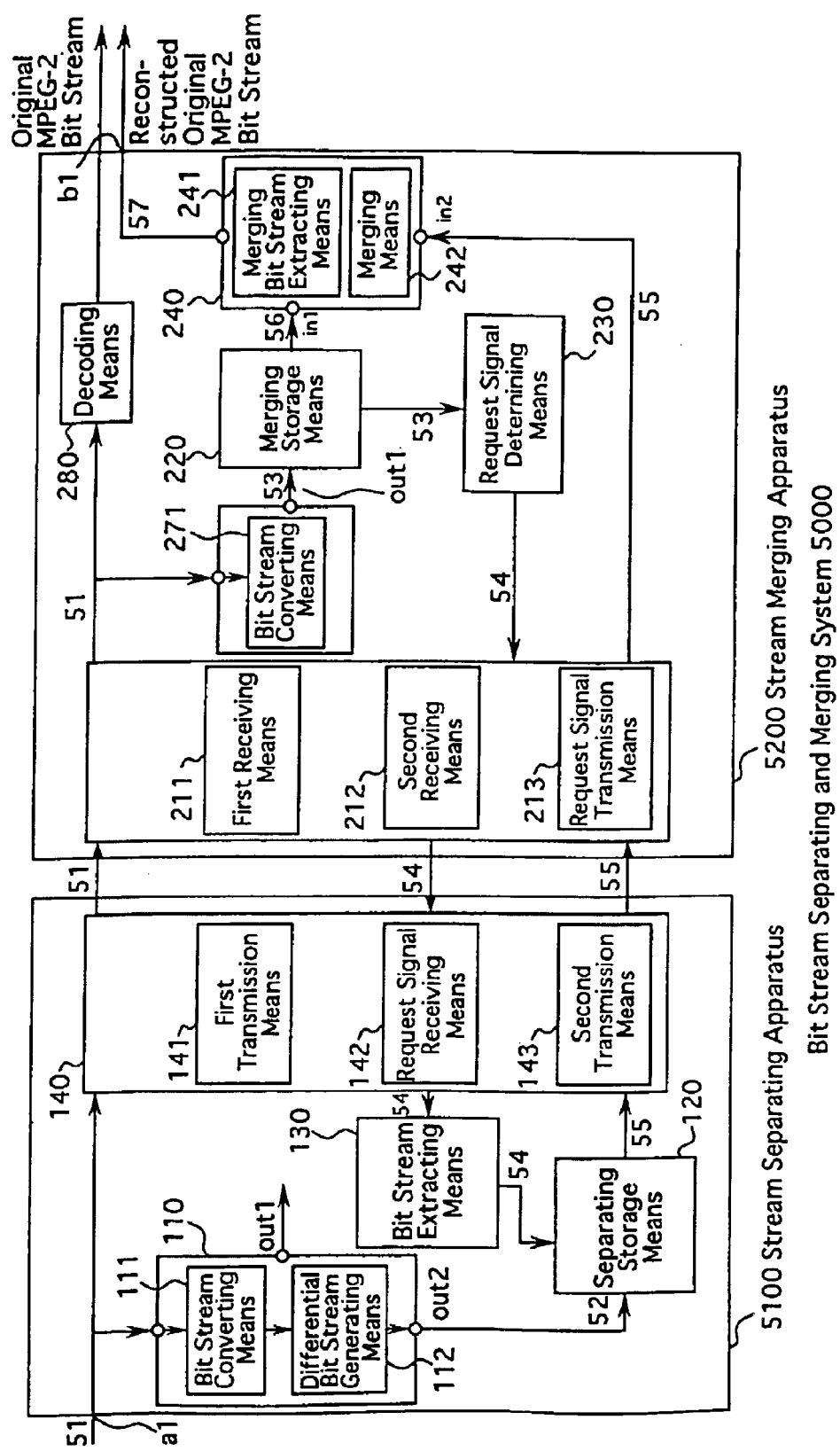
FIG. 9 is a block diagram of a fifth preferred embodiment of a bit stream separating and merging system 5000 according to the present invention.

Referring FIG. 9 of the drawings, there is shown a fifth preferred embodiment of a bit stream separating and merging system 5000 according to the present invention. The same constitutional elements are simply represented by the same reference numerals as those of the bit stream separating apparatus 1100 and the bit stream merging apparatus 1200, and will be thus omitted from description for avoiding tedious repetition.

The fifth preferred embodiment of the bit stream separating and merging system 5000 according to the present invention is shown in FIG. 9 as comprising a bit stream separating means 5100 and a bit stream merging apparatus 5200.

The bit stream merging apparatus 5200 further comprises a decoding means 280 for decoding MPEG-2 bit streams and merging bit stream converting means 271 for transcoding the original MPEG-2 bit stream to generate a transcoded MPEG-2 bit stream. The merging bit stream converting means 271 constitutes bit stream converting means according to the present invention.

In the fifth embodiment of the bit stream separating and merging system 5000 according to the present invention, the bit stream separating apparatus 5100 is adapted to transmit the original MPEG-2 bit stream to the bit stream merging apparatus 5200.

The bit stream merging apparatus 5200 thus constructed is adapted to decode and reproduce high quality moving picture information from the original MPEG-2 bit stream 51 transmitted by the bit stream separating apparatus 5100, and transcode the original MPEG-2 bit stream 51 to generate the transcoded MPEG-2 bit stream 53 to be stored in the merging storage means 220. The bit stream separating apparatus 5100 is adapted to store the differential bit stream 52 in the separating storage means 120.

The bit stream separating and merging system 5000 thus constructed does not need to store the original MPEG-2 bit stream 51, which has a large bit rate in comparison with bit rates of the transcoded MPEG-2 bit stream 53 and the differential bit stream 52, thereby enabling to save the storage capacity of the bit stream separating apparatus 5100 and the bit stream merging apparatus 5200.

The operation of the bit stream separating and merging system 5000 will be described with reference to FIG. 9 hereinlater. The same operation as that of the bit stream separating and merging system 1000 will be omitted.

In the bit stream separating apparatus 5100, the inputting means a1 is operated to input an original MPEG-2 bit stream 51 therethrough to be outputted to the bit stream converting means 111 and the first transmission means 141.

The bit stream converting means 111 is operated to convert the original MPEG-2 bit stream 51 inputted through the inputting means a1 to generate the transcoded MPEG-2 bit stream to be outputted to the differential bit stream generating means 112. The bit stream converting means 111 is also operated to output the original MPEG-2 bit stream 51 inputted through the inputting means a1 to the differential bit stream generating means 112.

The differential bit stream generating means 112 is operated to input the original MPEG-2 bit stream 51 and the transcoded MPEG-2 bit stream from the bit stream converting means 111 to generate a differential bit stream 52 to be outputted to the separating storage means 120 through the interface out2.

The separating storage means 120 is operated to input and store the differential bit stream 52 generated by the differential bit stream generating means 112.

The first transmission means 141 is operated to input and transmit the original MPEG-2 bit stream 51 inputted through the inputting means a1 to the bit stream merging apparatus 5200.

In the bit stream merging apparatus 5200, the first receiving means 211 is adapted to receive the original MPEG-2 bit stream 51 transmitted by the first transmission means 141 of the bit stream separating apparatus 5100.

The decoding means 280 is operated to input and decode the original MPEG-2 bit stream 51 received by the first receiving means 211.

The merging bit stream converting means 271 is operated to input the original MPEG-2 bit stream 51 received by the first receiving means 211 to generate a transcoded MPEG-2 bit stream 53.

The merging storage means 220 is operated to input and store the transcoded MPEG-2 bit stream 53 generated by the merging bit stream converting means 271.

The request signal determining means 230 is operated to determine a requested differential bit stream 55 and a request signal 54 for the requested differential bit stream 55 on the basis of the transcoded MPEG-2 bit stream 53 stored by the merging storage means 220.

The request signal transmission means 213 is operated to transmit the request signal 54 for the requested differential bit stream 55 determined by the request signal determining means 230 to the bit stream separating apparatus 5100.

In the bit stream separating apparatus 5100, the request signal receiving means 142 is operated to receive the request signal 54 transmitted by the request signal transmission means 213 of the bit stream merging apparatus 5200.

The separating bit stream extracting means 130 is operated to extract the requested differential bit stream 55 from among bit streams stored in the separating storage means 120 in response to the request signal 54.

The second transmission means 143 is operated to transmit the requested differential bit stream 55 extracted by the separating bit stream extracting means 130 to the bit stream merging apparatus 5200.

In the bit stream merging apparatus 5200, the second receiving means 212 is operated to receive the requested differential bit stream 55 transmitted by the second transmission means 143 of the bit stream separating apparatus 5100.

The merging bit stream extracting means 241 is operated to extract the transcoded MPEG-2 bit stream 56 from among bit streams stored in the merging storage means 220.

The merging means 242 is operated to merge the transcoded MPEG-2 bit stream 56 extracted by the merging bit stream extracting means 241 with the requested differential bit stream 55 received by the second receiving means 212 to reconstruct the original MPEG-2 bit stream 57 in the desired size.

The bit stream separating and merging system 5000 thus constructed does not need to store the original MPEG-2 bit stream, which has a large bit rate in comparison with bit rates of the transcoded MPEG-2 bit stream and the differential bit stream, thereby enabling to save the storage capacity of the bit stream separating apparatus 5100 and the bit stream merging apparatus 5200.

VI. Sixth Embodiment of Bit Stream Separating and Merging System 6000

Figure 10:
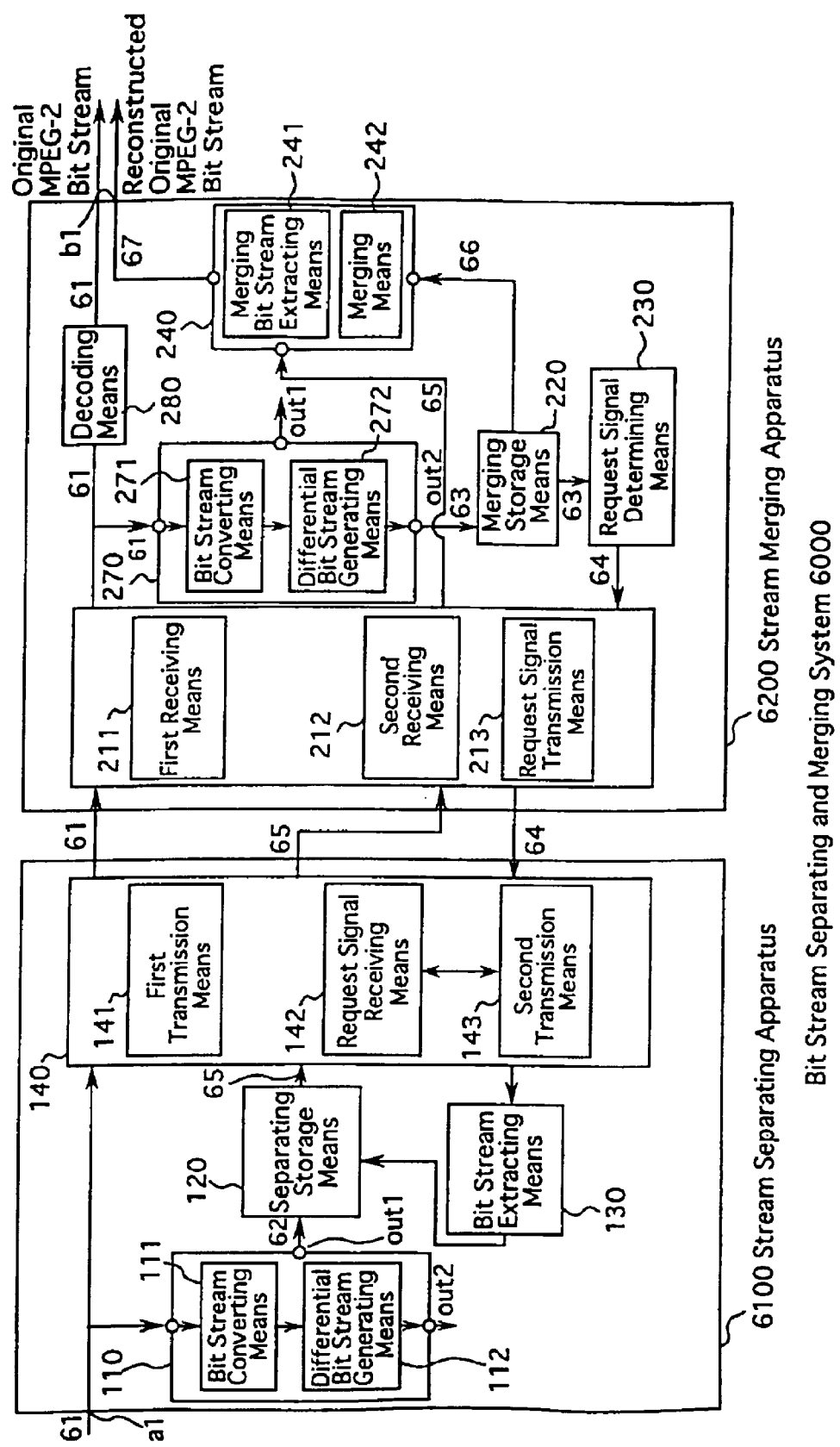
FIG. 10 is a block diagram of a sixth preferred embodiment of a bit stream separating and merging system 6000 according to the present invention.

Referring to FIG. 10 of the drawings, there is shown a sixth preferred embodiment of a bit stream separating and merging system 6000 according to the present invention.

The sixth preferred embodiment of the bit stream separating and merging system 6000 according to the present invention is shown in FIG. 10 as comprising a bit stream separating apparatus 6100 and a bit stream merging apparatus 6200. The same constitutional elements are simply represented by the same reference numerals as those of the bit stream separating apparatus 1100 and the bit stream merging apparatus 1200, and will be thus omitted from description.

The construction of the sixth embodiment of the bit stream separating and merging system 6000 is similar to that of the fourth embodiment of the bit stream separating and merging system 4000 except for the facts that the bit stream separating apparatus 6100 is adapted to transmit the transcoded MPEG-2 bit stream 61 and the bit stream merging apparatus 6200 is adapted to receive the original MPEG-2 bit stream 61 to generate a differential bit stream 63 and store the differential bit stream 63 thus generated.

The bit stream merging apparatus 6200 further comprises decoding means 280 and merging separating means 270. The decoding means 280 is adapted to decode a MPEG-2 bit stream. The merging separating means 270 is adapted to input the original MPEG-2 bit stream 61 to generate a differential bit stream 64. The merging separating means 270 constitutes merging differential coded signal generating means according to the present invention.

More specifically, the merging separating means 270 includes bit stream converting means 271 and differential bit stream generating means 272 as shown in FIG. 10. The bit stream converting means 271 is adapted to input the original MPEG-2 bit stream 60 to generate a transcoded MPEG-2 bit stream. The bit stream converting means 271 is adapted to output the original MPEG-2 bit stream 61 and the transcoded MPEG-2 bit stream thus generated to the differential bit stream generating means 272. The differential bit stream generating means 272 is adapted to input the original MPEG-2 bit stream 61 and the transcoded MPEG-2 bit stream from the bit stream converting means 271 to generate a differential bit stream 64.

The bit stream separating and merging system 6000 thus constructed does not need to store the original MPEG-2 bit stream, which has a large bit rate in comparison with bit rates of the transcoded MPEG-2 bit stream and the differential bit stream, thereby enabling to save the storage capacity of the bit stream separating apparatus 6100 and the bit stream merging apparatus 6200.

The operation of the bit stream separating and merging system 6000 will be described with reference to FIG. 10 hereinlater. The same operation described hereinearlier will be omitted.

In the bit stream separating apparatus 6100, the inputting means a1 is operated to input an original MPEG-2 bit stream 61 therethrough to be outputted to the bit stream converting means 111 and the first transmission means 141.

The bit stream converting means 111 is operated to convert the original MPEG-2 bit stream 61 inputted through the inputting means a1 to generate a transcoded MPEG-2 bit stream 62 to be outputted to the merging storage means 120 through the interface out1.

The separating storage means 120 is operated to input and store the transcoded MPEG-2 bit stream 62 generated by the bit stream converting means 111.

The first transmission means 141 is operated to transmit the original MPEG-2 bit stream 61 inputted through inputting means a1 to the bit stream merging apparatus 6200.

In the bit stream merging apparatus 6200, the first receiving means 211 is operated to receive the original MPEG-2 bit stream 61 transmitted by the first transmission means 141 of the bit stream separating apparatus 6100.

The decoding means 280 is operated to decode the original MPEG-2 bit stream 61 received by the first receiving means 211.

The merging bit stream converting means 271 is operated to input the original MPEG-2 bit stream 61 received by the first receiving means 211 to generate a transcoded MPEG-2 bit stream.

The merging differential bit stream generating means 272 is operated to input the original MPEG-2 bit stream 61 received by the first receiving means 211 and the transcoded MPEG-2 bit stream generated by the merging bit stream converting means 271 to generate the differential bit stream 63.

The merging storage means 220 is operated to store the differential bit stream 63 thus generated by the merging separating means 270.

The request signal determining means 230 is operated to determine a requested transcoded MPEG-2 bit stream 65 and a request signal 64 for the requested transcoded MPEG-2 bit stream 65 on the basis of the differential bit stream 63 stored by the merging storage means 220.

The request signal transmission means 213 is operated to transmit the request signal 64 for the requested transcoded MPEG-2 bit stream 65 determined by the request signal determining means 230 to the bit stream separating apparatus 6100.

In the bit stream separating apparatus 6100, the request signal receiving means 142 is operated to receive the request signal 64 transmitted by the request signal transmission means 213 of the bit stream merging apparatus 6200.

The separating bit stream extracting means 130 is operated to extract the requested transcoded MPEG-2 bit stream 65 from among bit streams stored in the separating storage means 120 in response to the request signal 64.

The second transmission means 143 is operated to transmit the requested transcoded MPEG-2 bit stream 65 extracted by the separating bit stream extracting means 130 to the bit stream merging apparatus 6200.

In the bit stream merging apparatus 6200, the second receiving means 212 is operated to receive the requested transcoded MPEG-2 bit stream 65 transmitted by the second transmission means 143 of the bit stream separating apparatus 6100.

The merging bit stream extracting means 241 is operated to extract the differential MPEG-2 bit stream 66 from among bit streams stored in the merging storage means 220.

The merging means 242 is operated to merge the differential bit stream 66 extracted by the merging bit stream extracting means 241 with the requested transcoded MPEG-2 bit stream 65 received by the second receiving means 212 to reconstruct the original MPEG-2 bit stream 67 in the desired size.

The bit stream separating and merging system 6000 thus constructed does not need to store the original MPEG-2 bit stream, which has a large bit rate in comparison with bit rates of the transcoded MPEG-2 bit stream and the differential bit stream, thereby enabling to save the storage capacity of the bit stream separating apparatus 6100 and the bit stream merging apparatus 6200.

VII. Seventh Embodiment of Bit Stream Separating and Merging System 7000

Figure 11:
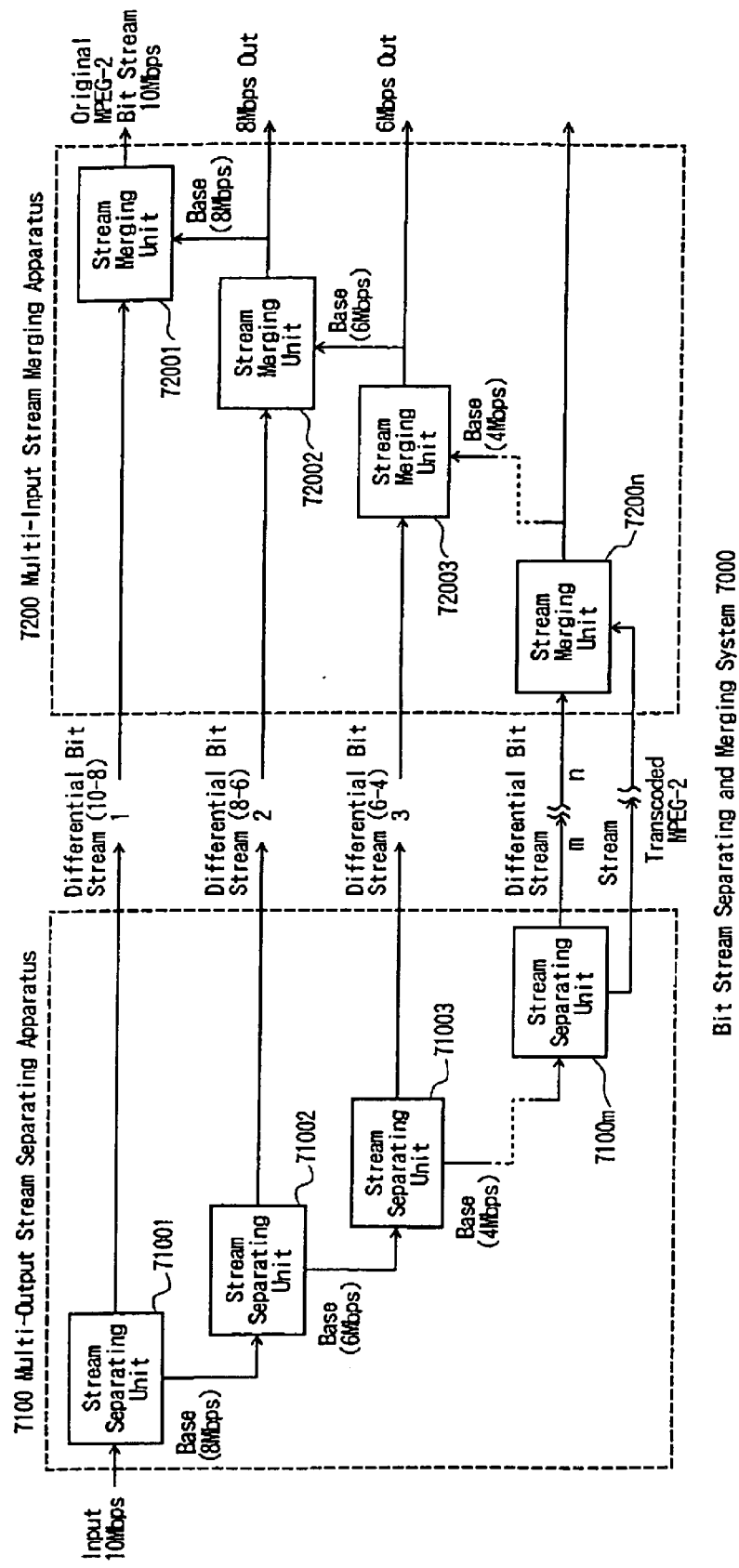
FIG. 11 is a block diagram of a seventh preferred embodiment of a bit stream separating and merging system 7000 according to the present invention.

Referring to FIG. 11 of the drawings, there is shown a seventh preferred embodiment of a bit stream separating and merging system 7000 according to the present invention.

Each of the above described embodiments of the bit stream separating and merging systems 1000 to 6000 comprises a single bit stream separating apparatus for inputting an original MPEG-2 bit stream to separate into a transcoded MPEG-2 bit stream and a differential bit stream, and a single bit stream merging apparatus for inputting a transcoded MPEG-2 bit stream and a differential MPEG-2 bit stream to reconstruct an original MPEG-2 bit stream.

The seventh preferred embodiment of the bit stream separating and merging system 7000, on the other hand, as best shown in FIG. 11, comprises a multi-output bit stream separating apparatus 7100 for inputting an original MPEG-2 bit stream to separate into a plurality of transcoded MPEG-2 bit streams and a plurality of differential bit streams; and a multi-input bit stream merging apparatus 7200 for inputting a plurality of transcoded MPEG-2 bit streams and a plurality of differential bit streams to reconstruct the original MPEG-2 bit. According to the present invention, the multi-input bit stream merging apparatus 7200 can also output a plurality of transcoded MPEG-2 bit streams.

In the bit stream separating and merging system 7000 thus constructed, the multi-output bit stream separating apparatus 7100 can input, for instance, an original MPEG-2 bit stream having a large bit rate to separate into and transmit one or more transcoded MPEG-2 bit streams and a plurality of differential bit streams and the multi-input bit stream merging apparatus 7200 can input and merge the one or more transcoded MPEG-2 bit streams and the differential bit streams thus multiple-times separated to reconstruct the original MPEG-2 bit stream of the large bit rate. Alternatively, the multi-input bit stream merging apparatus 7200 can reconstruct and output a plurality of transcoded MPEG-2 bit stream in addition to the original MPE-2 bit stream. Each of the transcoded MPEG-2 bit streams and the differential bit streams thus multiple-times separated has a small bit rate in comparison with a bit rate of the original MPEG-2 bit stream. The bit stream separating and merging system 7000 makes it possible to promptly and reliably transmit and receive an original MPEG-2 bit stream having a large bit rate by transmitting and receiving one or more transcoded MPEG-2 bit streams and a plurality of differential bit streams in place of the original MPEG-2 bit stream.

The constructions of the multi-output bit stream separating apparatus 7100 and the multi-input bit stream merging unit 7200 will be described in detail before describing the operation of the bit stream separating and merging system 7000. VII-A Multi-output Bit Stream Separating Apparatus 7100

Figure 12:
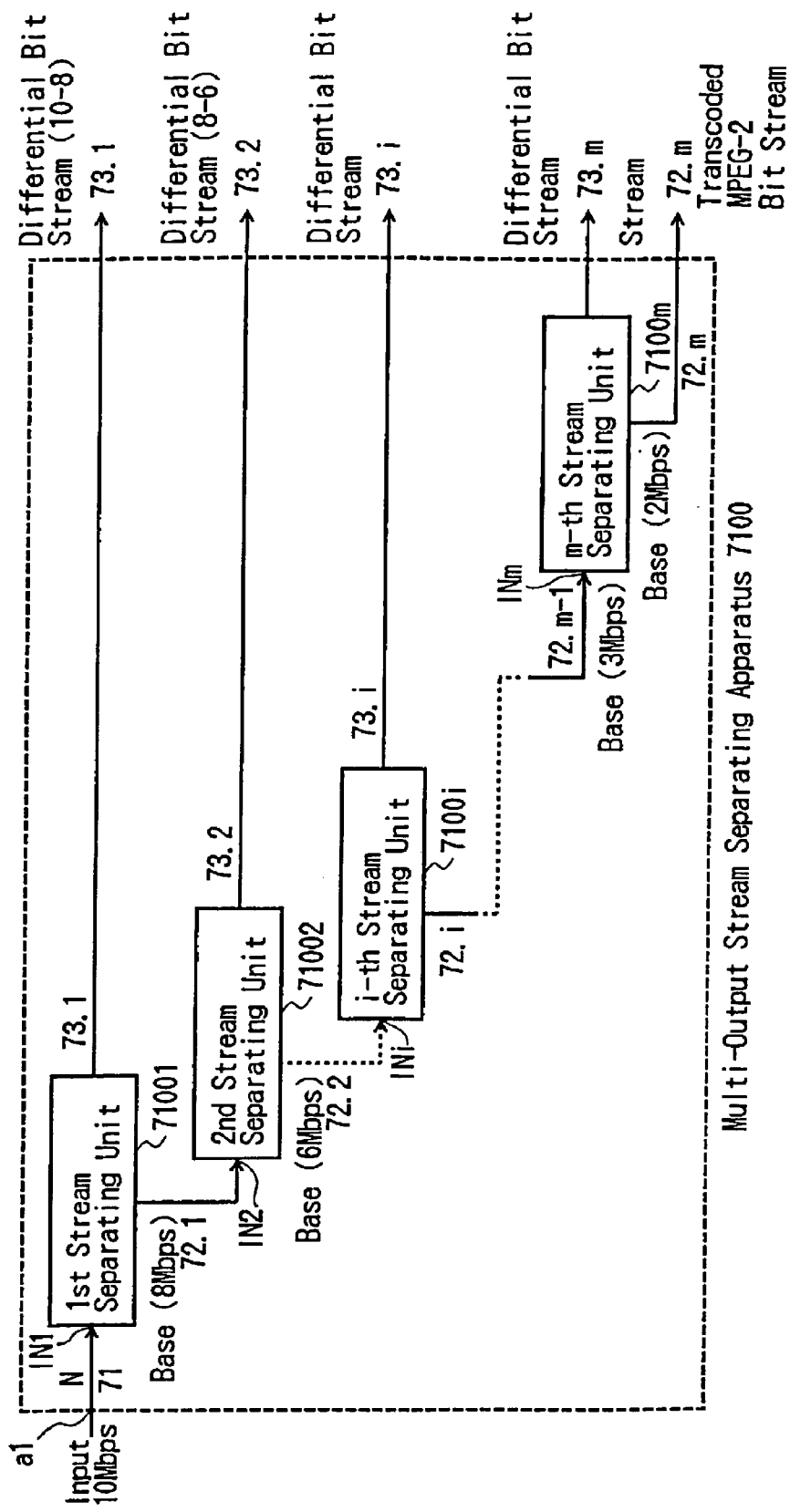
FIG. 12 is a block diagram of a multi-output bit stream separating apparatus 7100 according to the present invention.

Referring to FIG. 12 of the drawings, there is shown a multi-output bit stream separating apparatus 7100 for inputting an original MPEG-2 bit stream 71 to separate into one transcoded MPEG-2 bit streams and a plurality of differential bit streams. As shown in FIG. 12, the multi-output bit stream separating apparatus 7100 comprises a plurality (the number m) of bit stream separating units 71001 to 7100m including a 1st bit stream separating unit 71001 up to a m-th bit stream separating unit 7100m wherein m is an integer not less than two.

Each of the bit stream separating units 71001 to 7100m is entirely same in construction as that of the bit stream separating apparatus 1100 according to the present invention, which has previously been mentioned, and adapted to input a MPEG-2 bit stream to be transcoded, to separate into a transcoded MPEG-2 bit stream and a differential bit stream, which is a difference between the transcoded MPEG-2 bit stream and the MPEG-2 bit stream. The same constitutional elements are simply represented by the same reference numerals as those of the bit stream separating apparatus 1100 and will be thus omitted from description.

The multi-output bit stream separating apparatus 7100 will be described in reference to FIG. 12, hereinlater.

The 1st bit stream separating unit 71001 is adapted to input the original MPEG-2 bit stream 71 having a bit rate of 10 Mbps to separate into a 1st transcoded MPEG-2 bit stream 72.1 having a bit rate of 8 Mbps and a 1st differential bit stream 73.1 having a bit rate of 2 Mbps. The 1st differential bit stream 73.1 is a difference between the original MPEG-2 bit stream 71 and the 1st transcoded MPEG-2 bit stream 72.1. The 1st bit stream separating unit 71001 is adapted to output the 1st transcoded MPEG-2 bit stream 72.1 to the 2nd bit stream separating unit 71002.

The 2nd bit stream separating unit 71002 is adapted to input the 1st transcoded MPEG-2 bit stream 72.1 having a bit rate of 8 Mbps from the 1st bit stream separating unit 71001 to separate into a 2nd transcoded MPEG-2 bit stream 72.2 having a bit rate of 6 Mbps and a 2nd differential bit stream 73.2 having a bit rate of 2 Mbps. The 2nd differential bit stream 73.2 is a difference between the 1st transcoded MPEG-2 bit stream 72.1 and the 2nd transcoded MPEG-2 bit stream 72.2. The 2nd bit stream separating unit 71002 is adapted to output the 2nd transcoded MPEG-2 bit stream 72.3 to the 3rd bit stream separating unit 71003.

The multi-output bit stream separating apparatus 7100 thus constructed can transmit the original MPEG-2 bit stream having a bit rate of 10 Mbps by transmitting one transcoded MPEG-2 bit stream and a plurality of differential bit streams each having a bit rate lower than 10 Mbps.

Any one of the bit stream separating units 71001 to 7100m is hereinlater referred to as i-th bit stream separating unit 7100$i$ wherein i is an integer equal to or less than m.

The i-th bit stream separating unit 7100$i$ is adapted to input an (i−1)-th transcoded MPEG-2 bit stream 72.(i−1) from the (i−1) th bit stream separating unit 7100$i$−1 to separate into an i-th transcoded MPEG-2 bit stream 72.i and an i-th differential bit stream 73.i. The i-th bit stream separating unit 7100$i$ is adapted to output the i-th transcoded MPEG-2 bit stream 72.i to the (i+1)-th bit stream separating unit 7100$i$+1. Here, the i-th differential bit stream 73.i is intended to mean a difference between the (i−1)-th transcoded MPEG-2 bit stream 72.(i−1) and the i-th transcoded MPEG-2 bit stream 72.i.

According to the present invention, any one of the bit stream separating units 71001 to 7100m, i.e., an i-th bit stream separating unit 7100$i$ can transmit i-th transcoded MPEG-2 bit stream 72.1 to an external device such as a decoder. The multi-output bit stream separating apparatus 7100 thus constructed can input an original MPEG-2 bit stream to output a plurality of transcoded MPEG-2 bit stream and a plurality of differential bit streams.

For better understanding, the multi-output bit stream separating apparatus 7100 will be described in detail in reference to the i-th bit stream separating unit 7100$i$.

The i-th bit stream separating unit 7100$i$ is similar in construction as the bit stream separating apparatus 1100 shown in FIG. 2 as comprising an inputting terminal INi, i-th bit stream converting means 111$i$, i-th differential bit stream generating means 112$i$, i-th separating storage means 120$i$, i-th first transmission means 141$i$, i-th request signal receiving means 142$i$, i-th bit stream extracting means 130$i$, i-th second transmission means 143$i$, and i-th outputting interface OUTi.

The i-th inputting means INi is adapted to input the (i−1)-th transcoded MPEG-2 bit stream 72.(i−1) therethrough from the (i−1)-th bit stream separating unit 7100$i$−1. Here, 0-th transcoded MPEG-2 bit stream is the original MPEG-2 bit stream. 0-th bit stream separating unit is intended to mean the inputting means a1.

The (i−1)-th transcoded MPEG-2 bit stream 72.(i−1) is generated as a result of encoding original moving picture sequence signal and consists of a series of (i−1)-th picture information having (i−1)-th coefficient information. The (i−1)-th coefficient information includes a matrix of (i−1)-th coefficients.

The i-th bit stream converting means 111$i$ is adapted to convert the (i−1)-th transcoded MPEG-2 bit stream 72.(i−1) inputted through the i-th inputting means INI to generate the i-th transcoded MPEG-2 bit stream 72.i. The i-th bit stream converting means 111$i$ is adapted to output the i-th transcoded MPEG-2 bit stream 72.i thus generated to the (i+1)-th inputting means INi+1 of the (i+1)-th bit stream separating unit 7100$i$+1 through the interface out1. The i-th bit stream converting means 111$i$ is also adapted to output the (i−1)-th transcoded MPEG-2 bit stream 72.(i−1) and the i-th transcoded MPEG-2 bit stream 72.i to the i-th differential bit stream generating means 112$i$.

The i-th differential bit stream generating means 112$i$ is adapted to input the (i−1)-th transcoded MPEG-2 bit stream 72.(i−1) and the i-th transcoded MPEG-2 bit stream 72.i from the bit stream converting means 111$i$ to generate an i-th differential bit stream 73.i on the basis of the (i−1)-th second coefficient information obtained from the series of (i−1)-th second picture information of the (i−1)-th transcoded MPEG-2 bit stream 72.(i−1), and the i-th second coefficient information obtained from the series of the i-th second picture information of the transcoded MPEG-2 bit stream 72.i. The i-th differential bit stream 73.i is intended to mean a difference between the (i−1)-th transcoded MPEG-2 bit stream 72.(i−1) and the i-th transcoded MPEG-2 bit stream 72.i.

The i-th separating storage means 120$i$ is adapted to selectively store the (i−1)-th transcoded MPEG-2 bit stream 72.(i−1), the i-th transcoded MPEG-2 bit stream 72.i, and the i-th differential bit stream 73.i.

The i-th first transmission means 141$i$ is adapted to selectively transmit the (i−1)-th transcoded MPEG-2 bit stream, the i-th transcoded MPEG-2 bit stream 72.i, and the i-th differential bit stream 73.i to an external device such as, for instance, the i-th bit stream merging unit 7200$i$ of the multi-input bit stream merging apparatus 7200.

The i-th request signal receiving means 142$i$ is adapted to receive a request signal indicative of a requested bit stream to be transmitted. The request signal indicative of the requested bit stream is determined on the basis of a base signal, which is any one of the (i−1)-th transcoded MPEG-2 bit stream 72.(i−1), the i-th transcoded MPEG-2 bit stream 72.i, or the i-th differential bit stream 73.i.

The i-th separating bit stream extracting means 130$i$ is adapted to extract the requested bit stream from among bit streams stored in the i-th separating storage means 120$i$ in response to the request signal.

The i-th second transmission means 143$i$ is adapted to transmit the requested bit stream extracted by the i-th separating bit stream extracting means 130$i$.

VII-B Multi-input Bit Stream Merging Apparatus 7200

Figure 13:
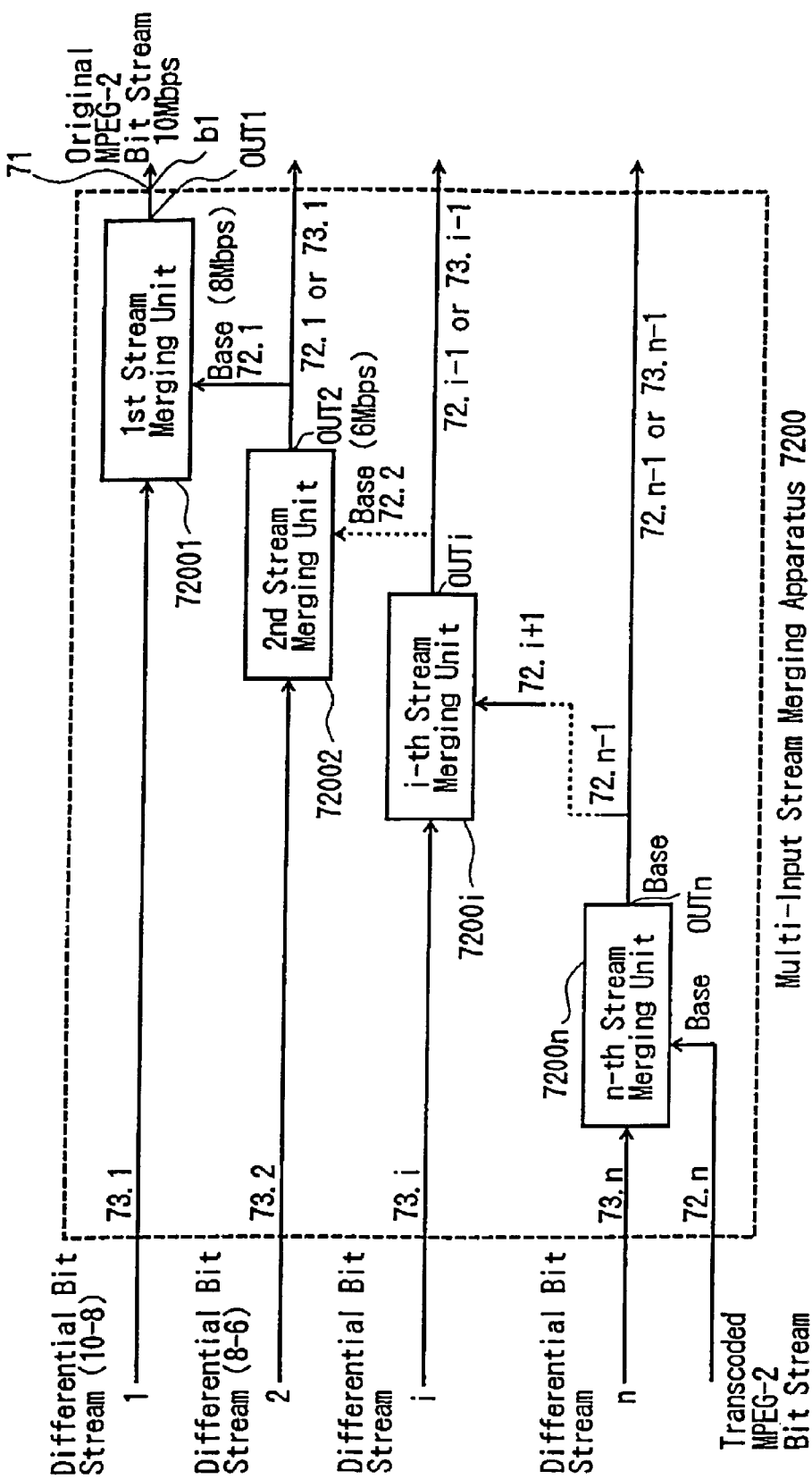
FIG. 13 is a block diagram of a multi-input bit stream merging apparatus 7200 according to the present invention.
Figure 14:
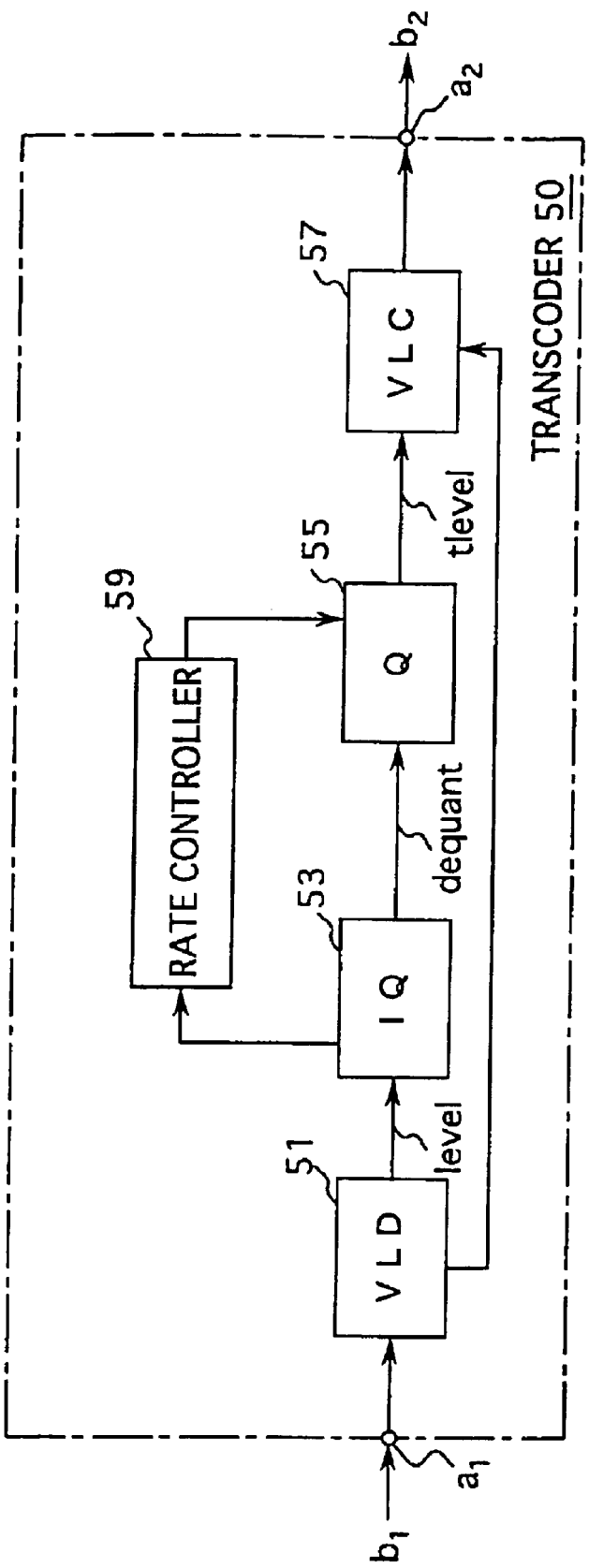
FIG. 14 is a schematic block diagram showing a first conventional transcoder 50.
Figure 15:
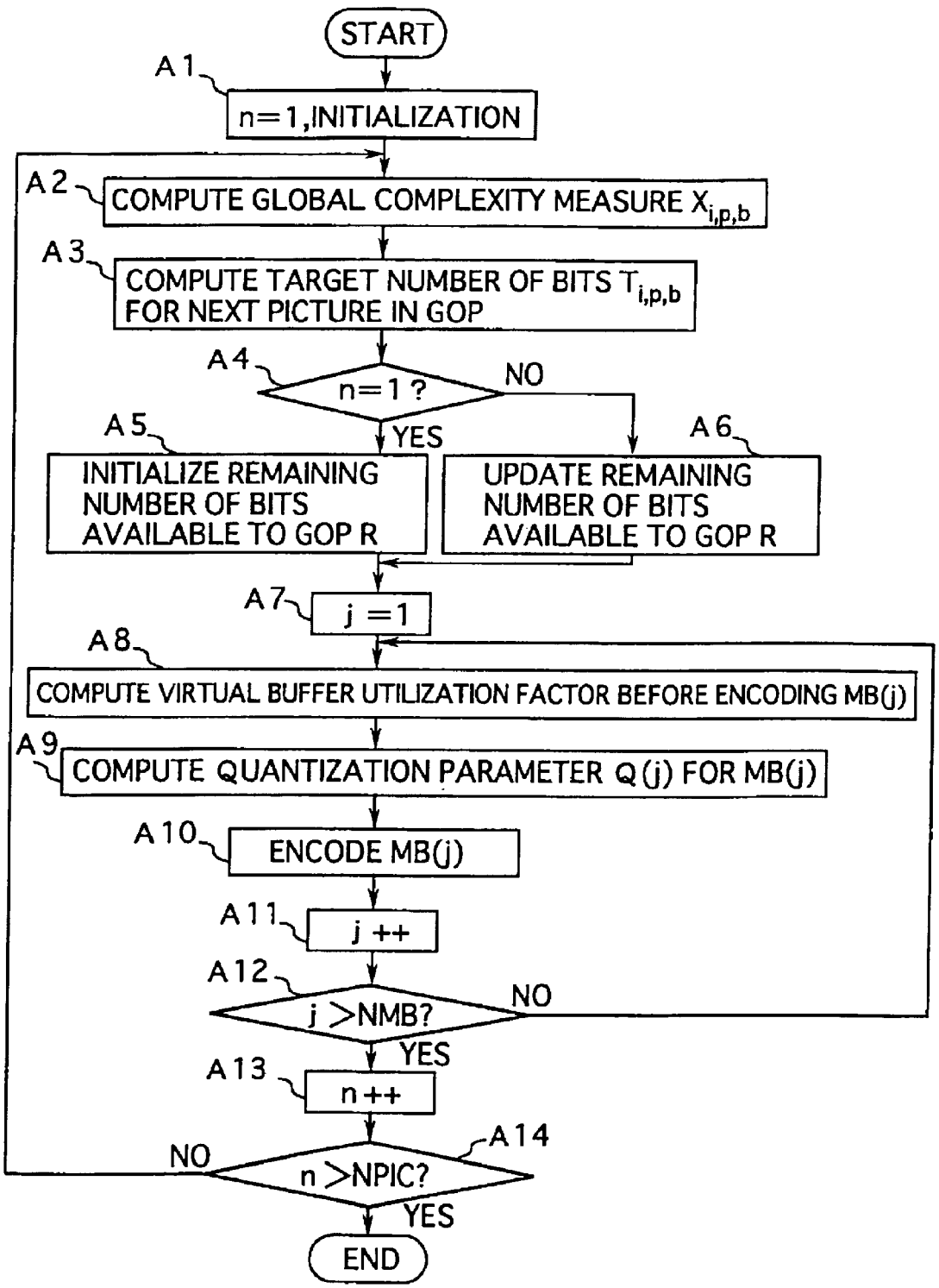
FIG. 15 is a flowchart showing the flow of the rate control operation of MPEG-2 performed by the first conventional transcoder 50 shown in FIG. 14.
Figure 16:
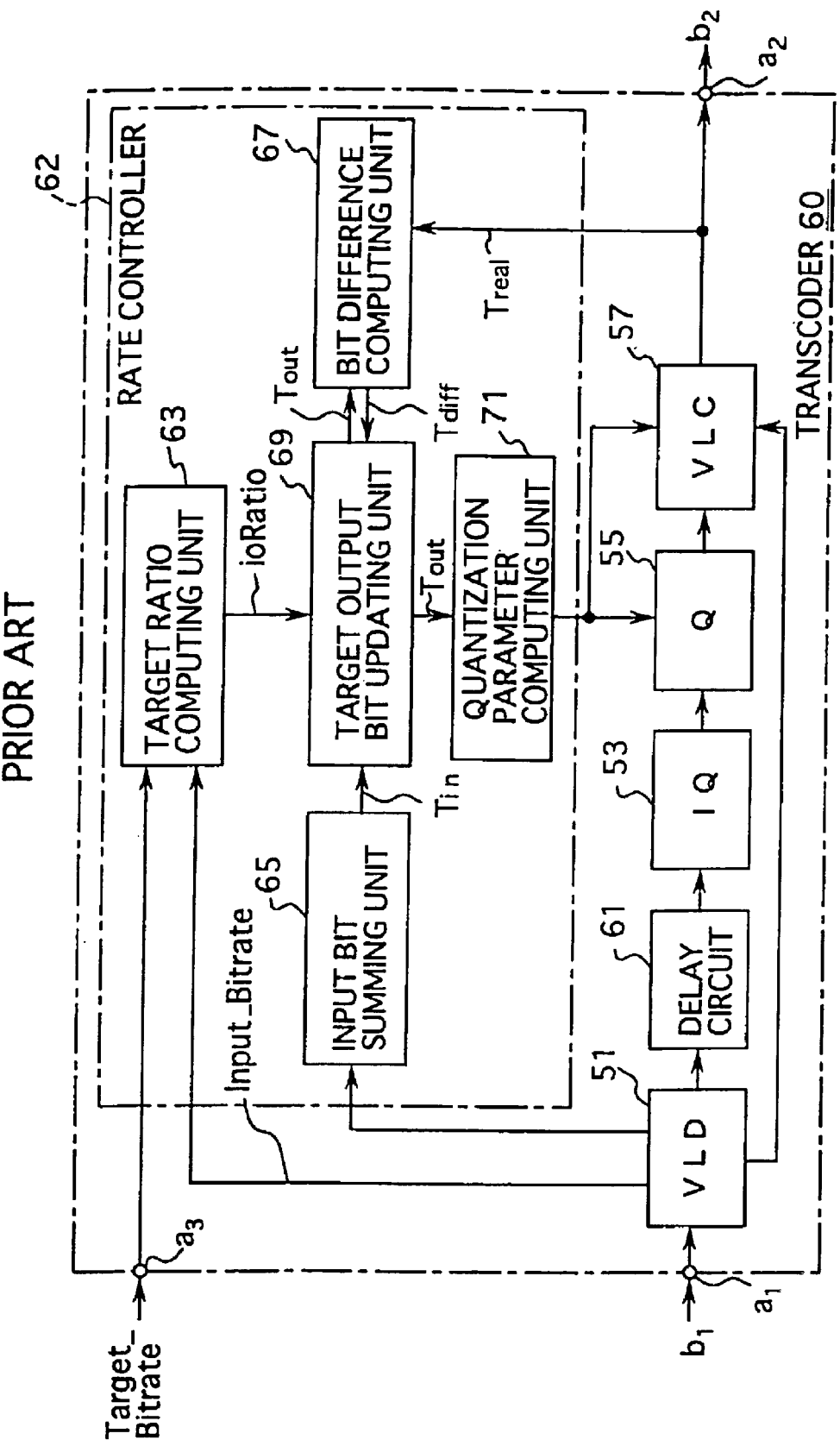
FIG. 16 is a schematic block diagram showing a second conventional transcoder 60.
Figure 17:
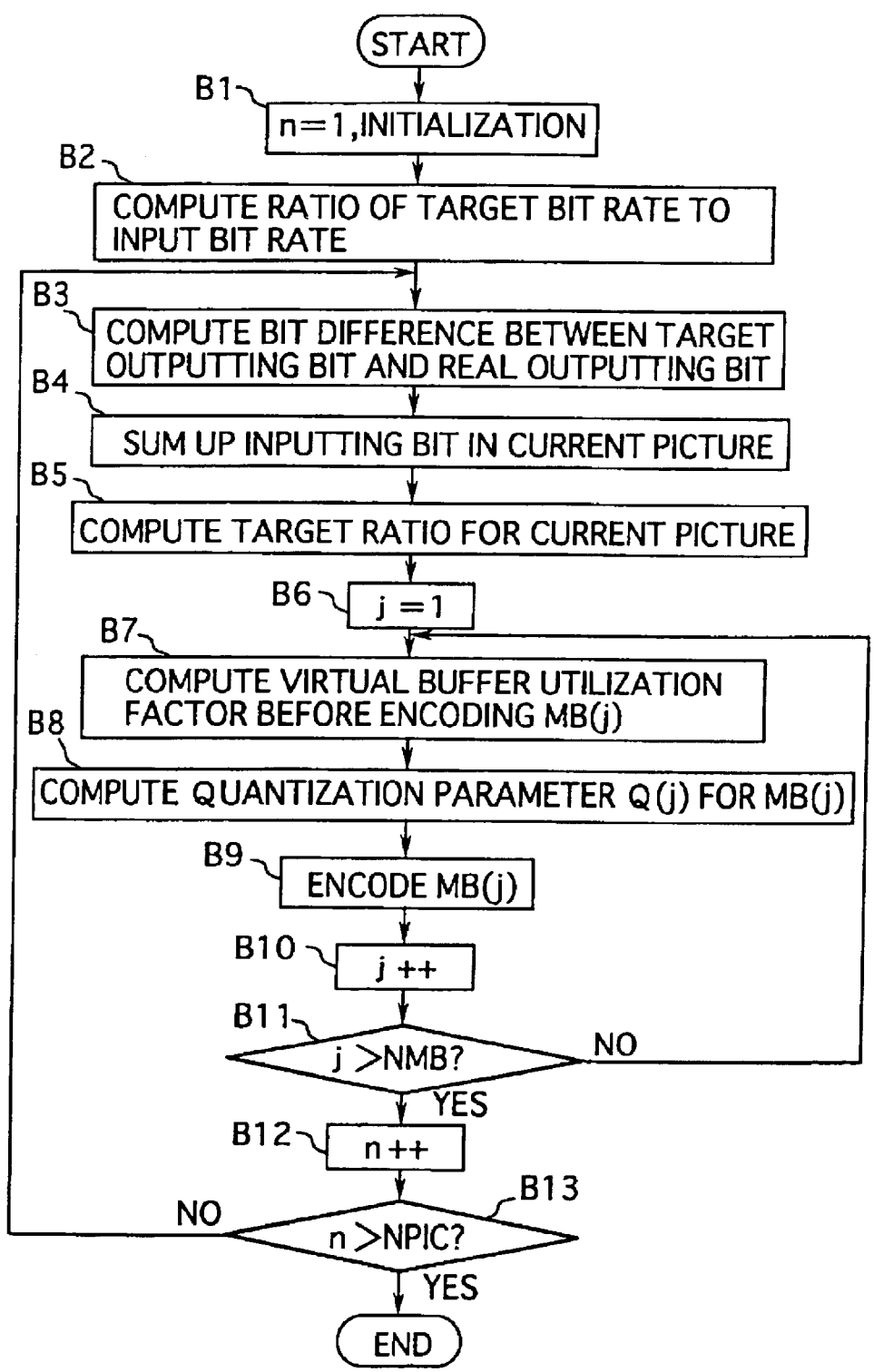
FIG. 17 is a flowchart showing the flow of the rate control operation of MPEG-2 performed by the second conventional transcoder 60 shown in FIG. 16.
Figure 18:
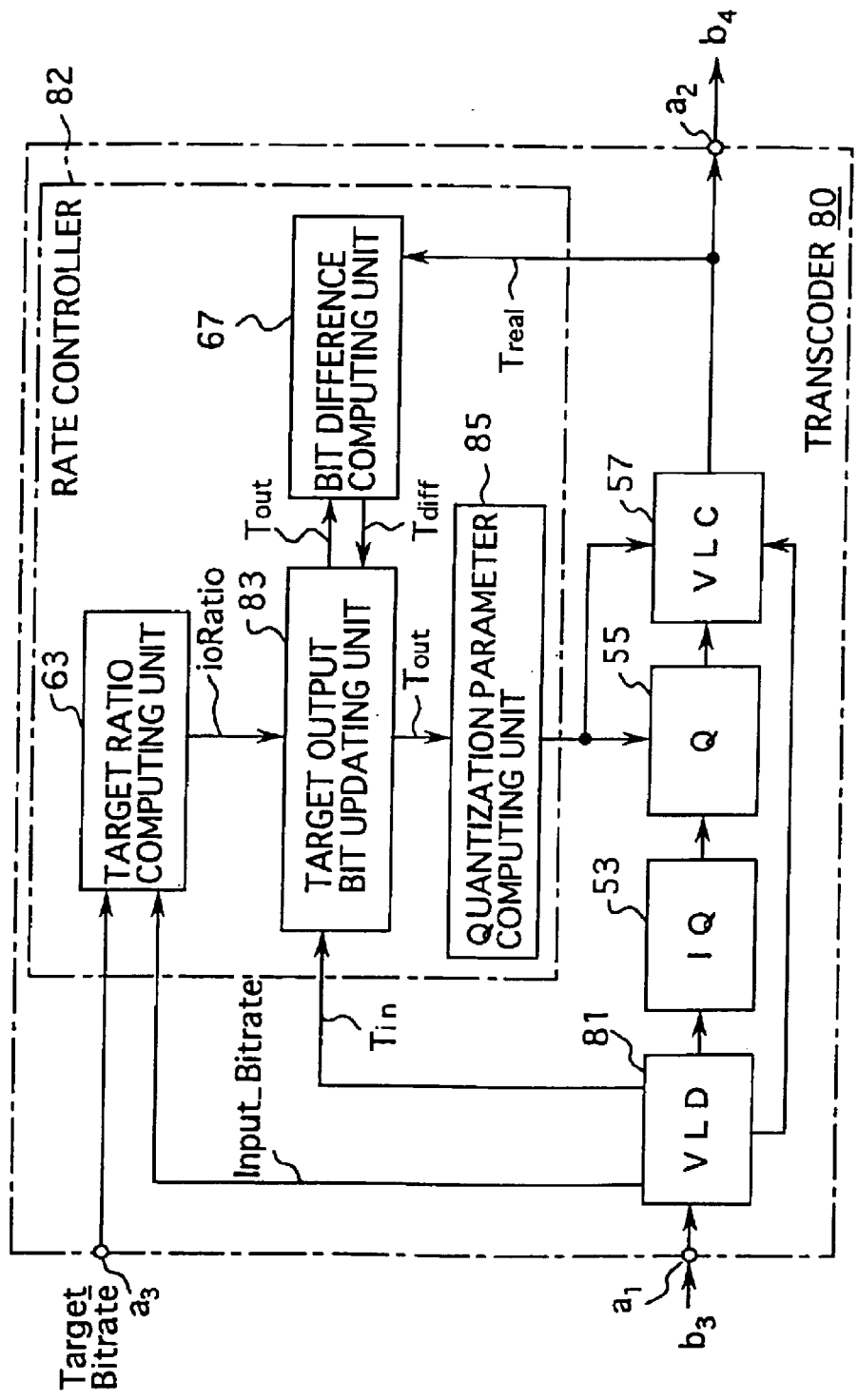
FIG. 18 is a schematic block diagram showing a third conventional transcoder 80.
Figure 19:
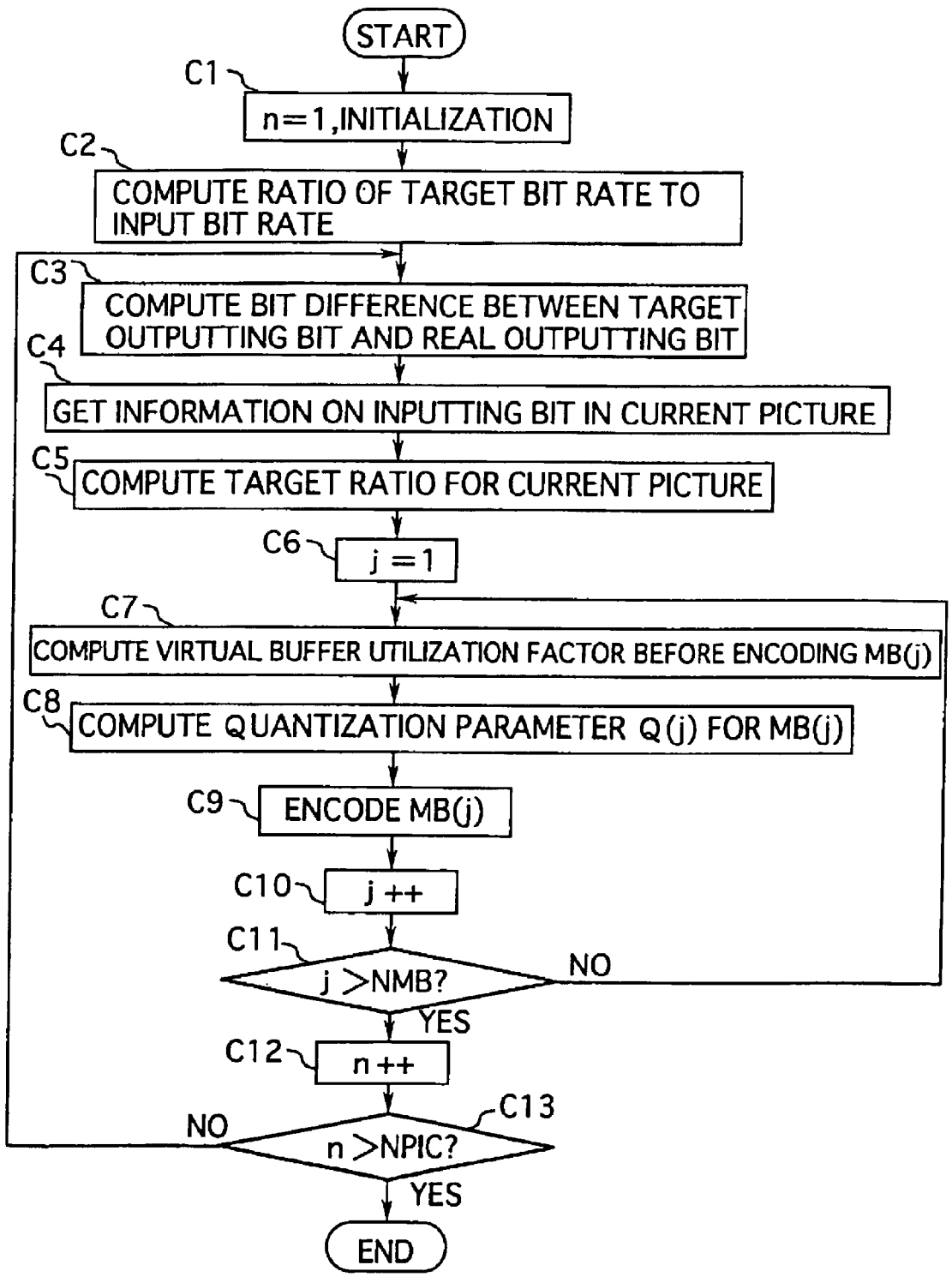
FIG. 19 is a flowchart showing the flow of the rate control operation of MPEG-2 performed by the third conventional transcoder 80 shown in FIG. 18.
Figure 20:
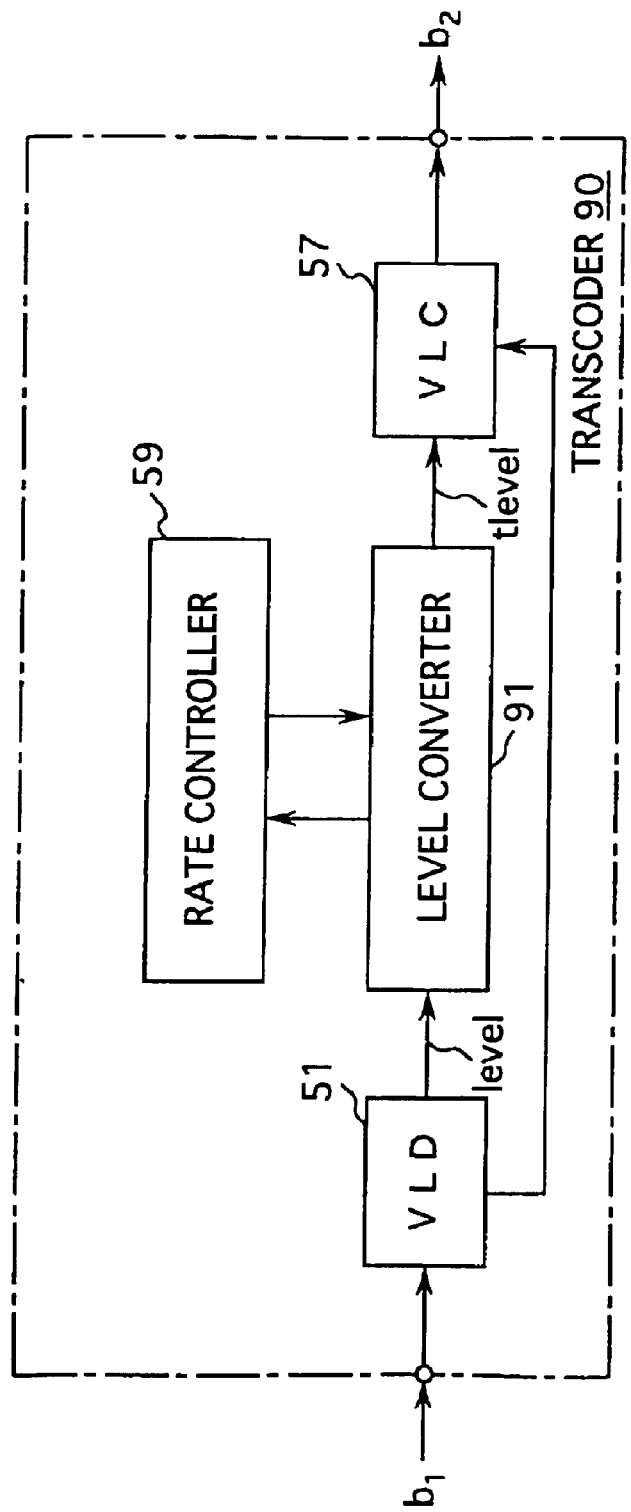
FIG. 20 is a schematic block diagram showing a fourth conventional transcoder 90.

Referring to FIG. 13 of the drawings, there is shown a multi-input bit stream merging apparatus 7200 for inputting one or more transcoded MPEG-2 bit streams and a plurality of differential bit streams to reconstruct an original MPEG-2 bit stream. As shown in FIG. 13, the multi-input bit stream merging apparatus 7200 comprises a plurality (the number n) of bit stream merging units 72001 to 7200n including a 1st bit stream merging unit 72001 up to a n-th bit stream merging unit 7200i wherein n is an integer not less than two.

Each of the bit stream merging units 72001 to 7200n is entirely same in construction as the bit stream merging apparatus 1200 according to the present invention, which has previously been mentioned, and adapted to input a transcoded MPEG-2 bit stream and a differential bit stream to reconstruct a MPEG-2 bit stream before separated into the transcoded MPEG-2 bit stream and the differential bit stream The same constitutional elements are simply represented by the same reference numerals as those of the bit stream separating apparatus 1100 and will be thus omitted from description.

The multi-input bit stream merging apparatus 7200 will be described in reference to FIG. 13 hereinlater.

The 2nd bit stream merging unit 72002 is adapted to input the 2nd transcoded MPEG-2 bit stream 72.2 having a bit rate of 6 Mbps from the 3rd bit stream merging unit 72003, and the 2nd differential bit stream 73.2 having a bit rate of 2 Mbps from an external device such as, for instance, the 2nd bit stream separating unit 71002, to reconstruct the 1st transcoded MPEG-2 bit stream 72.1 having a bit rate of 8 Mbps. The 2nd bit stream merging unit 72002 is adapted to output the 1st transcoded MPEG-2 bit stream thus reconstructed to the 1st bit stream merging unit 72001.

The 1st bit stream merging unit 72001 is adapted to input the 1st transcoded MPEG-2 bit stream 72.1 having a bit rate of 8 Mbps from the 2nd bit stream merging unit 72002, and the 1st differential bit stream 73.1 having a bit rate of 2 Mbps from an external device such as, for instance, the 1st bit stream separating unit 71001 to reconstruct the original MPEG-2 bit stream 71 having a bit rate of 10 Mbps.

Any one of the bit stream separating units 81001 to 8100m is hereinlater referred to as i-th bit stream separating unit 8100i wherein i is an integer equal to or less than n. This means that the i-th bit stream merging unit 7200i is adapted to input an i-th transcoded MPEG-2 bit stream 72.i and an i-th differential bit stream 73.i to reconstruct a (i−1)-th transcoded MPEG-2 bit stream wherein i is an integer equal to or less than n.

In this embodiment, the i-th bit stream merging unit 7200i is adapted to input the i-th transcoded MPEG-2 bit stream 72.i from the (i+1)-th bit stream merging unit 7200i+1 and the i-th differential bit stream 73.i from an external device such as, for instance, the i-th bit stream separating unit 7100i. The i-th bit stream merging unit 7200i is adapted to output the (i−1)-th transcoded MPEG-2 bit stream thus reconstructed to the (i−1)-th bit stream merging unit 7200i−1.

The multi-input bit stream merging apparatus 7200 thus constructed can receive an original MPEG-2 bit stream having a bit rate of, for instance, 10 Mbps by receiving one single transcoded MPEG-2 bit stream and a plurality of differential bit streams each having a bit rate lower than 10 Mbps.

The i-th bit stream merging unit 7200i can, however, input any one of the i-th transcoded MPEG-2 bit stream 72.i and the i-th differential bit stream 73.i from the (i+1)-th bit stream merging unit 7200i+1 and the other one of them from an external device such as, for instance, the i-th bit stream separating unit 7100i. Furthermore, the i-th bit stream merging unit 7200i can output the (i−1)-th transcoded MPEG-2 bit stream thus reconstructed to an external device such as a decoder.

The multi-input bit stream merging apparatus 7200 thus constructed can input a plurality of transcoded MPEG-2 bit streams and a plurality of differential bit streams to output a plurality of transcoded MPEG-2 bit streams.

For better understanding, the multi-input bit stream merging apparatus 7200 will be described in detail in reference to the i-th bit stream merging unit 7200i will be described in detail.

The i-th bit stream merging unit 7200i is similar in construction as the bit stream separating apparatus 1200 shown in FIG. 4 as comprising inputting interfaces, i-th first receiving means 211i, i-th merging storage means 220i, i-th request signal determining means 230i, i-th request signal transmission means 213i, i-th second receiving means 212i, i-th merging bit stream extracting means 241i, i-th merging means 242i, and outputting means OUTi.

The i-th first receiving means 211i is adapted to receive a base bit stream. In this embodiment, the base bit stream is an i-th transcoded MPEG-2 bit stream 72.i. This means that the i-th first receiving means 211i is adapted to receive the base bit stream, i.e., the i-th transcoded MPEG-2 bit stream 72.i from the (i+1)-th bit stream merging unit 7200i+1.

The i-th first receiving means 211i may receive the base bit stream from the i-th bit stream separating unit 7100i, and the base bit stream may be any one of the i-th transcoded MPEG-2 bit stream 72.i, the (i−1)-th transcoded MPEG-2 bit stream 72.(i−1), and the i-th differential bit stream 73.i.

The i-th merging storage means 220i is adapted to store the base bit stream received by the i-th first receiving means 211i.

The i-th request signal determining means 230i is adapted to determine a requested bit stream and a request signal for the requested bit stream on the basis of the base bit stream stored by the i-th merging storage means 220i. If the base bit stream is the (i−1)-th transcoded MPEG-2 bit stream 72.(i−1), the i-th request signal determining means 230i is adapted to determine no request signal, and the i-th bit stream merging unit 7200i is adapted to output the (i−1)-th transcoded MPEG-2 bit stream 72.(i−1) therethrough. In this embodiment, the base bit stream is the i-th transcoded MPEG-2 bit stream 72.i, and the i-th request signal determining means 230i is adapted to determine a requested bit stream, i.e., an i-th differential bit stream 73.i, and a request signal for the requested bit stream on the basis of the i-th transcoded MPEG-2 bit stream 72.i stored by the i-th merging storage means 220i.

The i-th request signal transmission means 213i is adapted to transmit the request signal for the requested bit stream determined by the i-th request signal determining means 230i to the bit stream separating unit 7100i.

The i-th second receiving means 212i is adapted to receive the requested bit stream.

The i-th merging bit stream extracting means 241i is adapted to extract the base bit stream from among bit streams stored in the i-th merging storage means 220i.

The i-th merging means 242i is adapted to merge the base bit stream, i.e., the i-th transcoded MPEG-2 bit stream 72.i, extracted by the i-th merging bit stream extracting means 241i with the requested bit stream, i.e., i-th differential bit stream 73.i, received by the i-th second receiving means 212i to reconstruct the (i−1)-th transcoded MPEG-2 bit stream 72.(i−1) on the basis of the i-th second coefficient information obtained from the series of i-th second picture information of the i-th transcoded MPEG-2 bit stream 72.i, and the i-th differential coefficient information obtained from the i-th differential bit stream 73.i.

The i-th outputting means OUTi is adapted to input the reconstructed (i−1)-th transcoded MPEG-2 bit stream from the i-th merging means 242*i* to be outputted therethrough to the (i−1)-th bit stream merging unit 7200*i*−1.

According to the present invention, the i-th outputting means OUTi can output the reconstructed (i−1)-th transcoded MPEG-2 bit stream to an external device, such as a decoder as well.

As will be seen from the foregoing description, the multi-input bit stream merging apparatus 7200 thus constructed can input one or more transcoded MPEG-2 bit streams and a plurality of differential bit streams to one or more MPEG-2 bit streams before transcoded, thereby making it possible for a user to selectively decode transcoded MPEG-bit streams to reproduce a moving picture information of a desired picture quality.

VII-C Operation of Bit Stream Separating and Merging System 7000

Referring to FIG. 11 of the drawings, there is shown a seventh preferred embodiment of a bit stream separating and merging system 7000 according to the present invention.

The seventh preferred embodiment of the bit stream separating and merging system 7000 is shown in FIG. 11 as comprising a multi-output bit stream separating apparatus 7100 for inputting an original MPEG-2 bit stream to separate into one or more transcoded MPEG-2 bit streams and a plurality of differential bit streams; and a multi-input bit stream merging apparatus 7200 for inputting one or more transcoded MPEG-2 bit streams and a plurality of differential bit streams to reconstruct the original MPEG-2 bit stream.

The multi-output bit stream separating apparatus 7100 comprises a plurality (the number m) of bit stream separating units 71001 to 7100*m* including a 1st bit stream separating unit 71001 up to a m-th bit stream separating unit 7100*m* wherein m is an integer not less than two.

The multi-input bit stream merging apparatus 7200 comprises a plurality (the number n) of the bit stream merging units 72001 to 7200*n* including a 1st bit stream merging unit 72001 up to a n-th bit stream merging unit 7200*n* wherein n is an integer not less than two. Furthermore, n can be equal to or less than m.

The constructions of the bit stream separating apparatus 7100 and the bit stream merging apparatus 7200 have already been described.

The operation of the seventh preferred embodiment of the bit stream separating and merging system 7000 will be described hereinlater, with reference to the i-th bit stream separating unit 7100*i*, and the i-th bit stream merging unit 7200*i*.

According to the present invention, the multi-output bit stream separating apparatus 7100 is adapted to input an original MPEG-2 bit stream to separate into a plurality of transcoded MPEG-2 bit streams and a plurality of differential bit streams; and a multi-input bit stream merging apparatus 7200 is adapted to input a plurality of transcoded MPEG-2 bit streams and a plurality of differential bit streams to reconstruct the original MPEG-2 bit stream.

In this embodiment, the multi-output bit stream separating apparatus 7100, however, is operated to input an original MPEG-2 bit stream to separate into one transcoded MPEG-2 bit stream and a plurality of differential bit streams; and a multi-input bit stream merging apparatus 7200 is operated to input one transcoded MPEG-2 bit streams and a plurality of differential bit streams to reconstruct the original MPEG-2 bit stream.

In the i-th bit stream merging unit 7200*i*, the i-th inputting means INi is operated to input an (i−1)-th transcoded MPEG-2 bit stream 72.(i−1) therethrough from the (i-i)-th bit stream separating unit 7100*i*−1.

The i-th bit stream converting means 111*i* is operated to convert the (i−1)-th transcoded MPEG-2 bit stream 72.(i−1) inputted through the i-th inputting means INi to generate an i-th transcoded MPEG-2 bit stream 72.i. The i-th bit stream converting means 111*i* is also operated to output the i-th transcoded MPEG-2 bit stream 72.i thus generated to the (i+1)-th inputting means INi+1 of the (i+1)-th bit stream separating unit 7100*i*+1 through the interface i-th out1. The i-th bit stream converting means 111*i* is also operated to output the (i−1)-th transcoded MPEG-2 bit stream 72.(i−1) and the i-th transcoded MPEG-2 bit stream 72.i to the i-th differential bit stream generating means 112*i*.

The i-th differential bit stream generating means 112*i* is operated to input the (i−1)-th transcoded MPEG-2 bit stream 72.i−1 and the i-th transcoded MPEG-2 bit stream 72.i from the i-th bit stream converting means 111*i* to generate an i-th differential bit stream 73.i on the basis of the (i−1)-th second coefficient information obtained from the series of (i−1)-th second picture information of the (i−1)-th transcoded MPEG-2 bit stream 72.i−1, and the i-th second coefficient information obtained from the series of the i-th second picture information of the i-th transcoded MPEG-2 bit stream 72.i.

The i-th separating storage means 120*i* is adapted to selectively store the (i−1)-th transcoded MPEG-2 bit stream 72.i−1, the i-th transcoded MPEG-2 bit stream 72.i, and the i-th differential bit stream 73.i. In this embodiment, the i-th separating storage means 120*i* is operated to store the i-th differential bit stream 73.i.

The i-th first transmission means 141*i* is adapted to selectively transmit the (i−1)-th transcoded MPEG-2 bit stream 72.i−1, the i-th transcoded MPEG-2 bit stream 72.i, and the i-th differential bit stream 73.i to the i-th bit stream merging unit 7200*i*.

In the i-th bit stream merging unit 7200*i*, the i-th first receiving means 211*i* is operated to receive a base bit stream, i.e., an i-th transcoded MPEG-2 bit stream 72.i, from the (i+1)-th bit stream merging unit 7200*i*+1.

The i-th merging storage means 220*i* is operated to store the base bit stream received by the i-th first receiving means 211*i*.

The i-th request signal determining means 230*i* is operated to determine a requested bit stream, and a request signal for the requested bit stream, i.e., an i-th differential bit stream 73.i, on the basis of the base bit stream stored by the i-th merging storage means 220*i*.

The i-th request signal transmission means 213*i* is operated to transmit the request signal for the requested bit stream determined by the i-th request signal determining means 230*i* to the i-th bit stream separating unit 7100*i*.

In the i-th bit stream separating unit 7100*i*, the i-th request signal receiving means 142*i* is operated to receive the request signal transmitted by the i-th request signal transmission means 213*i* of the i-th bit stream merging unit 7200*i*.

The i-th separating bit stream extracting means 130*i* is operated to extract the requested bit stream, i.e., an i-th differential bit stream 73.i, from among bit streams stored in the i-th separating storage means 120*i* in response to the request signal.

The i-th second transmission means 143*i* is operated to transmit the requested bit stream extracted by the i-th separating bit stream extracting means 130$i$ to the i-th bit stream merging unit 7200$i$.

In the i-th bit stream merging unit 7200$i$, the i-th second receiving means 212$i$ is operated to receiving the requested bit stream transmitted by the i-th second transmission means 143$i$ from the i-th bit stream separating unit 7100$i$.

The i-th merging bit stream extracting means 241$i$ is operated to extract the base bit stream from the i-th merging storage means 220$i$;

The i-th merging means 242$i$ is operated to merge the base bit stream, i.e., i-th transcoded MPEG-2 bit stream 72.i, extracted by the i-th merging bit stream extracting means 241$i$ with the requested bit stream, i.e., an i-th differential bit stream 73.i, received by the i-th second receiving means 212$i$ on the basis of the i-th second coefficient information obtained from the series of second picture information of the i-th transcoded MPEG-2 bit stream 72.i, and the i-th differential coefficient information obtained from the i-th differential bit stream 73.i to reconstruct the (i−1)-th transcoded MPEG-2 bit stream 72.(i−1).

The i-th outputting means OUTi is operated to input the reconstructed (i−1)-th transcoded MPEG-2 bit stream 72.(i−1) from the i-th merging means 242$i$ to be outputted therethrough to the (i−1)-th bit stream merging unit 7200$i$−1.

Furthermore, the number of the bit stream merging units 72001 to 7200$n$ can be less than that of the bit stream separating units 71001 to 7100$m$, i.e., n is less than m.

This means that the n-th bit stream merging unit 7200$n$ can input the n-th transcoded MPEG-2 bit stream and n-th differential bit stream from the n-th bit stream separating unit 7100$n$ to reconstruct the (n−1)-th transcoded MPEG-2 bit stream.

In the bit stream separating and merging system 7000 thus constructed, the multi-output bit stream separating apparatus 7100 can input, for instance, an original MPEG-2 bit stream having a large bit rate to separate into and transmit one or more transcoded MPEG-2 bit streams and a plurality of differential bit streams and the multi-input bit stream merging apparatus 7200 can input and merge the one or more transcoded MPEG-2 bit streams and the differential bit streams thus multiple-times separated to reconstruct the original MPEG-2 bit stream of the large bit rate. Each of the one or more transcoded MPEG-2 bit streams and the differential bit streams thus multiple-times separated has a bit rate lower than that of the original MPEG-2 bit stream. The bit stream separating and merging system 7000 therefore makes it possible to promptly and reliably transmit and receive an original MPEG-2 bit stream having a large bit rate by transmitting and receiving a plurality of transcoded MPEG-2 bit streams and a plurality of differential bit streams multiple-times separated in place of the original MPEG-2 bit stream.

Furthermore, the i-th outputting means OUTi of the i-th bit stream merging unit 7200$i$ of the multi-input bit stream merging apparatus 7200 according to the present invention can output the reconstructed (i−1)-th transcoded MPEG-2 bit stream to an external device, such as a decoder. The multi-input bit stream merging apparatus 7200 thus constructed can input one or more transcoded MPEG-2 bit streams and a plurality of differential bit streams to output a plurality of transcoded MPEG-2 bit streams, thereby making it possible for a user to selectively decode a transcoded MPEG-bit stream having a desired bit rate to reproduce an original moving picture information of a desired picture quality.

VIII. Eighth Embodiment of Bit Stream Separating and Merging System 8000

There is provided an eighth preferred embodiment of the bit stream separating and merging system 8000 comprising a multi-output bit stream separating apparatus 8100 for inputting an original MPEG-2 bit stream to separate into one or more transcoded MPEG-2 bit streams and a plurality of differential bit streams; and a multi-input bit stream merging apparatus 8200 for inputting a one or more transcoded MPEG-2 bit streams and a plurality of differential bit streams to reconstruct the original MPEG-2 bit stream.

The multi-output bit stream separating apparatus 8100 comprises a plurality of bit stream separating units 81001 to 8100$m$ including a 1st bit stream separating unit 81001 up to a m-th bit stream separating unit 8100$m$ wherein m is an integer not less than two.

The multi-input bit stream merging apparatus 8200 comprises a plurality of bit stream merging units 82001 to 8200$n$ including a 1st bit stream merging unit 81001 up to a n-th bit stream merging unit 81 00$n$ wherein n is an integer not less than two.

The multi-output bit stream separating apparatus according to the present invention may comprise one or more of bit stream separating units which are the same in construction as any one or more of the bit stream separating apparatuses 1100, 2100, 3100, 4100, 5100, and 6100.

Similarly, the multi-input bit stream merging apparatus according to the present invention may comprise one or more of bit stream merging units which are the same in construction as any one or more of the bit stream merging apparatus 1200, 1200, 2200, 3200, 4200, 5200, and 6200.

The multi-output bit stream separating apparatus 8100 comprises a plurality of bit stream separating units 81001 to 8100$m$. Any one of the bit stream separating units 81001 to 8100$m$ is hereinlater referred to as i-th bit stream separating unit 8100$i$ wherein i is an integer equal to or less than m.

The i-th bit stream separating units of the bit stream separating units 81001 to 8100$m$ of the multi-output bit stream separating apparatus 8100 is same in the construction as the bit stream separating apparatus 2100 shown in FIG. 6 as comprising as comprising an inputting terminal INi, i-th bit stream converting means 111$i$, i-th differential bit stream generating means 112$i$, i-th separating storage means 120$i$, i-th first transmission means 141$i$, i-th request signal receiving means 142$i$, i-th bit stream extracting means 130$i$, i-th second transmission means 143$i$, and i-th outputting interface OUTi.

The multi-input bit stream merging apparatus 8200 comprises a plurality of bit stream merging units 82001 to 8200$m$. Any one of the bit stream merging units 82001 to 8200$m$ is hereinlater referred to as i-th bit stream merging unit 8200$i$ wherein i is an integer equal to or less than m.

The i-th bit stream merging units of the bit stream merging units 82001 to 8200$m$ of the multi-output bit stream merging apparatus 8200 is same in the construction as the bit stream merging apparatus 2200 shown in FIG. 6 as comprising inputting interfaces, i-th first receiving means 211$i$, i-th merging storage means 220$i$, i-th decoding means 225$i$, i-th request signal determining means 230$i$, i-th request signal transmission means 213$i$, i-th second receiving means 212$i$, i-th merging bit stream extracting means 241$i$, i-th merging means 242$i$, and outputting means OUTi.

This means that the bit stream separating units 81001 to 8100$n$−1 are adapted to store differential bit streams in their respective separating storage means and transmit transcoded MPEG-2 bit streams to subsequently placed bit stream separating units 82002 to 8200$n$. The bit stream separating unit n is adapted to transmit the transcoded MPEG-2 bit stream to the bit stream merging unit n. The bit stream merging unit 8200n is adapted to receive the transcoded MPEG-2 bit stream and the differential bit stream from the bit stream separating unit n, and the bit stream merging units 8200n–1 to 82001 are adapted to receive the transcoded MPEG-2 bit streams from the previously placed bit stream merging units 8200n to 82002 and bit streams from the respective bit stream merging units 8200n–1 to 82001.

The operation of the bit stream separating and merging system 8000 according to the present invention will be described hereinlater with reference to the i-th bit stream separating unit 8100i, and the i-th bit stream merging unit 8200i. The operation of the bit stream separating and merging system 8000 as those of the bit stream separating and merging system 6000 will be omitted for avoiding tedious repetition. The same constitutional elements are simply represented by the same reference numerals.

In the i-th bit stream separating unit 8100i, the i-th inputting terminal INi is operated to receive an (i–1)-th transcoded MPEG-2 bit stream 72.(i–1) from a (i–1)th bit stream separating unit 8100i–1.

The i-th bit stream converting means 111i is operated to convert the (i–1)-th transcoded MPEG-2 bit stream 72.(i–1) inputted through the i-th inputting means INI to generate an i-th transcoded MPEG-2 bit stream 72.i. The i-th bit stream converting means 111i is operated to output the i-th transcoded MPEG-2 bit stream 72.i thus generated to the (i+1)-th inputting means INi+1 of the (i+1)-th bit stream separating unit 8100i+1 through the interface out1. The i-th bit stream converting means 111i is also operated to output the (i–1)-th transcoded MPEG-2 bit stream 72.(i–1) and the i-th transcoded MPEG-2 bit stream 72.i to the i-th differential bit stream generating means 112i.

The i-th differential bit stream generating means 112i is operated to input the (i–1)-th transcoded MPEG-2 bit stream 72.i–1 and the i-th transcoded MPEG-2 bit stream 72.i from the i-th bit stream converting means 111i to generate an i-th differential bit stream 73.i on the basis of the (i–1)-th second coefficient information obtained from the series of (i–1)-th second picture information of the (i–1)-th transcoded MPEG-2 bit stream 72.i–1, and the i-th second coefficient information obtained from the series of the i-th second picture information of the i-th transcoded MPEG-2 bit stream 72.i.

The i-th separating storage means 120i is operated to store the i-th differential bit stream 73.i generated by the i-th differential bit stream generating means 112i.

In the i-th bit stream merging unit 8200i, the i-th first receiving means 211i is operated to receive the i-th transcoded MPEG-2 bit stream 72.i from outputting means OUTi+1 of the (i+1)-th bit stream merging unit 8200i+1.

The i-th decoding means 225i is operated to decode the i-th transcoded MPEG-2 bit stream 72.i.

The i-th merging storage means 220i is operated to store the i-th transcoded MPEG-2 bit stream 72.i received by the i-th first receiving means 211i.

The i-th request signal determining means 230i is operated to determine a requested differential bit stream and a request signal for the requested differential bit stream on the basis of the i-th transcoded MPEG-2 bit stream 72.i stored by the i-th merging storage means 220i.

The i-th request signal transmission means 213i is operated to transmit the request signal for the requested differential bit stream determined by the i-th request signal determining means 230i.

In the i-th bit stream separating unit 8100i, the i-th request signal receiving means 142i is operated to receive the request signal transmitted by the i-th request signal transmission means 213i.

The i-th separating bit stream extracting means 130i is operated to extract the requested differential bit stream from the i-th separating storage means 120i in response to the request signal.

The i-th second transmission means 143i is operated to transmit the requested differential bit stream extracted by the i-th separating bit stream extracting means 130i to the i-th bit stream merging unit 8200i.

In the i-th bit stream merging unit 8200i, the i-th second receiving means 212i is operated to receive the requested differential bit stream transmitted by the i-th second transmission means 143i from the i-th bit stream separating unit 8100i.

The i-th merging bit stream extracting means 241i is operated to extract the i-th transcoded MPEG-2 bit stream 72.i from the i-th merging storage means 220i.

The i-th merging means 242i is operated to merge the i-th transcoded MPEG-2 bit stream 72.i extracted by the i-th merging bit stream extracting means 241i with the requested differential bit stream received by the i-th second receiving means 212i to reconstruct the (i–1)-th transcoded MPEG-2 bit stream to be outputted to the outputting means OUT1i.

The outputting means OUTi is operated to input the (i–1)-th transcoded MPEG-2 bit stream thus reconstructed to an (i–1)-th bit stream merging apparatus 8200i–1.

As will be seen from the foregoing description, the bit stream separating and merging system 8000 thus constructed makes it possible for a user to receive one or more transcoded MPEG-2 bit streams at bit rates much lower than that of the original MPEG-2 bit stream to decode, reproduce, and preview low-quality picture information, and later receive a plurality of differential bit streams at bit rates much lower than that of the original MPEG-2 bit stream to reproduce high-quality picture information in combining with the transcoded MPEG-2 bit streams earlier received thereby effectively utilize the transcoded MPEG-2 bit streams and the transmitting paths.

According to the present invention, the bit stream separating and merging system may comprise multi-output bit stream separating apparatus including one or more of bit stream separating units same in construction as any one or more of the first to the sixth embodiment of bit stream separating apparatuses 1100, 2100, 3100, 4100, 5100, and 6100 and the multi-input bit stream merging apparatus including one or more of bit stream merging units which are the same in construction as any one or more of the first to the sixth embodiment of bit stream merging apparatus 1200, 1200, 2200, 3200, 4200, 5200, and 6200.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A coded signal separating and merging system comprising:
    a coded signal separating apparatus for inputting a first coded moving picture sequence signal to separate into a second coded moving picture sequence signal and a differential coded moving picture sequence signal; and
    a coded signal merging apparatus for inputting said second coded moving picture sequence signal and said differential coded moving picture sequence signal to reconstruct said first coded moving picture sequence signal, said coded signal separating apparatus including:

inputting means for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

coded signal converting means for converting said first coded moving picture sequence signal inputted through said inputting means to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

differential coded signal generating means for inputting said first coded moving picture sequence signal and said second coded moving picture sequence signal from said coded signal converting means to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

separating storage means for selectively storing said first coded moving picture sequence signal, said second coded moving picture sequence signal, and said differential coded moving picture sequence signal; and first transmission means for selectively transmitting said first coded moving picture sequence signal, said second coded moving picture sequence signal, and said differential coded moving picture sequence signal to said coded signal merging apparatus;

said coded signal merging apparatus including:

first receiving means for receiving a base coded moving picture sequence signal transmitted by said first transmission means from said coded signal separating apparatus, said base coded moving picture sequence signal being any one of said first coded moving picture sequence signal, said second coded moving picture sequence signal, and said differential coded moving picture sequence signal;

merging storage means for storing coded moving picture sequence signal including said base coded moving picture sequence signal received by said first receiving means;

request signal determining means for determining a request signal for a requested coded moving picture sequence signal on the basis of said base coded moving picture sequence signal stored by said merging storage means; and request signal transmission means for transmitting said request signal for said requested coded moving picture sequence signal determined by said request signal determining means to said coded signal separating apparatus;

whereby said coded signal separating apparatus further includes:

request signal receiving means for receiving said request signal transmitted by said request signal transmission means from said coded signal merging apparatus;

separating coded signal extracting means for extracting said requested coded moving picture sequence signal from said separating storage means in response to said request signal; and second transmission means for transmitting said requested coded moving picture sequence signal extracted by said separating coded signal extracting means to said coded signal merging apparatus;

said coded signal merging apparatus includes:

second receiving means for receiving said requested coded moving picture sequence signal transmitted by said second transmission means from said coded signal separating apparatus;

merging coded signal extracting means for extracting said base coded moving picture sequence signal from said merging storage means;

merging means for merging said base coded moving picture sequence signal extracted by said merging coded signal extracting means with said requested coded moving picture sequence signal received by said second receiving means on the basis of said second coefficient information obtained from said series of second picture information of said second coded moving picture sequence signal, and said differential coefficient information obtained from said differential coded signal to reconstruct said first coded moving picture sequence signal; and outputting means for inputting said reconstructed first coded moving picture sequence signal from said merging means to be outputted therethrough.

2. A coded signal separating and merging system as set forth in claim 1, in which said separating storage means of said coded signal separating apparatus is operative to store said differential coded moving picture sequence signal generated by said differential coded signal generating means, said first transmission means is operative to transmit said second coded moving picture sequence signal generated by said coded signal converting means, said first receiving means of said coded signal merging apparatus is operative to receive said second coded moving picture sequence signal transmitted by said first transmission means, said merging storage means is operative to store said second coded moving picture sequence signal received by said first receiving means, said request signal determining means is operative to determine a request signal for a requested differential coded moving picture sequence signal on the basis of said second coded moving picture sequence signal stored by said merging storage means, said request signal transmission means is operative to transmit said request signal for said requested differential coded moving picture sequence signal determined by said request signal determining means, said request signal receiving means of said coded signal separating apparatus is operative to receive said request signal transmitted by said request signal transmission means, said separating coded signal extracting means is operative to extract said requested differential coded moving picture sequence signal from said separating storage means in response to said request signal, said second transmission means is operative to transmit said requested differential coded moving picture sequence signal extracted by said separating coded signal extracting means to said coded signal merging apparatus, said second receiving means of said coded signal merging apparatus is operative to receive said requested differential coded moving picture sequence signal transmitted by said second transmission means from said coded signal separating apparatus, said merging coded signal extracting means is operative to extract said second coded moving picture sequence signal from said merging storage means, and said merging means is operative to merge said second coded moving picture sequence signal extracted by said merging coded signal extracting means with said requested differential coded moving picture sequence signal received by said second receiving means to reconstruct said first coded moving picture sequence signal.

3. A coded signal separating and merging system as set forth in claim 2, in which said coded signal merging apparatus further includes second coded moving picture sequence signal decoding means for decoding said second coded moving picture sequence signal received by said first receiving means.

4. A coded signal separating and merging system as set forth in claim 2 or claim 3, in which said coded signal merging apparatus further includes editing means for cutting and combining component parts of said second coded moving picture sequence signal stored by said merging storage means to generate an edited second coded moving picture sequence signal in a desired size, said request signal determining means is operative to determine a request signal for a requested differential coded moving picture sequence signal on the basis of said edited second coded moving picture sequence signal generated by said editing means, said request signal transmission means is operative to transmit said request signal for said requested differential coded moving picture sequence signal determined by said request signal determining means to said coded signal separating apparatus, said separating coded signal extracting means of said separating coded signal separating apparatus is operative to extract said requested differential coded moving picture sequence signal from said separating storage means in response to said request signal, and said merging means is operative to merge said edited second coded moving picture sequence signal generated by said editing means with said requested differential coded moving picture sequence signal received by said second receiving means to reconstruct said first coded moving picture sequence signal in said desired size.

5. A coded signal separating and merging system as set forth in claim 4, in which said separating storage means of said coded signal separating apparatus is operative to store said second coded moving picture sequence signal generated by said coded signal converting means, said first transmission means is operative to transmit said differential coded moving picture sequence signal generated by said differential coded signal generating means to said coded signal merging apparatus, said first receiving means of said coded signal merging apparatus is operative to receive said differential coded moving picture sequence signal transmitted by said first transmission means, said merging storage means is operative to store said differential coded moving picture sequence signal received by said first receiving means, request signal determining means is operative to determine a request signal for a requested second coded moving picture sequence signal on the basis of said differential coded moving picture sequence signal stored by said merging storage means, said request signal transmission means is operative to transmit said request signal for said requested second coded moving picture sequence signal determined by said request signal determining means, said request signal receiving means of said coded signal separating apparatus is operative to receive said request signal transmitted by said request signal transmission means, said separating coded signal extracting means is operative to extract said requested second coded moving picture sequence signal from said separating storage means in response to said request signal, said second transmission means is operative to transmit said requested second coded moving picture sequence signal extracted by said separating coded signal extracting means to said coded signal merging apparatus, said second receiving means of said coded signal merging apparatus is operative to receive said requested second coded moving picture sequence signal transmitted by said second transmission means from said coded signal separating apparatus, said merging coded signal extracting means is operative to extract said differential coded moving picture sequence signal stored by said merging storage means, and said merging means is operative to merge said differential coded moving picture sequence signal extracted by said merging coded signal extracting means with said second coded moving picture sequence signal received by said second receiving means to reconstruct said first coded moving picture sequence signal.

6. A coded signal separating and merging system as set forth in claim 5, in which said first transmission means of said coded signal separating apparatus is operative to transmit said differential coded moving picture sequence signal by way of broadcasting.

7. A coded signal separating and merging system as set forth in any one of claim 2, claim 3, and 6, in which said coded signal merging apparatus further includes reconstructed first coded signal storage means for storing said reconstructed first coded moving picture sequence signal reconstructed by said merging means.

8. A coded signal separating and merging system as set forth in claim 1, in which said coded signal merging apparatus further includes:

decoding means for decoding said first coded moving picture sequence signal or said second coded moving picture sequence signal; and merging coded signal converting means for inputting said first coded moving picture sequence signal to generate said second coded moving picture sequence signal, said first transmission means of said coded signal separating apparatus is operative to transmit said first coded moving picture sequence signal, said separating storage means is operative to store said differential coded moving picture sequence signal generated by said differential coded signal generating means, said first receiving means of said coded signal merging apparatus is operative to receive said first coded moving picture sequence signal transmitted by said first transmission means from said coded signal separating apparatus, said decoding means is operative to decode said first coded moving picture sequence signal received by said first receiving means, said merging coded signal converting means is operative to input said first coded moving picture sequence signal received by said first receiving means to generate said second coded moving picture sequence signal, said merging storage means is operative to store said second coded moving picture sequence signal generated by said merging coded signal converting means, said request signal determining means is operative to determine a request signal for a requested differential coded moving picture sequence signal on the basis of said second coded moving picture sequence signal stored by said merging storage means, said request signal transmission means is operative to transmit said request signal for said requested differential coded moving picture sequence signal determined by said request signal determining means to said coded signal separating apparatus, said request signal receiving means of said coded signal separating apparatus is operative to receive said request signal transmitted by said request signal transmission means from said coded signal merging apparatus, said separating coded signal extracting means is operative to extract said requested differential coded moving picture sequence signal from said separating storage means in response to said request signal, said second transmission means is operative to transmit said requested differential coded moving picture sequence signal extracted by said separating coded signal extracting means to said coded signal merging apparatus, said second receiving means of said coded signal merging apparatus is operative to receive said requested differential coded moving picture sequence signal transmitted by said second transmission means from said coded signal separating apparatus, said merging coded signal extracting means is operative to extract said second coded moving picture sequence signal from said merging storage means, and said merging means is operative to merge said second coded moving picture sequence signal extracted by said merging coded signal extracting means with said requested differential coded moving picture sequence signal received by said second receiving means to reconstruct said first coded moving picture sequence signal in said desired size.

9. A coded signal separating and merging system as set forth in claim 1, in which said coded signal merging apparatus further includes:

decoding means for decoding said first coded moving picture sequence signal or said second coded moving picture sequence signal; and merging differential coded signal generating means for inputting said first coded moving picture sequence signal to generate said differential coded moving picture sequence signal, said first transmission means of said coded signal separating apparatus is operative to transmit said first coded moving picture sequence signal, said separating storage means is operative to store said second coded moving picture sequence signal generated by said coded signal converting means, said first receiving means of said coded signal merging apparatus is operative to receive said first coded moving picture sequence signal transmitted by said first transmission means from said coded signal separating apparatus, said decoding means is operative to decode said first coded moving picture sequence signal received by said first receiving means, said merging differential coded signal generating means is operative to input said first coded moving picture sequence signal received by said first receiving means to generate said differential coded moving picture sequence signal, said merging storage means is operative to store said differential coded moving picture sequence signal generated by said merging coded signal converting means, said request signal determining means is operative to determine a request signal for a requested second coded moving picture sequence signal on the basis of said differential coded moving picture sequence signal stored by said merging storage means, said request signal transmission means is operative to transmit said request signal for said requested second coded moving picture sequence signal determined by said request signal determining means to said coded signal separating apparatus, said request signal receiving means of said coded signal separating apparatus is operative to receive said request signal transmitted by said request signal transmission means from said coded signal merging apparatus, said separating coded signal extracting means is operative to extract said requested second coded moving picture sequence signal from said separating storage means in response to said request signal, said second transmission means is operative to transmit said requested second coded moving picture sequence signal extracted by said separating coded signal extracting means to said coded signal merging apparatus, said second receiving means of said coded signal merging apparatus is operative to receive said requested second coded moving picture sequence signal transmitted by said second transmission means from said coded signal separating apparatus, said merging coded signal extracting means is operative to extract said differential coded moving picture sequence signal from said merging storage means, and said merging means is operative to merge said differential coded moving picture sequence signal extracted by said merging coded signal extracting means with said requested second coded moving picture sequence signal received by said second receiving means to reconstruct said first coded moving picture sequence signal in said desired size.

10. A coded signal separating apparatus for inputting a first coded moving picture sequence signal to separate into a second coded moving picture sequence signal and a differential coded moving picture sequence signal comprising:

inputting means for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

coded signal converting means for converting said first coded moving picture sequence signal inputted through said inputting means to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

differential coded signal generating means for inputting said first coded moving picture sequence signal and said second coded moving picture sequence signal from said coded signal converting means to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

separating storage means for selectively storing said first coded moving picture sequence signal, said second coded moving picture sequence signal, and said differential coded moving picture sequence signal;

first transmission means for selectively transmitting said first coded moving picture sequence signal, said second coded moving picture sequence signal, and said differential coded moving picture sequence signal;

request signal receiving means for receiving a request signal indicative of a requested coded moving picture sequence signal to be transmitted, said request signal indicative of said requested coded moving picture sequence signal being determined on the basis of said first coded moving picture sequence signal, said second coded moving picture sequence signal, or said differential coded moving picture sequence signal;

separating coded signal extracting means for extracting said requested coded moving picture sequence signal from said separating storage means in response to said request signal; and second transmission means for transmitting said requested coded moving picture sequence signal extracted by said separating coded signal extracting means.

11. A coded signal separating apparatus as set forth in claim 10, in which said separating storage means is operative to store said differential coded moving picture sequence signal generated by said differential coded signal generating means, said first transmission means is operative to transmit said second coded moving picture sequence signal generated by said coded signal converting means, said request signal receiving means is operative to receive said request signal indicative of a requested differential coded moving picture sequence signal to be transmitted, said request signal indicative of said requested differential coded moving picture sequence signal being determined on the basis of said second coded moving picture sequence signal, said separating coded signal extracting means is operative to extract said requested differential coded moving picture sequence signal from said separating storage means in response to said request signal, and said second transmission means is operative to transmit said requested differential coded moving picture sequence signal extracted by said separating coded signal extracting means.

12. A coded signal separating apparatus as set forth in claim 11, in which said request signal receiving means is operative to receive said request signal indicative of said requested differential coded moving picture sequence signal to be transmitted, said request signal indicative of said requested differential coded moving picture sequence signal being determined on the basis of an edited second coded moving picture sequence signal generated by cutting and combining component parts of said second coded moving picture sequence signal, said separating coded signal extracting means is operative to extract said requested differential coded moving picture sequence signal from said separating storage means in response to said request signal, and said second transmission means is operative to transmit said requested differential coded moving picture sequence signal extracted by said separating coded signal extracting means.

13. A coded signal separating apparatus as set forth in claim 10, in which said separating storage means is operative to store said second coded moving picture sequence signal generated by said coded signal converting means, said first transmission means is operative to transmit said differential coded moving picture sequence signal generated by said differential coded signal generating means, said request signal receiving means is operative to receive said request signal indicative of said requested second coded moving picture sequence signal to be transmitted, said request signal indicative of said requested second coded moving picture sequence signal being determined on the basis of said differential coded moving picture sequence signal, said separating coded signal extracting means is operative to extract said requested second coded moving picture sequence signal from said separating storage means in response to said request signal, and said second transmission means is operative to transmit said requested second coded moving picture sequence signal extracted by said separating coded signal extracting means.

14. A coded signal separating apparatus as set forth in claim 13, in which said first transmission means is operative to transmit said differential coded moving picture sequence signal by way of broadcasting.

15. A coded signal separating apparatus as set forth in claim 10, in which said first transmission means is operative to transmit said first coded moving picture sequence signal, said separating storage means is operative to store said differential coded moving picture sequence signal generated by said differential coded signal generating means, said request signal receiving means is operative to receive said request signal indicative of a requested differential coded moving picture sequence signal to be transmitted, said request signal indicative of said requested differential coded moving picture sequence signal being determined on the basis of a second coded moving picture sequence signal generated in accordance with said first coded moving picture sequence signal, said separating coded signal extracting means is operative to extract said requested differential coded moving picture sequence signal from said separating storage means in response to said request signal, and said second transmission means is operative to transmit said requested differential coded moving picture sequence signal extracted by said separating coded signal extracting means.

16. A coded signal separating apparatus as set forth in claim 10, in which said first transmission means is operative to transmit said first coded moving picture sequence signal, said separating storage means is operative to store said second coded moving picture sequence signal generated by said coded signal converting means, said request signal receiving means is operative to receive said request signal indicative of a requested second coded moving picture sequence signal to be transmitted, said request signal indicative of said requested second coded moving picture sequence signal being determined on the basis of a differential coded moving picture sequence signal generated in accordance with said first coded moving picture sequence signal, said separating coded signal extracting means is operative to extract said requested second coded moving picture sequence signal from said separating storage means in response to said request signal, and said second transmission means is operative to transmit said requested second coded moving picture sequence signal extracted by said separating coded signal extracting means.

17. A coded signal merging apparatus for inputting a second coded moving picture sequence signal and a differential coded moving picture sequence signal to reconstruct a first coded moving picture sequence signal, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients, said differential coded moving picture sequence signal being a difference between said first coded moving picture sequence signal and said second coded moving picture sequence signal, said differential coded moving picture sequence signal including differential coefficient information between said first coefficient information and said second coefficient information, each of said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks, said coded signal merging apparatus comprising:

first receiving means for receiving a base coded moving picture sequence signal, said base coded moving picture sequence signal being any one of said first coded moving picture sequence signal, said second coded moving picture sequence signal, and said differential coded moving picture sequence signal;

merging storage means for storing said base coded moving picture sequence signal received by said first receiving means;

request signal determining means for determining a request signal for a requested coded moving picture sequence signal on the basis of said base coded moving picture sequence signal stored by said merging storage means;

request signal transmission means for transmitting said request signal for said requested coded moving picture sequence signal determined by said request signal determining means;

second receiving means for receiving said requested coded moving picture sequence signal;

merging coded signal extracting means for extracting said base coded moving picture sequence signal from said merging storage means;

merging means for merging said base coded moving picture sequence signal extracted by said merging coded signal extracting means with said requested coded moving picture sequence signal received by said second receiving means to reconstruct said first coded moving picture sequence signal on the basis of said second coefficient information obtained from said series of second picture information of said second coded moving picture sequence signal, and said differential coefficient information obtained from said differential coded signal; and outputting means for inputting said reconstructed first coded moving picture sequence signal from said merging means to be outputted therethrough.

18. A coded signal merging apparatus as set forth in claim 17, in which said first receiving means is operative to receive said second coded moving picture sequence signal, said merging storage means is operative to store said second coded moving picture sequence signal received by said first receiving means, said request signal determining means is operative to determine a request signal for a requested differential coded moving picture sequence signal on the basis of said second coded moving picture sequence signal stored by said merging storage means, said request signal transmission means is operative to transmit a request signal for said requested differential coded moving picture sequence signal determined by said request signal determining means, said second receiving means is operative to receive said requested differential coded moving picture sequence signal, said merging coded signal extracting means is operative to extract said second coded moving picture sequence signal from said merging storage means, and said merging means is operative to merge said second coded moving picture sequence signal extracted by said merging coded signal extracting means with said requested differential coded moving picture sequence signal received by said second receiving means to reconstruct said first coded moving picture sequence signal.

19. A coded signal merging apparatus as set forth in claim 18 further comprising second coded moving picture sequence signal decoding means for decoding said second coded moving picture sequence signal received by said first receiving means.

20. A coded signal merging apparatus as set forth in claim 18 or claim 19 further comprising editing means for cutting and combining component parts of said second coded moving picture sequence signal stored by said merging storage means to generate an edited second coded moving picture sequence signal in a desired size, in which said request signal determining means is operative to determine a request signal for a requested differential coded moving picture sequence signal on the basis of said edited second coded moving picture sequence signal generated by said editing means, said request signal transmission means is operative to transmit said request signal for said requested differential coded moving picture sequence signal determined by said request signal determining means, and said merging means is operative to merge said edited second coded moving picture sequence signal generated by said editing means with said requested differential coded moving picture sequence signal received by said second receiving means to reconstruct said first coded moving picture sequence signal in said desired size.

21. A coded signal merging apparatus as set forth in claim 17, in which said first receiving means is operative to receive said differential coded moving picture sequence signal, said merging storage means is operative to store said differential coded moving picture sequence signal received by said first receiving means, request signal determining means is operative to determine a request signal for a requested second coded moving picture sequence signal on the basis of said differential coded moving picture sequence signal stored by said merging storage means, said request signal transmission means is operative to transmit said request signal for said requested second coded moving picture sequence signal determined by said request signal determining means, said second receiving means is operative to receive said requested second coded moving picture sequence signal, said merging coded signal extracting means is operative to extract said differential coded moving picture sequence signal stored by said merging storage means, and said merging means is operative to merge said differential coded moving picture sequence signal extracted by said merging coded signal extracting means with said second coded moving picture sequence signal received by said second receiving means to reconstruct said first coded moving picture sequence signal.

22. A coded signal merging apparatus as set forth in claim 21, in which said first receiving means is operative to receive said differential coded moving picture sequence signal by way of broadcasting.

23. A coded signal merging apparatus as set forth in any one of claim 18, claim 19, and claim 22, further comprising reconstructed first coded signal storage means for storing said reconstructed first coded moving picture sequence signal reconstructed by said merging means.

24. A coded signal merging apparatus as set forth in claim 17 further comprising:

decoding means for decoding said first coded moving picture sequence signal or said second coded moving picture sequence signal; and merging coded signal converting means for inputting said first coded moving picture sequence signal to generate said second coded moving picture sequence signal, in which said first receiving means is operative to receive said first coded moving picture sequence signal, said decoding means is operative to decode said first coded moving picture sequence signal received by said first receiving means, said merging coded signal converting means is operative to input said first coded moving picture sequence signal received by said first receiving means to generate said second coded moving picture sequence signal, said merging storage means is operative to store said second coded moving picture sequence signal generated by said merging coded signal converting means, said request signal determining means is operative to determine a request signal for a requested differential coded moving picture sequence signal on the basis of said second coded moving picture sequence signal stored by said merging storage means, said request signal transmission means is operative to transmit said request signal for said requested differential coded moving picture sequence signal determined by said request signal determining means, said second receiving means is operative to receive said requested differential coded moving picture sequence signal, said merging coded signal extracting means is operative to extract said second coded moving picture sequence signal from said merging storage means, and said merging means is operative to merge said second coded moving picture sequence signal extracted by said merging coded signal extracting means with said requested differential coded moving picture sequence signal received by said second receiving means to reconstruct said first coded moving picture sequence signal in said desired size.

25. A coded signal merging apparatus as set forth in claim 17 further comprising:

decoding means for decoding said first coded moving picture sequence signal or said second coded moving picture sequence signal; and merging differential coded signal generating means for inputting said first coded moving picture sequence signal to generate said differential coded moving picture sequence signal, said first receiving means is operative to receive said first coded moving picture sequence signal, said decoding means is operative to decode said first coded moving picture sequence signal received by said first receiving means, said merging differential coded signal generating means is operative to input said first coded moving picture sequence signal received by said first receiving means to generate said differential coded moving picture sequence signal, said merging storage means is operative to store said differential coded moving picture sequence signal generated by said merging coded signal converting means, said request signal determining means is operative to determine a request signal for a requested second coded moving picture sequence signal on the basis of said differential coded moving picture sequence signal stored by said merging storage means, said request signal transmission means is operative to transmit said request signal for said requested second coded moving picture sequence signal determined by said request signal determining means, said second receiving means is operative to receive said requested second coded moving picture sequence signal, said merging coded signal extracting means is operative to extract said differential coded moving picture sequence signal from said merging storage means, and said merging means is operative to merge said differential coded moving picture sequence signal extracted by said merging coded signal extracting means with said requested second coded moving picture sequence signal received by said second receiving means to reconstruct said first coded moving picture sequence signal in said desired size.

26. A coded signal separating and merging method comprising the steps of:

(a) inputting a first coded moving picture sequence signal to separate into a second coded moving picture sequence signal and a differential coded moving picture sequence signal; and (b) inputting said second coded moving picture sequence signal and said differential coded moving picture sequence signal to reconstruct said first coded moving picture sequence signal, said step (a) including the steps of:

(a-1) inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(a-2) converting said first coded moving picture sequence signal inputted in said step (a-1) to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

(a-3) inputting said first coded moving picture sequence signal and said second coded moving picture sequence signal to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

(a-4) selectively storing said first coded moving picture sequence signal, said second coded moving picture sequence signal, and said differential coded moving picture sequence signal; and (a-5) selectively transmitting said first coded moving picture sequence signal, said second coded moving picture sequence signal, and said differential coded moving picture sequence signal to said step (b):

said step (b) including the steps of:

(b-1) receiving a base coded moving picture sequence signal transmitted in said step (a-5), said base coded moving picture sequence signal being any one of said first coded moving picture sequence signal, said second coded moving picture sequence signal, and said differential coded moving picture sequence signal;

(b-2) storing said base coded moving picture sequence signal received in said step (b-1);

(b-3) determining a request signal for a requested coded moving picture sequence signal on the basis of said base coded moving picture sequence signal stored in said step (b-2); and (b-4) transmitting said request signal for said requested coded moving picture sequence signal determined in said step (b-3) to said step (a);

whereby said step (a) further includes the steps of:

(a-6) receiving said request signal transmitted in said step (b-4);

(a-7) extracting said requested coded moving picture sequence signal in response to said request signal; and (a-8) transmitting said requested coded moving picture sequence signal extracted in said step (a-7) to said step (b);

said step (b) includes the steps of:

(b-5) receiving said requested coded moving picture sequence signal transmitted in said step (a-8);

(b-6) extracting said base coded moving picture sequence signal from among coded moving picture sequence signals stored in said step (b-2);

(b-7) merging said base coded moving picture sequence signal extracted in said step (b-6) with said requested coded moving picture sequence signal received in said step (b-5) on the basis of said second coefficient information obtained from said series of second picture information of said second coded moving picture sequence signal, and said differential coefficient information obtained from said differential coded signal to reconstruct said first coded moving picture sequence signal; and (b-8) inputting said reconstructed first coded moving picture sequence signal generated in said step (b-7) to be outputted therethrough.

27. A coded signal separating and merging method as set forth in claim 26, in which said step (a-4) has the step of storing said differential coded moving picture sequence signal generated in said step (a-3), said step (a-5) has the step of transmitting said second coded moving picture sequence signal generated in said step (a-2), said step (b-1) has the step of receiving said second coded moving picture sequence signal transmitted in said step (a-5), said step (b-2) has the step of storing said second coded moving picture sequence signal received in said step (b-1), said step (b-3) has the step of determining a request signal for a requested differential coded moving picture sequence signal on the basis of said second coded moving picture sequence signal stored in said step (b-2), said step (b-4) has the step of transmitting said request signal for said requested differential coded moving picture sequence signal determined in said step (b-3), said step (a-6) has the step of receiving said request signal transmitted in said step (b-4), said step (a-7) has the step of extracting said requested differential coded moving picture sequence signal from among coded moving picture sequence signals stored in said step (a-4) in response to said request signal, said step (a-8) has the step of transmitting said requested differential coded moving picture sequence signal extracted in said step (a-7) to said step (b), said step (b-5) has the step of receiving said requested differential coded moving picture sequence signal transmitted in said step (a-8), said step (b-6) has the step of extracting said second coded moving picture sequence signal from among coded moving picture sequence signals stored in said step (b-2), and said step (b-7) has the step of merging said second coded moving picture sequence signal extracted in said step (b-6) with said requested differential coded moving picture sequence signal received in said step (b-5) to reconstruct said first coded moving picture sequence signal.

28. A coded signal separating and merging method as set forth in claim 27, in which said step (b) further includes the step of decoding said second coded moving picture sequence signal received in said step (b-1).

29. A coded signal separating and merging method as set forth in claim 27 or claim 28, in which said step (b) further includes the step of (b-9) cutting and combining component parts of said second coded moving picture sequence signal stored in said step (b-2) to generate an edited second coded moving picture sequence signal in a desired size, said step (b-3) has the step of determining a request signal for a requested differential coded moving picture sequence signal on the basis of said edited second coded moving picture sequence signal generated in said step (b-9), said step (b-4) has the step of transmitting said request signal for said requested differential coded moving picture sequence signal determined in said step (b-3) to said step (a), said step (a-7) has the step of extracting said requested differential coded moving picture sequence signal from among coded moving picture sequence signals stored in said step (a-4) in response to said request signal, and said step (b-7) has the step of merging said edited second coded moving picture sequence signal generated in said step (b-9) with said requested differential coded moving picture sequence signal received in said step (b-5) to reconstruct said first coded moving picture sequence signal in said desired size.

30. A coded signal separating and merging method as set forth in claim 26, in which said step (a-4) has the step of storing said second coded moving picture sequence signal generated in said step (a-2), said step (a-5) has the step of transmitting said differential coded moving picture sequence signal generated in said step (a-3) to said step (b), said step (b-1) has the step of receiving said differential coded moving picture sequence signal transmitted in said step (a-5), said step (b-2) has the step of storing said differential coded moving picture sequence signal received in said step (b-1), step (b-3) has the step of determining a request signal for a requested second coded moving picture sequence signal on the basis of said differential coded moving picture sequence signal stored in said step (b-2), said step (b-4) has the step of transmitting said request signal for said requested second coded moving picture sequence signal determined in said step (b-3), said step (a-6) has the step of receiving said request signal transmitted in said step (b-4), said step (a-7) has the step of extracting said requested second coded moving picture sequence signal from among coded moving picture sequence signals stored in said step (a-4) in response to said request signal, said step (a-8) has the step of transmitting said requested second coded moving picture sequence signal extracted in said step (a-7) to said step (b), said step (b-5) has the step of receiving said requested second coded moving picture sequence signal transmitted in said step (a-8), said step (b-6) has the step of extracting said differential coded moving picture sequence signal stored in said step (b-2), and said step (b-7) has the step of merging said differential coded moving picture sequence signal extracted in said step (b-6) with said second coded moving picture sequence signal received in said step (b-5) to reconstruct said first coded moving picture sequence signal.

31. A coded signal separating and merging method as set forth in claim 30, in which said step (a-5) has the step of transmitting said differential coded moving picture sequence signal by way of broadcasting.

32. A coded signal separating and merging method as set forth in any one of claim 27, claim 28 and claim 31, in which said step (b) further includes the step of storing said reconstructed first coded moving picture sequence signal reconstructed in said step (b-7).

33. A coded signal separating and merging method as set forth in claim 26, in which said step (b) further includes the steps of:

(b-10) decoding said first coded moving picture sequence signal or said second coded moving picture sequence signal; and (b-11) inputting said first coded moving picture sequence signal to generate said second coded moving picture sequence signal, said step (a-5) has the step of transmitting said first coded moving picture sequence signal, said step (a-4) has the step of storing said differential coded moving picture sequence signal generated in said step (a-3), said step (b-1) has the step of receiving said first coded moving picture sequence signal transmitted in said step (a-5), said step (b-10) has the step of decoding said first coded moving picture sequence signal received in said step (b-1), said step (b-11) has the step of inputting said first coded moving picture sequence signal received in said step (b-1) to generate said second coded moving picture sequence signal, said step (b-2) has the step of storing said second coded moving picture sequence signal generated in said step (b-11), said step (b-3) has the step of determining a request signal for a requested differential coded moving picture sequence signal on the basis of said second coded moving picture sequence signal stored in said step (b-2), said step (b-4) has the step of transmitting said request signal for said requested differential coded moving picture sequence signal determined in said step (b-3) to said step (a), said step (a-6) has the step of receiving said request signal transmitted in said step (b-4), said step (a-7) has the step of extracting said requested differential coded moving picture sequence signal from among coded moving picture sequence signals stored in said step (a-4) in response to said request signal, said step (a-8) has the step of transmitting said requested differential coded moving picture sequence signal extracted in said step (a-7) to said step (b), said step (b-5) has the step of receiving said requested differential coded moving picture sequence signal transmitted in said step (a-8), said step (b-6) has the step of extracting said second coded moving picture sequence signal from among coded moving picture sequence signals stored in said step (b-2), and said step (b-7) has the step of merging said second coded moving picture sequence signal extracted in said step (b-6) with said requested differential coded moving picture sequence signal received in said step (b-5) to reconstruct said first coded moving picture sequence signal in said desired size.

34. A coded signal separating and merging method as set forth in claim 26, in which said step (b) further includes the steps of:

(b-10) decoding said first coded moving picture sequence signal or said second coded moving picture sequence signal; and (b-12) inputting said first coded moving picture sequence signal to generate said differential coded moving picture sequence signal, said step (a-5) has the step of transmitting said first coded moving picture sequence signal, said step (a-4) has the step of storing said second coded moving picture sequence signal generated in said step (a-2), said step (b-1) has the step of receiving said first coded moving picture sequence signal transmitted in said step (a-5), said step (b-10) has the step of decoding said first coded moving picture sequence signal received in said step (b-1), said step (b-12) has the step of inputting said first coded moving picture sequence signal received in said step (b-1) to generate said differential coded moving picture sequence signal, said step (b-2) has the step of storing said differential coded moving picture sequence signal generated in said step (b-11), said step (b-3) has the step of determining a request signal for a requested second coded moving picture sequence signal on the basis of said differential coded moving picture sequence signal stored in said step (b-2), said step (b-4) has the step of transmitting said request signal for said requested second coded moving picture sequence signal determined in said step (b-3) to said step (a), said step (a-6) has the step of receiving said request signal transmitted in said step (b-4), said step (a-7) has the step of extracting said requested second coded moving picture sequence signal from among coded moving picture sequence signals stored in said step (a-4) in response to said request signal, said step (a-8) has the step of transmitting said requested second coded moving picture sequence signal extracted in said step (a-7) to said step (b), said step (b-5) has the step of receiving said requested second coded moving picture sequence signal transmitted in said step (a-8), said step (b-6) has the step of extracting said differential coded moving picture sequence signal from among coded moving picture sequence signals stored in said step (b-2), and said step (b-7) has the step of merging said differential coded moving picture sequence signal extracted in said step (b-6) with said requested second coded moving picture sequence signal received in said step (b-5) to reconstruct said first coded moving picture sequence signal in said desired size.

35. A coded signal separating method for inputting a first coded moving picture sequence signal to separate into a second coded moving picture sequence signal and a differential coded moving picture sequence signal comprising the steps of:

(a-1) inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(a-2) converting said first coded moving picture sequence signal inputted in said step (a-1) to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

(a-3) inputting said first coded moving picture sequence signal and said second coded moving picture sequence signal from said step (a-2) to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

(a-4) selectively storing said first coded moving picture sequence signal, said second coded moving picture sequence signal, and said differential coded moving picture sequence signal;

(a-5) selectively transmitting said first coded moving picture sequence signal, said second coded moving picture sequence signal, and said differential coded moving picture sequence signal;

(a-6) receiving a request signal indicative of a requested coded moving picture sequence signal to be transmitted, said request signal indicative of said requested coded moving picture sequence signal being determined on the basis of said first coded moving picture sequence signal, said second coded moving picture sequence signal, or said differential coded moving picture sequence signal;

(a-7) extracting said requested coded moving picture sequence signal from among coded moving picture sequence signals stored in said step (a-4) in response to said request signal; and (a-8) transmitting said requested coded moving picture sequence signal extracted in said step (a-7).

36. A coded signal separating method as set forth in claim 35, in which said step (a-4) has the step of storing said differential coded moving picture sequence signal generated in said step (a-3), said step (a-5) has the step of transmitting said second coded moving picture sequence signal generated in said step (a-2), said step (a-6) has the step of receiving said request signal indicative of a requested differential coded moving picture sequence signal to be transmitted, said request signal indicative of said requested differential coded moving picture sequence signal being determined on the basis of said second coded moving picture sequence signal, said step (a-7) has the step of extracting said requested differential coded moving picture sequence signal from among coded moving picture sequence signals stored in said step (a-4) in response to said request signal, and said step (a-8) has the step of transmitting said requested differential coded moving picture sequence signal extracted in said step (a-7).

37. A coded signal separating method as set forth in claim 36, in which said step (a-6) has the step of receiving said request signal indicative of said requested differential coded moving picture sequence signal to be transmitted, said request signal indicative of said requested differential coded moving picture sequence signal being determined on the basis of an edited second coded moving picture sequence signal generated by cutting and combining component parts of said second coded moving picture sequence signal, said step (a-7) has the step of extracting said requested differential coded moving picture sequence signal from among coded moving picture sequence signals stored in said step (a-4) in response to said request signal, and said step (a-8) has the step of transmitting said requested differential coded moving picture sequence signal extracted in said step (a-7).

38. A coded signal separating method as set forth in claim 35, in which said step (a-4) has the step of storing said second coded moving picture sequence signal generated in said step (a-2), said step (a-5) has the step of transmitting said differential coded moving picture sequence signal generated in said step (a-3), said step (a-6) has the step of receiving said request signal indicative of said requested second coded moving picture sequence signal to be transmitted, said request signal indicative of said requested second coded moving picture sequence signal being determined on the basis of said differential coded moving picture sequence signal, said step (a-7) has the step of extracting said requested second coded moving picture sequence signal from among coded moving picture sequence signals stored in said step (a-4) in response to said request signal, and said step (a-8) has the step of transmitting said requested second coded moving picture sequence signal extracted in said step (a-7).

39. A coded signal separating method as set forth in claim 38, in which said step (a-5) has the step of transmitting said differential coded moving picture sequence signal by way of broadcasting.

40. A coded signal separating method as set forth in claim 35, in which said step (a-5) has the step of transmitting said first coded moving picture sequence signal, said step (a-4) has the step of storing said differential coded moving picture sequence signal generated in said step (a-3), said step (a-6) has the step of receiving said request signal indicative of a requested differential coded moving picture sequence signal to be transmitted, said request signal indicative of said requested differential coded moving picture sequence signal being determined on the basis of a second coded moving picture sequence signal generated in accordance with said first coded moving picture sequence signal, said step (a-7) has the step of extracting said requested differential coded moving picture sequence signal from among coded moving picture sequence signals stored in said step (a-4) in response to said request signal, and said step (a-8) has the step of transmitting said requested differential coded moving picture sequence signal extracted in said step (a-7).

41. A coded signal separating method as set forth in claim 35, in which said step (a-5) has the step of transmitting said first coded moving picture sequence signal, said step (a-4) has the step of storing said second coded moving picture sequence signal generated in said step (a-2), said step (a-6) has the step of receiving said request signal indicative of a requested second coded moving picture sequence signal to be transmitted, said request signal indicative of said requested second coded moving picture sequence signal being determined on the basis of a differential coded moving picture sequence signal generated in accordance with said first coded moving picture sequence signal, said step (a-7) has the step of extracting said requested second coded moving picture sequence signal from among coded moving picture sequence signals stored in said step (a-4) in response to said request signal, and said step (a-8) has the step of transmitting said requested second coded moving picture sequence signal extracted in said step (a-7).

42. A coded signal merging method for inputting a second coded moving picture sequence signal and a differential coded moving picture sequence signal to reconstruct a first coded moving picture sequence signal, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients, said differential coded moving picture sequence signal being a difference between said first coded moving picture sequence signal and said second coded moving picture sequence signal, said differential coded moving picture sequence signal including differential coefficient information between said first coefficient information and said second coefficient information, each of said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks, said step (b) comprising the steps of:

(b-1) receiving a base coded moving picture sequence signal, said base coded moving picture sequence signal being any one of said first coded moving picture sequence signal, said second coded moving picture sequence signal, and said differential coded moving picture sequence signal;

(b-2) storing said base coded moving picture sequence signal received in said step (b-1);

(b-3) determining a request signal for a requested coded moving picture sequence signal on the basis of said base coded moving picture sequence signal stored in said step (b-2);

(b-4) transmitting said request signal for said requested coded moving picture sequence signal determined in said step (b-3);

(b-5) receiving said requested coded moving picture sequence signal;

(b-6) extracting said base coded moving picture sequence signal from among coded moving picture sequence signals stored in said step (b-2);

(b-7) merging said base coded moving picture sequence signal extracted in said step (b-6) with said requested coded moving picture sequence signal received in said step (b-5) to reconstruct said first coded moving picture sequence signal on the basis of said second coefficient information obtained from said series of second picture information of said second coded moving picture sequence signal, and said differential coefficient information obtained from said differential coded signal; and (b-8) inputting said reconstructed first coded moving picture sequence signal generated in said step (b-7) to be outputted therethrough.

43. A coded signal merging method as set forth in claim 42, in which said step (b-1) has the step of receiving said second coded moving picture sequence signal, said step (b-2) has the step of storing said second coded moving picture sequence signal received in said step (b-1), said step (b-3) has the step of determining a request signal for a requested differential coded moving picture sequence signal on the basis of said second coded moving picture sequence signal stored in said step (b-2), said step (b-4) has the step of transmitting a request signal for said requested differential coded moving picture sequence signal determined in said step (b-3), said step (b-5) has the step of receiving said requested differential coded moving picture sequence signal, said step (b-6) has the step of extracting said second coded moving picture sequence signal from among coded moving picture sequence signals stored in said step (b-2), and said step (b-7) has the step of merging said second coded moving picture sequence signal extracted in said step (b-6) with said requested differential coded moving picture sequence signal received in said step (b-5) to reconstruct said first coded moving picture sequence signal.

44. A coded signal merging method as set forth in claim 43 further comprising the step of decoding said second coded moving picture sequence signal received in said step (b-1).

45. A coded signal merging method as set forth in claim 43 or claim 44 further comprising the step of (b-9) cutting and combining component parts of said second coded moving picture sequence signal stored in said step (b-2) to generate an edited second coded moving picture sequence signal in a desired size, in which said step (b-3) has the step of determining a request signal for a requested differential coded moving picture sequence signal on the basis of said edited second coded moving picture sequence signal generated in said step (b-9), said step (b-4) has the step of transmitting said request signal for said requested differential coded moving picture sequence signal determined in said step (b-3), and said step (b-7) has the step of merging said edited second coded moving picture sequence signal generated in said editing step (b-9) with said requested differential coded moving picture sequence signal received in said step (b-5) to reconstruct said first coded moving picture sequence signal in said desired size.

46. A coded signal merging method as set forth in claim 42, in which said step (b-1) has the step of receiving said differential coded moving picture sequence signal, said step (b-2) has the step of storing said differential coded moving picture sequence signal received in said step (b-1), step (b-3) has the step of determining a request signal for a requested second coded moving picture sequence signal on the basis of said differential coded moving picture sequence signal stored in said step (b-2), said step (b-4) has the step of transmitting said request signal for said requested second coded moving picture sequence signal determined in said step (b-3), said step (b-5) has the step of receiving said requested second coded moving picture sequence signal, said step (b-6) has the step of extracting said differential coded moving picture sequence signal stored in said step (b-2), and said step (b-7) has the step of merging said differential coded moving picture sequence signal extracted in said step (b-6) with said second coded moving picture sequence signal received in said step (b-5) to reconstruct said first coded moving picture sequence signal.

47. A coded signal merging method as set forth in claim 46, in which said step (b-1) has the step of receiving said differential coded moving picture sequence signal by way of broadcasting.

48. A coded signal merging method as set forth in any one of claim 43, claim 44, and claim 47, further comprising the step of storing said reconstructed first coded moving picture sequence signal reconstructed in said step (b-7).

49. A coded signal merging method as set forth in claim 42 further comprising the steps of:

(b-10) decoding said first coded moving picture sequence signal or said second coded moving picture sequence signal; and (b-11) inputting said first coded moving picture sequence signal to generate said second coded moving picture sequence signal, in which said step (b-1) has the step of receiving said first coded moving picture sequence signal, said step (b-10) has the step of decoding said first coded moving picture sequence signal received in said step (b-1), said step (b-11) has the step of inputting said first coded moving picture sequence signal received in said step (b-1) to generate said second coded moving picture sequence signal, said step (b-2) has the step of storing said second coded moving picture sequence signal generated in said step (b-11), said step (b-3) has the step of determining a request signal for a requested differential coded moving picture sequence signal on the basis of said second coded moving picture sequence signal stored in said step (b-2), said step (b-4) has the step of transmitting said request signal for said requested differential coded moving picture sequence signal determined in said step (b-3), said step (b-5) has the step of receiving said requested differential coded moving picture sequence signal, said step (b-6) has the step of extracting said second coded moving picture sequence signal from among coded moving picture sequence signals stored in said step (b-2), and said step (b-7) has the step of merging said second coded moving picture sequence signal extracted in said step (b-6) with said requested differential coded moving picture sequence signal received in said step (b-5) to reconstruct said first coded moving picture sequence signal in said desired size.

50. A coded signal merging method as set forth in claim 42 further comprising the steps of:

(b-10) decoding said first coded moving picture sequence signal or said second coded moving picture sequence signal; and (b-12) inputting said first coded moving picture sequence signal to generate said differential coded moving picture sequence signal, said step (b-1) has the step of receiving said first coded moving picture sequence signal, said step (b-10) has the step of decoding said first coded moving picture sequence signal received in said step (b-1), said step (b-12) has the step of inputting said first coded moving picture sequence signal received in said step (b-1) to generate said differential coded moving picture sequence signal, said step (b-2) has the step of storing said differential coded moving picture sequence signal generated in said step (b-11), said step (b-3) has the step of determining a request signal for a requested second coded moving picture sequence signal on the basis of said differential coded moving picture sequence signal stored in said step (b-2), said step (b-4) has the step of transmitting said request signal for said requested second coded moving picture sequence signal determined in said step (b-3), said step (b-5) has the step of receiving said requested second coded moving picture sequence signal, said step (b-6) has the step of extracting said differential coded moving picture sequence signal from among coded moving picture sequence signals stored in said step (b-2), and said step (b-7) has the step of merging said differential coded moving picture sequence signal extracted in said step (b-6) with said requested second coded moving picture sequence signal received in said step (b-5) to reconstruct said first coded moving picture sequence signal in said desired size.

51. A computer program product comprising a computer usable storage medium having computer readable code embodied therein for separating and merging a coded signal comprising:

(a) computer readable program code for inputting for inputting a first coded moving picture sequence signal to separate into a second coded moving picture sequence signal and a differential coded moving picture sequence signal; and (b) computer readable program code for inputting said second coded moving picture sequence signal and said differential coded moving picture sequence signal to reconstruct said first coded moving picture sequence signal, said computer readable program code (a) including:

(a-1) computer readable program code for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(a-2) computer readable program code for converting said first coded moving picture sequence signal inputted by said computer readable program code (a-1) to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

(a-3) computer readable program code for inputting said first coded moving picture sequence signal and said second coded moving picture sequence signal to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

(a-4) computer readable program code for selectively storing said first coded moving picture sequence signal, said second coded moving picture sequence signal, and said differential coded moving picture sequence signal; and (a-5) computer readable program code for selectively transmitting said first coded moving picture sequence signal, said second coded moving picture sequence signal, and said differential coded moving picture sequence signal to said computer readable program code (b);

said computer readable program code (b) including:

(b-1) computer readable program code for receiving a base coded moving picture sequence signal transmitted by said computer readable program code (a-5), said base coded moving picture sequence signal being any one of said first coded moving picture sequence signal, said second coded moving picture sequence signal, and said differential coded moving picture sequence signal;

(b-2) computer readable program code for storing said base coded moving picture sequence signal received by said computer readable program code (b-1);

(b-3) computer readable program code for determining a request signal for a requested coded moving picture sequence signal on the basis of said base coded moving picture sequence signal stored by said computer readable program code (b-2); and (b-4) computer readable program code for transmitting said request signal for said requested coded moving picture sequence signal determined by said computer readable program code (b-3) to said computer readable program code (a);

whereby said computer readable program code (a) further includes:

(a-6) computer readable program code for receiving said request signal transmitted by said computer readable program code (b-4);

(a-7) computer readable program code for extracting said requested coded moving picture sequence signal in response to said request signal; and (a-8) computer readable program code for transmitting said requested coded moving picture sequence signal extracted by said computer readable program code (a-7) to said computer readable program code (b);

said computer readable program code (b) includes:

(b-5) computer readable program code for receiving said requested coded moving picture sequence signal transmitted by said computer readable program code (a-8);

(b-6) computer readable program code for extracting said base coded moving picture sequence signal from among coded moving picture sequence signals stored by said computer readable program code (b-2);

(b-7) computer readable program code for merging said base coded moving picture sequence signal extracted by said computer readable program code (b-6) with said requested coded moving picture sequence signal received by said computer readable program code (b-5) on the basis of said second coefficient information obtained from said series of second picture information of said second coded moving picture sequence signal, and said differential coefficient information obtained from said differential coded signal to reconstruct said first coded moving picture sequence signal; and (b-8) computer readable program code for inputting said reconstructed first coded moving picture sequence signal generated by said computer readable program code (b-7) to be outputted therethrough.

52. A computer program product as set forth in claim 51, in which said computer readable program code (a-4) has computer readable program code for storing said differential coded moving picture sequence signal generated by said computer readable program code (a-3), said computer readable program code (a-5) has computer readable program code for transmitting said second coded moving picture sequence signal generated by said computer readable program code (a-2), said computer readable program code (b-1) has computer readable program code for receiving said second coded moving picture sequence signal transmitted by said computer readable program code (a-5), said computer readable program code (b-2) has computer readable program code for storing said second coded moving picture sequence signal received by said computer readable program code (b-1), said computer readable program code (b-3) has computer readable program code for determining a request signal for a requested differential coded moving picture sequence signal on the basis of said second coded moving picture sequence signal stored by said computer readable program code (b-2), said computer readable program code (b-4) has computer readable program code for transmitting said request signal for said requested differential coded moving picture sequence signal determined by said computer readable program code (b-3), said computer readable program code (a-6) has computer readable program code for receiving said request signal transmitted by said computer readable program code (b-4), said computer readable program code (a-7) has computer readable program code for extracting said requested differential coded moving picture sequence signal from among coded moving picture sequence signals stored by said computer readable program code (a-4) in response to said request signal, said computer readable program code (a-8) has computer readable program code for transmitting said requested differential coded moving picture sequence signal extracted by said computer readable program code (a-7) to said computer readable program code (b), said computer readable program code (b-5) has computer readable program code for receiving said requested differential coded moving picture sequence signal transmitted by said computer readable program code (a-8), said computer readable program code (b-6) has computer readable program code for extracting said second coded moving picture sequence signal from among coded moving picture sequence signals stored by said computer readable program code (b-2), and said computer readable program code (b-7) has computer readable program code for merging said second coded moving picture sequence signal extracted by said computer readable program code (b-6) with said requested differential coded moving picture sequence signal received by said computer readable program code (b-5) to reconstruct said first coded moving picture sequence signal.

53. A computer program product as set forth in claim 52, in which said computer readable program code (b) further includes computer readable program code for decoding said second coded moving picture sequence signal received by said computer readable program code (b-1).

54. A computer program product as set forth in claim 52 or claim 53, in which said computer readable program code (b) further includes a (b-9) computer readable program code for cutting and combining component parts of said second coded moving picture sequence signal stored by said computer readable program code (b-2) to generate an edited second coded moving picture sequence signal in a desired size, said computer readable program code (b-3) has computer readable program code for determining a request signal for a requested differential coded moving picture sequence signal on the basis of said edited second coded moving picture sequence signal generated by said computer readable program code (b-9), said computer readable program code (b-4) has computer readable program code for transmitting said request signal for said requested differential coded moving picture sequence signal determined by said computer readable program code (b-3) to said computer readable program code (a), said computer readable program code (a-7) has computer readable program code for extracting said requested differential coded moving picture sequence signal from among coded moving picture sequence signals stored by said computer readable program code (a-4) in response to said request signal, and said computer readable program code (b-7) has computer readable program code for merging said edited second coded moving picture sequence signal generated by said computer readable program code (b-9) with said requested differential coded moving picture sequence signal received by said computer readable program code (b-5) to reconstruct said first coded moving picture sequence signal in said desired size.

55. A computer program product as set forth in claim 51, in which said computer readable program code (a-4) has computer readable program code for storing said second coded moving picture sequence signal generated by said computer readable program code (a-2), said computer readable program code (a-5) has computer readable program code for transmitting said differential coded moving picture sequence signal generated by said computer readable program code (a-3) to said computer readable program code (b), said computer readable program code (b-1) has computer readable program code for receiving said differential coded moving picture sequence signal transmitted by said computer readable program code (a-5), said computer readable program code (b-2) has computer readable program code for storing said differential coded moving picture sequence signal received by said computer readable program code (b-1), computer readable program code (b-3) has computer readable program code for determining a request signal for a requested second coded moving picture sequence signal on the basis of said differential coded moving picture sequence signal stored by said computer readable program code (b-2), said computer readable program code (b-4) has computer readable program code for transmitting said request signal for said requested second coded moving picture sequence signal determined by said computer readable program code (b-3), said computer readable program code (a-6) has computer readable program code for receiving said request signal transmitted by said computer readable program code (b-4), said computer readable program code (a-7) has computer readable program code for extracting said requested second coded moving picture sequence signal from among coded moving picture sequence signals stored by said computer readable program code (a-4) in response to said request signal, said computer readable program code (a-8) has computer readable program code for transmitting said requested second coded moving picture sequence signal extracted by said computer readable program code (a-7) to said computer readable program code (b), said computer readable program code (b-5) has computer readable program code for receiving said requested second coded moving picture sequence signal transmitted by said computer readable program code (a-8), said computer readable program code (b-6) has computer readable program code for extracting said differential coded moving picture sequence signal stored by said computer readable program code (b-2), and said computer readable program code (b-7) has computer readable program code for merging said differential coded moving picture sequence signal extracted by said computer readable program code (b-6) with said second coded moving picture sequence signal received by said computer readable program code (b-5) to reconstruct said first coded moving picture sequence signal.

56. A computer program product as set forth in claim 55, in which said computer readable program code (a-5) has computer readable program code for transmitting said differential coded moving picture sequence signal by way of broadcasting.

57. A computer program product as set forth in any one of claim 52, claim 53, and claim 56, in which said computer readable program code (b) further includes computer readable program code for storing said reconstructed first coded moving picture sequence signal reconstructed by said computer readable program code (b-7).

58. A computer program product as set forth in claim 51, in which said computer readable program code (b) further includes:
(b-10) computer readable program code for decoding said first coded moving picture sequence signal or said second coded moving picture sequence signal; and
(b-11) computer readable program code for inputting said first coded moving picture sequence signal to generate said second coded moving picture sequence signal, said computer readable program code (a-5) has computer readable program code for transmitting said first coded moving picture sequence signal, said computer readable program code (a-4) has computer readable program code for storing said differential coded moving picture sequence signal generated by said computer readable program code (a-3), said computer readable program code (b-1) has computer readable program code for receiving said first coded moving picture sequence signal transmitted by said computer readable program code (a-5), said computer readable program code (b-10) has computer readable program code for decoding said first coded moving picture sequence signal received by said computer readable program code (b-11), said computer readable program code (b-11) has computer readable program code for inputting said first coded moving picture sequence signal received by said computer readable program code (b-1) to generate said second coded moving picture sequence signal, said computer readable program code (b-2) has computer readable program code for storing said second coded moving picture sequence signal generated by said computer readable program code (b-11), said computer readable program code (b-3) has computer readable program code for determining a request signal for a requested differential coded moving picture sequence signal on the basis of said second coded moving picture sequence signal stored by said computer readable program code (b-2), said computer readable program code (b-4) has computer readable program code for transmitting said request signal for said requested differential coded moving picture sequence signal determined by said computer readable program code (b-3) to said computer readable program code (a), said computer readable program code (a-6) has computer readable program code for receiving said request signal transmitted by said computer readable program code (b-4), said computer readable program code (a-7) has computer readable program code for extracting said requested differential coded moving picture sequence signal from among coded moving picture sequence signals stored by said computer readable program code (a-4) in response to said request signal, said computer readable program code (a-8) has computer readable program code for transmitting said requested differential coded moving picture sequence signal extracted by said computer readable program code (a-7) to said computer readable program code (b), said computer readable program code (b-5) has computer readable program code for receiving said requested differential coded moving picture sequence signal transmitted by said computer readable program code (a-8), said computer readable program code (b-6) has computer readable program code for extracting said second coded moving picture sequence signal from among coded moving picture sequence signals stored by said computer readable program code (b-2), and said computer readable program code (b-7) has computer readable program code for merging said second coded moving picture sequence signal extracted by said computer readable program code (b-6) with said requested differential coded moving picture sequence signal received by said computer readable program code (b-5) to reconstruct said first coded moving picture sequence signal in said desired size.

59. A computer program product as set forth in claim 51, in which said computer readable program code (b) further includes:
(b-10) computer readable program code for decoding said first coded moving picture sequence signal or said second coded moving picture sequence signal; and
(b-12) computer readable program code for inputting said first coded moving picture sequence signal to generate said differential coded moving picture sequence signal, said computer readable program code (a-5) has computer readable program code for transmitting said first coded moving picture sequence signal, said computer readable program code (a-4) has computer readable program code for storing said second coded moving picture sequence signal generated by said computer readable program code (a-2), said computer readable program code (b-1) has computer readable program code for receiving said first coded moving picture sequence signal transmitted by said computer readable program code (a-5), said computer readable program code (b-10) has computer readable program code for decoding said first coded moving picture sequence signal received by said computer readable program code (b-1), said computer readable program code (b-12) has computer readable program code for inputting said first coded moving picture sequence signal received by said computer readable program code (b-1) to generate said differential coded moving picture sequence signal, said computer readable program code (b-2) has computer readable program code for storing said differential coded moving picture sequence signal generated by said computer readable program code (b-11), said computer readable program code (b-3) has computer readable program code for determining a request signal for a requested second coded moving picture sequence signal on the basis of said differential coded moving picture sequence signal stored by said computer readable program code (b-2), said computer readable program code (b-4) has computer readable program code for transmitting said request signal for said requested second coded moving picture sequence signal determined by said computer readable program code (b-3) to said computer readable program code (a), said computer readable program code (a-6) has computer readable program code for receiving said request signal transmitted by said computer readable program code (b-4), said computer readable program code (a-7) has computer readable program code for extracting said requested second coded moving picture sequence signal from among coded moving picture sequence signals stored by said computer readable program code (a-4) in response to said request signal, said computer readable program code (a-8) has computer readable program code for transmitting said requested second coded moving picture sequence signal extracted by said computer readable program code (a-7) to said computer readable program code (b), said computer readable program code (b-5) has computer readable program code for receiving said requested second coded moving picture sequence signal transmitted by said computer readable program code (a-8), said computer readable program code (b-6) has computer readable program code for extracting said differential coded moving picture sequence signal from among coded moving picture sequence signals stored by said computer readable program code (b-2), and said computer readable program code (b-7) has computer readable program code for merging said differential coded moving picture sequence signal extracted by said computer readable program code (b-6) with said requested second coded moving picture sequence signal received by said computer readable program code (b-5) to reconstruct said first coded moving picture sequence signal in said desired size.

60. A computer program product comprising a computer usable storage medium having computer readable code embodied therein for inputting a first coded moving picture sequence signal to separate into a second coded moving picture sequence signal and a differential coded moving picture sequence signal comprising:

(a-1) computer readable program code for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(a-2) computer readable program code for converting said first coded moving picture sequence signal inputted by said computer readable program code (a-1) to generate said second coded moving picture sequence signal, said second coded moving picture sequence signal consisting of a series of second picture information having second coefficient information, said second coefficient information including a matrix of second coefficients, each of said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks;

(a-3) computer readable program code for inputting said first coded moving picture sequence signal and said second coded moving picture sequence signal from said computer readable program code (a-2) to generate a differential coded moving picture sequence signal on the basis of said first coefficient information obtained from said series of first picture information of said first coded moving picture sequence signal, and said second coefficient information obtained from said series of said second picture information of said second coded moving picture sequence signal, said differential coded moving picture sequence signal being a difference between said first coded moving picture sequence signal and said second coded moving picture sequence signal;

(a-4) computer readable program code for selectively storing said first coded moving picture sequence signal, said second coded moving picture sequence signal, and said differential coded moving picture sequence signal;

(a-5) computer readable program code for selectively transmitting said first coded moving picture sequence signal, said second coded moving picture sequence signal, and said differential coded moving picture sequence signal;

(a-6) computer readable program code for receiving a request signal indicative of a requested coded moving picture sequence signal to be transmitted, said request signal indicative of said requested coded moving picture sequence signal being determined on the basis of said first coded moving picture sequence signal, said second coded moving picture sequence signal, or said differential coded moving picture sequence signal;

(a-7) computer readable program code for extracting said requested coded moving picture sequence signal from among coded moving picture sequence signals stored by said computer readable program code (a-4) in response to said request signal; and (a-8) computer readable program code for transmitting said requested coded moving picture sequence signal extracted by said computer readable program code (a-7).

61. A computer program product as set forth in claim 60, in which said computer readable program code (a-4) has computer readable program code for storing said differential coded moving picture sequence signal generated by said computer readable program code (a-3), said computer readable program code (a-5) has computer readable program code for transmitting said second coded moving picture sequence signal generated by said computer readable program code (a-2), said computer readable program code (a-6) has computer readable program code for receiving said request signal indicative of a requested differential coded moving picture sequence signal to be transmitted, said request signal indicative of said requested differential coded moving picture sequence signal being determined on the basis of said second coded moving picture sequence signal, said computer readable program code (a-7) has computer readable program code for extracting said requested differential coded moving picture sequence signal from among coded moving picture sequence signals stored by said computer readable program code (a-4) in response to said request signal, and said computer readable program code (a-8) has computer readable program code for transmitting said requested differential coded moving picture sequence signal extracted by said computer readable program code (a-7).

62. A computer program product as set forth in claim 61, in which said computer readable program code (a-6) has computer readable program code for receiving said request signal indicative of said requested differential coded moving picture sequence signal to be transmitted, said request signal indicative of said requested differential coded moving picture sequence signal being determined on the basis of an edited second coded moving picture sequence signal generated by cutting and combining component parts of said second coded moving picture sequence signal, said computer readable program code (a-7) has computer readable program code for extracting said requested differential coded moving picture sequence signal from among coded moving picture sequence signals stored by said computer readable program code (a-4) in response to said request signal, and said computer readable program code (a-8) has computer readable program code for transmitting said requested differential coded moving picture sequence signal extracted by said computer readable program code (a-7).

63. A computer program product as set forth in claim 60, in which said computer readable program code (a-4) has computer readable program code for storing said second coded moving picture sequence signal generated by said computer readable program code (a-2), said computer readable program code (a-5) has computer readable program code for transmitting said differential coded moving picture sequence signal generated by said computer readable program code (a-3), said computer readable program code (a-6) has computer readable program code for receiving said request signal indicative of said requested second coded moving picture sequence signal to be transmitted, said request signal indicative of said requested second coded moving picture sequence signal being determined on the basis of said differential coded moving picture sequence signal, said computer readable program code (a-7) has computer readable program code for extracting said requested second coded moving picture sequence signal from among coded moving picture sequence signals stored by said computer readable program code (a-4) in response to said request signal, and said computer readable program code (a-8) has computer readable program code for transmitting said requested second coded moving picture sequence signal extracted by said computer readable program code (a-7).

64. A computer program product as set forth in claim 63, in which said computer readable program code (a-5) has computer readable program code for transmitting said differential coded moving picture sequence signal by way of broadcasting.

65. A computer program product as set forth in claim 60, in which said computer readable program code (a-5) has computer readable program code for transmitting said first coded moving picture sequence signal, said computer readable program code (a-4) has computer readable program code for storing said differential coded moving picture sequence signal generated by said computer readable program code (a-3), said computer readable program code (a-6) has computer readable program code for receiving said request signal indicative of a requested differential coded moving picture sequence signal to be transmitted, said request signal indicative of said requested differential coded moving picture sequence signal being determined on the basis of a second coded moving picture sequence signal generated in accordance with said first coded moving picture sequence signal, said computer readable program code (a-7) has computer readable program code for extracting said requested differential coded moving picture sequence signal from among coded moving picture sequence signals stored by said computer readable program code (a-4) in response to said request signal, and said computer readable program code (a-8) has computer readable program code for transmitting said requested differential coded moving picture sequence signal extracted by said computer readable program code (a-7).

66. A computer program product as set forth in claim 60, in which said computer readable program code (a-5) has computer readable program code for transmitting said first coded moving picture sequence signal, said computer readable program code (a-4) has computer readable program code for storing said second coded moving picture sequence signal generated by said computer readable program code (a-2), said computer readable program code (a-6) has computer readable program code for receiving said request signal indicative of a requested second coded moving picture sequence signal to be transmitted, said request signal indicative of said requested second coded moving picture sequence signal being determined on the basis of a differential coded moving picture sequence signal generated in accordance with said first coded moving picture sequence signal, said computer readable program code (a-7) has computer readable program code for extracting said requested second coded moving picture sequence signal from among coded moving picture sequence signals stored by said computer readable program code (a-4) in response to said request signal, and said computer readable program code (a-8) has computer readable program code for transmitting said requested second coded moving picture sequence signal extracted by said computer readable program code (a-7).

67. A computer program product comprising a computer usable storage medium having computer readable code embodied therein for inputting a second coded moving picture sequence signal and a differential coded moving picture sequence signal to reconstruct a first coded moving picture sequence signal, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients, said differential coded moving picture sequence signal being a difference between said first coded moving picture sequence signal and said second coded moving picture sequence signal, said differential coded moving picture sequence signal including differential coefficient information between said first coefficient information and said second coefficient information, each of said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks, said computer readable program code (b) comprising:

(b-1) computer readable program code for receiving a base coded moving picture sequence signal, said base coded moving picture sequence signal being any one of said first coded moving picture sequence signal, said second coded moving picture sequence signal, and said differential coded moving picture sequence signal;

(b-2) computer readable program code for storing said base coded moving picture sequence signal received by said computer readable program code (b-1);

(b-3) computer readable program code for determining a request signal for a requested coded moving picture sequence signal on the basis of said base coded moving picture sequence signal stored by said computer readable program code (b-2);

(b-4) computer readable program code for transmitting said request signal for said requested coded moving picture sequence signal determined by said computer readable program code (b-3);

(b-5) computer readable program code for receiving said requested coded moving picture sequence signal;

(b-6) computer readable program code for extracting said base coded moving picture sequence signal from among coded moving picture sequence signals stored by said computer readable program code (b-2);

(b-7) computer readable program code for merging said base coded moving picture sequence signal extracted by said computer readable program code (b-6) with said requested coded moving picture sequence signal received by said computer readable program code (b-5) to reconstruct said first coded moving picture sequence signal on the basis of said second coefficient information obtained from said series of second picture information of said second coded moving picture sequence signal, and said differential coefficient information obtained from said differential coded signal; and (b-8) computer readable program code for inputting said reconstructed first coded moving picture sequence signal generated by said computer readable program code (b-7) to be outputted therethrough.

68. A computer program product as set forth in claim 67, in which said computer readable program code (b-1) has computer readable program code for receiving said second coded moving picture sequence signal, said computer readable program code (b-2) has computer readable program code for storing said second coded moving picture sequence signal received by said computer readable program code (b-1), said computer readable program code (b-3) has computer readable program code for determining a request signal for a requested differential coded moving picture sequence signal on the basis of said second coded moving picture sequence signal stored by said computer readable program code (b-2), said computer readable program code (b-4) has computer readable program code for transmitting a request signal for said requested differential coded moving picture sequence signal determined by said computer readable program code (b-3), said computer readable program code (b-5) has computer readable program code for receiving said requested differential coded moving picture sequence signal, said computer readable program code (b-6) has computer readable program code for extracting said second coded moving picture sequence signal from among coded moving picture sequence signals stored by said computer readable program code (b-2), and said computer readable program code (b-7) has computer readable program code for merging said second coded moving picture sequence signal extracted by said computer readable program code (b-6) with said requested differential coded moving picture sequence signal received by said computer readable program code (b-5) to reconstruct said first coded moving picture sequence signal.

69. A computer program product as set forth in claim 68 further comprising computer readable program code for decoding said second coded moving picture sequence signal received by said computer readable program code (b-1).

70. A computer program product as set forth in claim 68 or claim 69 further comprising computer readable program code (b-9) for cutting and combining component parts of said second coded moving picture sequence signal stored by said computer readable program code (b-2) to generate an edited second coded moving picture sequence signal in a desired size, in which said computer readable program code (b-3) has computer readable program code for determining a request signal for a requested differential coded moving picture sequence signal on the basis of said edited second coded moving picture sequence signal generated by said computer readable program code (b-9), said computer readable program code (b-4) has computer readable program code for transmitting said request signal for said requested differential coded moving picture sequence signal determined by said computer readable program code (b-3), and said computer readable program code (b-7) has computer readable program code for merging said edited second coded moving picture sequence signal generated in said editing computer readable program code (b-9) with said requested differential coded moving picture sequence signal received by said computer readable program code (b-5) to reconstruct said first coded moving picture sequence signal in said desired size.

71. A computer program product as set forth in claim 67, in which said computer readable program code (b-1) has computer readable program code for receiving said differential coded moving picture sequence signal, said computer readable program code (b-2) has computer readable program code for storing said differential coded moving picture sequence signal received by said computer readable program code (b-1), computer readable program code (b-3) has computer readable program code for determining a request signal for a requested second coded moving picture sequence signal on the basis of said differential coded moving picture sequence signal stored by said computer readable program code (b-2), said computer readable program code (b-4) has computer readable program code for transmitting said request signal for said requested second coded moving picture sequence signal determined by said computer readable program code (b-3), said computer readable program code (b-5) has computer readable program code for receiving said requested second coded moving picture sequence signal, said computer readable program code (b-6) has computer readable program code for extracting said differential coded moving picture sequence signal stored by said computer readable program code (b-2), and said computer readable program code (b-7) has computer readable program code for merging said differential coded moving picture sequence signal extracted by said computer readable program code (b-6) with said second coded moving picture sequence signal received by said computer readable program code (b-5) to reconstruct said first coded moving picture sequence signal.

72. A computer program product as set forth in claim 71, in which said computer readable program code (b-1) has computer readable program code for receiving said differential coded moving picture sequence signal by way of broadcasting.

73. A computer program product as set forth in any one of claim 68, claim 69, and 72, further comprising computer readable program code for storing said reconstructed first coded moving picture sequence signal reconstructed by said computer readable program code (b-7).

74. A computer program product as set forth in claim 67 further comprising:

(b-10) computer readable program code for decoding said first coded moving picture sequence signal or said second coded moving picture sequence signal; and (b-11) computer readable program code for inputting said first coded moving picture sequence signal to generate said second coded moving picture sequence signal, in which said computer readable program code (b-1) has computer readable program code for receiving said first coded moving picture sequence signal, said computer readable program code (b-10) has computer readable program code for decoding said first coded moving picture sequence signal received by said computer readable program code (b-1), said computer readable program code (b-11) has computer readable program code for inputting said first coded moving picture sequence signal received by said computer readable program code (b-1) to generate said second coded moving picture sequence signal, said computer readable program code (b-2) has computer readable program code for storing said second coded moving picture sequence signal generated by said computer readable program code (b-11), said computer readable program code (b-3) has computer readable program code for determining a request signal for a requested differential coded moving picture sequence signal on the basis of said second coded moving picture sequence signal stored by said computer readable program code (b-2), said computer readable program code (b-4) has computer readable program code for transmitting said request signal for said requested differential coded moving picture sequence signal determined by said computer readable program code (b-3), said computer readable program code (b-5) has computer readable program code for receiving said requested differential coded moving picture sequence signal, said computer readable program code (b-6) has computer readable program code for extracting said second coded moving picture sequence signal from among coded moving picture sequence signals stored by said computer readable program code (b-2), and said computer readable program code (b-7) has computer readable program code for merging said second coded moving picture sequence signal extracted by said computer readable program code (b-6) with said requested differential coded moving picture sequence signal received by said computer readable program code (b-5) to reconstruct said first coded moving picture sequence signal in said desired size.

75. A computer program product as set forth in claim 67 further comprising:

(b-10) computer readable program code for decoding said first coded moving picture sequence signal or said second coded moving picture sequence signal; and (b-12) computer readable program code for inputting said first coded moving picture sequence signal to generate said differential coded moving picture sequence signal, said computer readable program code (b-1) has computer readable program code for receiving said first coded moving picture sequence signal, said computer readable program code (b-10) has computer readable program code for decoding said first coded moving picture sequence signal received by said computer readable program code (b-1), said computer readable program code (b-12) has computer readable program code for inputting said first coded moving picture sequence signal received by said computer readable program code (b-1) to generate said differential coded moving picture sequence signal, said computer readable program code (b-2) has computer readable program code for storing said differential coded moving picture sequence signal generated by said computer readable program code (b-11), said computer readable program code (b-3) has computer readable program code for determining a request signal for a requested second coded moving picture sequence signal on the basis of said differential coded moving picture sequence signal stored by said computer readable program code (b-2), said computer readable program code (b-4) has computer readable program code for transmitting said request signal for said requested second coded moving picture sequence signal determined by said computer readable program code (b-3), said computer readable program code (b-5) has computer readable program code for receiving said requested second coded moving picture sequence signal, said computer readable program code (b-6) has computer readable program code for extracting said differential coded moving picture sequence signal from among coded moving picture sequence signals stored by said computer readable program code (b-2), and said computer readable program code (b-7) has computer readable program code for merging said differential coded moving picture sequence signal extracted by said computer readable program code (b-6) with said requested second coded moving picture sequence signal received by said computer readable program code (b-5) to reconstruct said first coded moving picture sequence signal in said desired size.

* * * * *